US011704440B2

(12) United States Patent  
Brannon et al.

(10) Patent No.: US 11,704,440 B2  
(45) Date of Patent: Jul. 18, 2023

(54) DATA PROCESSING SYSTEMS AND METHODS FOR PREVENTING EXECUTION OF AN ACTION DOCUMENTING A CONSENT REJECTION

(71) Applicant: OneTrust, LLC, Atlanta, GA (US)

(72) Inventors: Jonathan Blake Brannon, Smyrna, GA (US); Patrick Whitney, Atlanta, GA (US); Sharath Chandra Chavva, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 17/872,084

(22) Filed: Jul. 25, 2022

(65) Prior Publication Data

US 2022/0358250 A1 Nov. 10, 2022

Related U.S. Application Data

(63) Continuation of application No. 17/476,209, filed on Sep. 15, 2021, now Pat. No. 11,436,373.

(60) Provisional application No. 63/078,560, filed on Sep. 15, 2020.

(51) Int. Cl.
*G06F 3/0483* (2013.01)
*G06F 21/62* (2013.01)
*G06F 9/54* (2006.01)

(52) U.S. Cl.
CPC ........ *G06F 21/6263* (2013.01); *G06F 3/0483* (2013.01); *G06F 9/547* (2013.01)

(58) Field of Classification Search
CPC ..... G06F 21/6263; G06F 3/0483; G06F 9/547
USPC ......................................................... 726/30
See application file for complete search history.

(56) References Cited

U.S. PATENT DOCUMENTS

| 4,536,866 A | 8/1985 | Jerome et al. |
| 4,574,350 A | 3/1986 | Starr |
| 5,193,162 A | 3/1993 | Bordsen et al. |
| 5,276,735 A | 1/1994 | Boebert et al. |

(Continued)

FOREIGN PATENT DOCUMENTS

| CA | 3056394 | 3/2021 |
| CN | 111496802 | 8/2020 |

(Continued)

OTHER PUBLICATIONS

Celestin et al., "Do Cookie Banners Respect my Choice?", May 1, 2020 (Year: 2020).*

(Continued)

*Primary Examiner* — Thanh T Le  
(74) *Attorney, Agent, or Firm* — Brient IP Law, LLC

(57) ABSTRACT

Various aspects involve forgoing updates to consent data for at least one consent rejection generated by an automated consent rejection tool. For instance, a consent management system can be communicatively coupled to a user device. The user device can detect invocations of a consent rejection function, such as when browser states of a browser application indicate requests for web pages or other online content. The consent management system can document a consent rejection for one or more of the invocations. The consent management system can also prevent documentation of consent being rejected for at least one invocation initiated by an automated consent rejection tool.

19 Claims, 7 Drawing Sheets

(56) References Cited

U.S. PATENT DOCUMENTS

| | | |
|---|---|---|
| 5,329,447 A | 7/1994 | Leedom, Jr. |
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,710,917 A | 1/1998 | Musa et al. |
| 5,761,529 A | 6/1998 | Raji |
| 5,764,906 A | 6/1998 | Edelstein et al. |
| 5,872,973 A | 2/1999 | Mitchell et al. |
| 5,913,041 A | 6/1999 | Ramanathan et al. |
| 5,913,214 A | 6/1999 | Madnick et al. |
| 6,016,394 A | 1/2000 | Walker |
| 6,122,627 A | 9/2000 | Carey et al. |
| 6,148,297 A | 11/2000 | Swor et al. |
| 6,148,342 A | 11/2000 | Ho |
| 6,240,416 B1 | 5/2001 | Immon et al. |
| 6,240,422 B1 | 5/2001 | Atkins et al. |
| 6,243,816 B1 | 6/2001 | Fang et al. |
| 6,253,203 B1 | 6/2001 | Oflaherty et al. |
| 6,263,335 B1 | 7/2001 | Paik et al. |
| 6,272,631 B1 | 8/2001 | Thomlinson et al. |
| 6,275,824 B1 | 8/2001 | Oflaherty et al. |
| 6,282,548 B1 | 8/2001 | Burner et al. |
| 6,330,562 B1 | 12/2001 | Boden et al. |
| 6,363,488 B1 | 3/2002 | Ginter et al. |
| 6,374,237 B1 | 4/2002 | Reese |
| 6,374,252 B1 | 4/2002 | Althoff et al. |
| 6,408,336 B1 | 6/2002 | Schneider et al. |
| 6,427,230 B1 | 7/2002 | Goiffon et al. |
| 6,442,688 B1 | 8/2002 | Moses et al. |
| 6,446,120 B1 | 9/2002 | Dantressangle |
| 6,463,488 B1 | 10/2002 | San Juan |
| 6,484,149 B1 | 11/2002 | Jammes et al. |
| 6,484,180 B1 | 11/2002 | Lyons et al. |
| 6,516,314 B1 | 2/2003 | Birkler et al. |
| 6,516,337 B1 | 2/2003 | Tripp et al. |
| 6,519,571 B1 | 2/2003 | Guheen et al. |
| 6,574,631 B1 | 6/2003 | Subramanian et al. |
| 6,591,272 B1 | 7/2003 | Williams |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,629,081 B1 | 9/2003 | Cornelius et al. |
| 6,633,878 B1 | 10/2003 | Underwood |
| 6,662,192 B1 | 12/2003 | Rebane |
| 6,662,357 B1 | 12/2003 | Bowman-Amuah |
| 6,697,824 B1 | 2/2004 | Bowman-Amuah |
| 6,699,042 B2 | 3/2004 | Smith et al. |
| 6,701,314 B1 | 3/2004 | Conover et al. |
| 6,721,713 B1 | 4/2004 | Guheen et al. |
| 6,725,200 B1 | 4/2004 | Rost |
| 6,732,109 B2 | 5/2004 | Lindberg et al. |
| 6,754,665 B1 | 6/2004 | Futagami et al. |
| 6,755,344 B1 | 6/2004 | Mollett et al. |
| 6,757,685 B2 | 6/2004 | Raffaele et al. |
| 6,757,888 B1 | 6/2004 | Knutson et al. |
| 6,816,944 B2 | 11/2004 | Peng |
| 6,826,693 B1 | 11/2004 | Yoshida et al. |
| 6,850,252 B1 | 2/2005 | Hoffberg |
| 6,886,101 B2 | 4/2005 | Glazer et al. |
| 6,901,346 B2 | 5/2005 | Tracy et al. |
| 6,904,417 B2 | 6/2005 | Clayton et al. |
| 6,909,897 B2 | 6/2005 | Kikuchi |
| 6,925,443 B1 | 8/2005 | Baggei, Jr. et al. |
| 6,938,041 B1 | 8/2005 | Brandow et al. |
| 6,956,845 B2 | 10/2005 | Baker et al. |
| 6,978,270 B1 | 12/2005 | Carty et al. |
| 6,980,927 B2 | 12/2005 | Tracy et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | Mcintosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,003,560 B1 | 2/2006 | Mullen et al. |
| 7,003,662 B2 | 2/2006 | Genty et al. |
| 7,013,290 B2 | 3/2006 | Ananian |
| 7,017,105 B2 | 3/2006 | Flanagin et al. |
| 7,023,979 B1 | 4/2006 | Wu et al. |
| 7,039,594 B1 | 5/2006 | Gersting |
| 7,039,654 B1 | 5/2006 | Eder |
| 7,047,517 B1 | 5/2006 | Brown et al. |
| 7,051,036 B2 | 5/2006 | Rosnow et al. |
| 7,051,038 B1 | 5/2006 | Yeh et al. |
| 7,058,970 B2 | 6/2006 | Shaw |
| 7,069,427 B2 | 6/2006 | Adler et al. |
| 7,076,558 B1 | 7/2006 | Dunn |
| 7,093,200 B2 | 8/2006 | Schreiber et al. |
| 7,095,854 B1 | 8/2006 | Ginter et al. |
| 7,100,195 B1 | 8/2006 | Underwood |
| 7,120,800 B2 | 10/2006 | Ginter et al. |
| 7,124,101 B1 | 10/2006 | Mikurak |
| 7,124,107 B1 | 10/2006 | Pishevar et al. |
| 7,127,705 B2 | 10/2006 | Christfort et al. |
| 7,127,741 B2 | 10/2006 | Bandini et al. |
| 7,133,845 B1 | 11/2006 | Ginter et al. |
| 7,139,999 B2 | 11/2006 | Bowman-Amuah |
| 7,143,091 B2 | 11/2006 | Charnock et al. |
| 7,149,698 B2 | 12/2006 | Guheen et al. |
| 7,165,041 B1 | 1/2007 | Guheen et al. |
| 7,167,842 B1 | 1/2007 | Josephson, II et al. |
| 7,167,844 B1 | 1/2007 | Leong et al. |
| 7,171,379 B2 | 1/2007 | Wenninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrishnan et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,247,625 B2 | 7/2007 | Zhang et al. |
| 7,251,624 B1 | 7/2007 | Lee et al. |
| 7,260,830 B2 | 8/2007 | Sugimoto |
| 7,266,566 B1 | 9/2007 | Kennaley et al. |
| 7,272,818 B2 | 9/2007 | Ishimitsu et al. |
| 7,275,063 B2 | 9/2007 | Horn |
| 7,281,020 B2 | 10/2007 | Fine |
| 7,284,232 B1 | 10/2007 | Bates et al. |
| 7,284,271 B2 | 10/2007 | Lucovsky et al. |
| 7,287,280 B2 | 10/2007 | Young |
| 7,290,275 B2 | 10/2007 | Baudoin et al. |
| 7,293,119 B2 | 11/2007 | Beale |
| 7,299,299 B2 | 11/2007 | Hollenbeck et al. |
| 7,302,569 B2 | 11/2007 | Betz et al. |
| 7,313,575 B2 | 12/2007 | Carr et al. |
| 7,313,699 B2 | 12/2007 | Koga |
| 7,313,825 B2 | 12/2007 | Redlich et al. |
| 7,315,826 B1 | 1/2008 | Guheen et al. |
| 7,315,849 B2 | 1/2008 | Bakalash et al. |
| 7,322,047 B2 | 1/2008 | Redlich et al. |
| 7,330,850 B1 | 2/2008 | Seibel et al. |
| 7,340,447 B2 | 3/2008 | Ghatare |
| 7,340,776 B2 | 3/2008 | Zobel et al. |
| 7,343,434 B2 | 3/2008 | Kapoor et al. |
| 7,346,518 B1 | 3/2008 | Frank et al. |
| 7,353,204 B2 | 4/2008 | Liu |
| 7,353,283 B2 | 4/2008 | Henaff et al. |
| 7,356,559 B1 | 4/2008 | Jacobs et al. |
| 7,367,014 B2 | 4/2008 | Griffin |
| 7,370,025 B1 | 5/2008 | Pandit |
| 7,376,835 B2 | 5/2008 | Olkin et al. |
| 7,380,120 B1 | 5/2008 | Garcia |
| 7,382,903 B2 | 6/2008 | Ray |
| 7,383,570 B2 | 6/2008 | Pinkas et al. |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,409,354 B2 | 8/2008 | Putnam et al. |
| 7,412,402 B2 | 8/2008 | Cooper |
| 7,424,680 B2 | 9/2008 | Carpenter |

(56) References Cited

U.S. PATENT DOCUMENTS

| | | |
|---|---|---|
| 7,428,546 B2 | 9/2008 | Nori et al. |
| 7,428,707 B2 | 9/2008 | Quimby |
| 7,430,585 B2 | 9/2008 | Sibert |
| 7,454,457 B1 | 11/2008 | Lowery et al. |
| 7,454,508 B2 | 11/2008 | Mathew et al. |
| 7,478,157 B2 | 1/2009 | Bohrer et al. |
| 7,480,694 B2 | 1/2009 | Blennerhassett et al. |
| 7,480,755 B2 | 1/2009 | Herrell et al. |
| 7,487,170 B2 | 2/2009 | Stevens |
| 7,493,282 B2 | 2/2009 | Manly et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,529,836 B1 | 5/2009 | Bolen |
| 7,548,968 B1 | 6/2009 | Bura et al. |
| 7,552,480 B1 | 6/2009 | Voss |
| 7,562,339 B2 | 7/2009 | Racca et al. |
| 7,565,685 B2 | 7/2009 | Ross et al. |
| 7,567,541 B2 | 7/2009 | Karimi et al. |
| 7,584,505 B2 | 9/2009 | Mondri et al. |
| 7,584,508 B1 | 9/2009 | Kashchenko et al. |
| 7,587,749 B2 | 9/2009 | Leser et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,783 B1 | 10/2009 | Carter |
| 7,606,790 B2 | 10/2009 | Levy |
| 7,607,120 B2 | 10/2009 | Sanyal et al. |
| 7,613,700 B1 | 11/2009 | Lobo et al. |
| 7,617,136 B1 | 11/2009 | Lessing et al. |
| 7,617,167 B2 | 11/2009 | Griffis et al. |
| 7,620,644 B2 | 11/2009 | Cote et al. |
| 7,627,666 B1 | 12/2009 | Degiulio et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,640,322 B2 | 12/2009 | Wendkos et al. |
| 7,650,497 B2 | 1/2010 | Thornton et al. |
| 7,653,592 B1 | 1/2010 | Flaxman et al. |
| 7,657,476 B2 | 2/2010 | Barney |
| 7,657,694 B2 | 2/2010 | Mansell et al. |
| 7,665,073 B2 | 2/2010 | Meijer et al. |
| 7,665,125 B2 | 2/2010 | Heard et al. |
| 7,668,947 B2 | 2/2010 | Hutchinson et al. |
| 7,673,282 B2 | 3/2010 | Amaru et al. |
| 7,676,034 B1 | 3/2010 | Wu et al. |
| 7,681,034 B1 | 3/2010 | Lee et al. |
| 7,681,140 B2 | 3/2010 | Ebert |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,698,398 B1 | 4/2010 | Lai |
| 7,702,639 B2 | 4/2010 | Stanley et al. |
| 7,707,224 B2 | 4/2010 | Chastagnol et al. |
| 7,712,029 B2 | 5/2010 | Ferreira et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |
| 7,730,142 B2 | 6/2010 | Levasseur et al. |
| 7,752,124 B2 | 7/2010 | Green et al. |
| 7,756,826 B2 | 7/2010 | Bots et al. |
| 7,756,987 B2 | 7/2010 | Wang et al. |
| 7,761,586 B2 | 7/2010 | Olenick et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,797,726 B2 | 9/2010 | Ashley et al. |
| 7,801,758 B2 | 9/2010 | Gracie et al. |
| 7,801,826 B2 | 9/2010 | Labrou et al. |
| 7,801,912 B2 | 9/2010 | Ransil et al. |
| 7,802,305 B1 | 9/2010 | Leeds |
| 7,805,349 B2 | 9/2010 | Yu et al. |
| 7,805,451 B2 | 9/2010 | Hosokawa |
| 7,813,947 B2 | 10/2010 | Deangelis et al. |
| 7,822,620 B2 | 10/2010 | Dixon et al. |
| 7,827,523 B2 | 11/2010 | Ahmed et al. |
| 7,844,640 B2 | 11/2010 | Bender et al. |
| 7,849,143 B2 | 12/2010 | Vuong |
| 7,853,468 B2 | 12/2010 | Callahan et al. |
| 7,853,470 B2 | 12/2010 | Sonnleithner et al. |
| 7,853,925 B2 | 12/2010 | Kemmler |
| 7,860,816 B2 | 12/2010 | Fokoue-Nkoutche et al. |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,890,461 B2 | 2/2011 | Oeda et al. |
| 7,895,260 B2 | 2/2011 | Archer et al. |
| 7,904,478 B2 | 3/2011 | Yu et al. |
| 7,904,487 B2 | 3/2011 | Ghatare |
| 7,917,888 B2 | 3/2011 | Chong et al. |
| 7,917,963 B2 | 3/2011 | Goyal et al. |
| 7,921,152 B2 | 4/2011 | Ashley et al. |
| 7,930,197 B2 | 4/2011 | Ozzie et al. |
| 7,930,753 B2 | 4/2011 | Mellinger et al. |
| 7,953,725 B2 | 5/2011 | Burris et al. |
| 7,954,150 B2 | 5/2011 | Croft et al. |
| 7,958,087 B2 | 6/2011 | Blumenau |
| 7,958,494 B2 | 6/2011 | Chaar et al. |
| 7,962,900 B2 | 6/2011 | Barraclough et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,974,992 B2 | 7/2011 | Fastabend et al. |
| 7,975,000 B2 | 7/2011 | Dixon et al. |
| 7,991,559 B2 | 8/2011 | Dzekunov et al. |
| 7,991,747 B1 | 8/2011 | Upadhyay et al. |
| 7,996,372 B2 | 8/2011 | Rubel, Jr. |
| 8,005,891 B2 | 8/2011 | Knowles et al. |
| 8,010,612 B2 | 8/2011 | Costea et al. |
| 8,010,720 B2 | 8/2011 | Iwaoka et al. |
| 8,019,881 B2 | 9/2011 | Sandhu et al. |
| 8,020,206 B2 | 9/2011 | Hubbard et al. |
| 8,024,384 B2 | 9/2011 | Prabhakar et al. |
| 8,032,721 B2 | 10/2011 | Murai |
| 8,036,374 B2 | 10/2011 | Noble, Jr. |
| 8,037,409 B2 | 10/2011 | Jacob et al. |
| 8,041,749 B2 | 10/2011 | Beck |
| 8,041,763 B2 | 10/2011 | Kordun et al. |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,090,754 B2 | 1/2012 | Schmidt et al. |
| 8,095,923 B2 | 1/2012 | Harvey et al. |
| 8,099,709 B2 | 1/2012 | Baikov et al. |
| 8,103,962 B2 | 1/2012 | Embley et al. |
| 8,117,441 B2 | 2/2012 | Xurien et al. |
| 8,135,815 B2 | 3/2012 | Mayer |
| 8,146,054 B2 | 3/2012 | Baker et al. |
| 8,146,074 B2 | 3/2012 | Ito et al. |
| 8,150,717 B2 | 4/2012 | Whitmore |
| 8,156,105 B2 | 4/2012 | Altounian et al. |
| 8,156,158 B2 | 4/2012 | Rolls et al. |
| 8,156,159 B2 | 4/2012 | Ebrahimi et al. |
| 8,166,406 B1 * | 4/2012 | Goldfeder ............ G06F 21/6263 709/224 |
| 8,176,061 B2 | 5/2012 | Swanbeck et al. |
| 8,176,177 B2 | 5/2012 | Sussman et al. |
| 8,176,334 B2 | 5/2012 | Vainstein |
| 8,176,470 B2 | 5/2012 | Klumpp et al. |
| 8,180,759 B2 | 5/2012 | Hamzy |
| 8,181,151 B2 | 5/2012 | Sedukhin et al. |
| 8,185,409 B2 | 5/2012 | Putnam et al. |
| 8,196,176 B2 | 6/2012 | Berteau et al. |
| 8,205,093 B2 | 6/2012 | Argott |
| 8,205,140 B2 | 6/2012 | Hafeez et al. |
| 8,214,362 B1 | 7/2012 | Djabarov |
| 8,214,803 B2 | 7/2012 | Horii et al. |

(56) References Cited

U.S. PATENT DOCUMENTS

| | | |
|---|---|---|
| 8,234,377 B2 | 7/2012 | Cohn |
| 8,239,244 B2 | 8/2012 | Ginsberg et al. |
| 8,250,051 B2 | 8/2012 | Bugir et al. |
| 8,255,468 B2 | 8/2012 | Vitaldevara et al. |
| 8,260,262 B2 | 9/2012 | Ben Ayed |
| 8,261,362 B2 | 9/2012 | Goodwin et al. |
| 8,266,231 B1 | 9/2012 | Golovin et al. |
| 8,275,632 B2 | 9/2012 | Awaraji et al. |
| 8,275,793 B2 | 9/2012 | Ahmad et al. |
| 8,286,239 B1 | 10/2012 | Sutton |
| 8,312,549 B2 | 11/2012 | Goldberg et al. |
| 8,316,237 B1 | 11/2012 | Felsher et al. |
| 8,332,908 B2 | 12/2012 | Hatakeyama et al. |
| 8,340,999 B2 | 12/2012 | Kumaran et al. |
| 8,341,405 B2 | 12/2012 | Meijer et al. |
| 8,346,929 B1 | 1/2013 | Lai |
| 8,364,713 B2 | 1/2013 | Pollard |
| 8,370,224 B2 | 2/2013 | Grewal |
| 8,370,794 B2 | 2/2013 | Moosmann et al. |
| 8,380,630 B2 | 2/2013 | Felsher |
| 8,380,743 B2 | 2/2013 | Converting et al. |
| 8,381,180 B2 | 2/2013 | Rostoker |
| 8,381,297 B2 | 2/2013 | Touboul |
| 8,386,314 B2 | 2/2013 | Kirkby et al. |
| 8,392,982 B2 | 3/2013 | Harris et al. |
| 8,418,226 B2 | 4/2013 | Gardner |
| 8,423,954 B2 | 4/2013 | Ronen et al. |
| 8,429,179 B1 | 4/2013 | Mirhaji |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,463,247 B2 | 6/2013 | Misiag |
| 8,464,311 B2 | 6/2013 | Ashley et al. |
| 8,468,244 B2 | 6/2013 | Redlich et al. |
| 8,473,324 B2 | 6/2013 | Alvarez et al. |
| 8,474,012 B2 | 6/2013 | Ahmed et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,515,988 B2 | 8/2013 | Jones et al. |
| 8,516,076 B2 | 8/2013 | Thomas |
| 8,527,337 B1 | 9/2013 | Lim et al. |
| 8,533,746 B2 | 9/2013 | Nolan et al. |
| 8,533,844 B2 | 9/2013 | Mahaffey et al. |
| 8,538,817 B2 | 9/2013 | Wilson |
| 8,539,359 B2 | 9/2013 | Rapaport et al. |
| 8,539,437 B2 | 9/2013 | Finlayson et al. |
| 8,560,645 B2 | 10/2013 | Linden et al. |
| 8,560,841 B2 | 10/2013 | Chin et al. |
| 8,560,956 B2 | 10/2013 | Curtis et al. |
| 8,561,100 B2 | 10/2013 | Hu et al. |
| 8,561,153 B2 | 10/2013 | Grason et al. |
| 8,565,729 B2 | 10/2013 | Moseler et al. |
| 8,566,726 B2 | 10/2013 | Dixon et al. |
| 8,566,938 B1 | 10/2013 | Prakash et al. |
| 8,571,909 B2 | 10/2013 | Miller et al. |
| 8,572,717 B2 | 10/2013 | Narayanaswamy |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,601,467 B2 | 12/2013 | Hofhansl et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,615,549 B2 | 12/2013 | Knowles et al. |
| 8,615,731 B2 | 12/2013 | Doshi |
| 8,620,952 B2 | 12/2013 | Bennett et al. |
| 8,621,637 B2 | 12/2013 | Al-Harbi et al. |
| 8,626,671 B2 | 1/2014 | Federgreen |
| 8,627,114 B2 | 1/2014 | Resch et al. |
| 8,630,961 B2 | 1/2014 | Beilby et al. |
| 8,631,048 B1 | 1/2014 | Davis et al. |
| 8,640,110 B2 | 1/2014 | Kopp et al. |
| 8,646,072 B1 | 2/2014 | Savant |
| 8,650,399 B2 | 2/2014 | Le Bihan et al. |
| 8,655,939 B2 | 2/2014 | Redlich et al. |
| 8,656,265 B1 | 2/2014 | Paulin et al. |
| 8,656,456 B2 | 2/2014 | Maxson et al. |
| 8,661,036 B2 | 2/2014 | Turski et al. |
| 8,667,074 B1 | 3/2014 | Farkas |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,689,292 B2 | 4/2014 | Williams et al. |
| 8,693,689 B2 | 4/2014 | Belenkiy et al. |
| 8,700,524 B2 | 4/2014 | Williams et al. |
| 8,700,699 B2 | 4/2014 | Shen et al. |
| 8,706,742 B1 | 4/2014 | Ravid et al. |
| 8,707,451 B2 | 4/2014 | Ture et al. |
| 8,712,813 B2 | 4/2014 | King |
| 8,713,098 B1 | 4/2014 | Adya et al. |
| 8,713,638 B2 | 4/2014 | Hu et al. |
| 8,719,366 B2 | 5/2014 | Mathew et al. |
| 8,732,839 B2 | 5/2014 | Hohl |
| 8,744,894 B2 | 6/2014 | Christiansen et al. |
| 8,751,285 B2 | 6/2014 | Deb et al. |
| 8,762,406 B2 | 6/2014 | Ho et al. |
| 8,762,413 B2 | 6/2014 | Graham, Jr. et al. |
| 8,763,071 B2 | 6/2014 | Sinha et al. |
| 8,763,082 B2 | 6/2014 | Huber et al. |
| 8,763,131 B2 | 6/2014 | Archer et al. |
| 8,767,947 B1 | 7/2014 | Ristock et al. |
| 8,769,242 B2 | 7/2014 | Tkac et al. |
| 8,769,412 B2 | 7/2014 | Gill et al. |
| 8,769,671 B2 | 7/2014 | Shraim et al. |
| 8,776,241 B2 | 7/2014 | Zaitsev |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,781 B2 | 7/2014 | Grossi et al. |
| 8,793,809 B2 | 7/2014 | Falkenburg et al. |
| 8,799,984 B2 | 8/2014 | Ahn |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |
| 8,812,752 B1 | 8/2014 | Shih et al. |
| 8,812,766 B2 | 8/2014 | Kranendonk et al. |
| 8,813,028 B2 | 8/2014 | Farooqi |
| 8,813,177 B2 | 8/2014 | Srour et al. |
| 8,819,253 B2 | 8/2014 | Simeloff et al. |
| 8,819,617 B1 | 8/2014 | Koenig et al. |
| 8,819,800 B2 | 8/2014 | Gao et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,843,487 B2 | 9/2014 | Mcgraw et al. |
| 8,843,745 B2 | 9/2014 | Roberts, Jr. |
| 8,849,757 B2 | 9/2014 | Kruglick |
| 8,856,534 B2 | 10/2014 | Khosravi et al. |
| 8,856,936 B2 | 10/2014 | Datta Ray et al. |
| 8,862,507 B2 | 10/2014 | Sandhu et al. |
| 8,863,261 B2 | 10/2014 | Yang |
| 8,875,232 B2 | 10/2014 | Blom et al. |
| 8,893,078 B2 | 11/2014 | Schaude et al. |
| 8,893,286 B1 | 11/2014 | Oliver |
| 8,893,297 B2 | 11/2014 | Eversoll et al. |
| 8,904,494 B2 | 12/2014 | Kindler et al. |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |

(56) References Cited

U.S. PATENT DOCUMENTS

| | | | |
|---|---|---|---|
| 8,918,632 B1 | 12/2014 | Sartor |
| 8,924,388 B2 | 12/2014 | Elliot et al. |
| 8,930,896 B1 | 1/2015 | Wiggins |
| 8,930,897 B2 | 1/2015 | Nassar |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,938,221 B2 | 1/2015 | Brazier et al. |
| 8,943,076 B2 | 1/2015 | Stewart et al. |
| 8,943,548 B2 | 1/2015 | Drokov et al. |
| 8,943,602 B2 | 1/2015 | Roy et al. |
| 8,949,137 B2 | 2/2015 | Crapo et al. |
| 8,955,038 B2 | 2/2015 | Nicodemus et al. |
| 8,959,568 B2 | 2/2015 | Hudis et al. |
| 8,959,584 B2 | 2/2015 | Piliouras |
| 8,966,575 B2 | 2/2015 | Mcquay et al. |
| 8,966,597 B1 | 2/2015 | Saylor et al. |
| 8,973,108 B1 | 3/2015 | Roth et al. |
| 8,977,234 B2 | 3/2015 | Chava |
| 8,977,643 B2 | 3/2015 | Schindlauer et al. |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,001,673 B2 | 4/2015 | Birdsall et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,014,661 B2 | 4/2015 | Decharms |
| 9,015,796 B1 | 4/2015 | Fujioka |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,047,583 B2 | 6/2015 | Patton et al. |
| 9,047,639 B1 | 6/2015 | Quintiliani et al. |
| 9,049,244 B2 | 6/2015 | Prince et al. |
| 9,049,314 B2 | 6/2015 | Pugh et al. |
| 9,055,071 B1 | 6/2015 | Gates et al. |
| 9,058,590 B2 | 6/2015 | Criddle et al. |
| 9,064,033 B2 | 6/2015 | Jin et al. |
| 9,069,940 B2 | 6/2015 | Hars |
| 9,076,231 B1 | 7/2015 | Hill et al. |
| 9,077,736 B2 | 7/2015 | Werth et al. |
| 9,081,952 B2 | 7/2015 | Sagi et al. |
| 9,087,090 B1 | 7/2015 | Cormier et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,337 B1 | 8/2015 | Battré et al. |
| 9,100,778 B2 | 8/2015 | Stogaitis et al. |
| 9,106,691 B1 | 8/2015 | Burger et al. |
| 9,106,710 B1 | 8/2015 | Feimster |
| 9,110,918 B1 | 8/2015 | Rajaa et al. |
| 9,111,105 B2 | 8/2015 | Barton et al. |
| 9,111,295 B2 | 8/2015 | Tietzen et al. |
| 9,123,330 B1 | 9/2015 | Sharifi et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,135,444 B2 | 9/2015 | Carter et al. |
| 9,141,823 B2 | 9/2015 | Dawson |
| 9,141,911 B2 | 9/2015 | Zhao et al. |
| 9,152,818 B1 | 10/2015 | Hathaway et al. |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,165,036 B2 | 10/2015 | Mehra |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,026 B1 | 12/2015 | Reeves |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,218,596 B2 | 12/2015 | Ronca et al. |
| 9,224,009 B1 | 12/2015 | Liu et al. |
| 9,230,036 B2 | 1/2016 | Davis |
| 9,231,935 B1 | 1/2016 | Bridge et al. |
| 9,232,040 B2 | 1/2016 | Barash et al. |
| 9,235,476 B2 | 1/2016 | Mchugh et al. |
| 9,240,987 B2 | 1/2016 | Barrett-Bowen et al. |
| 9,241,259 B2 | 1/2016 | Daniela et al. |
| 9,245,126 B2 | 1/2016 | Christodorescu et al. |
| 9,245,266 B2 | 1/2016 | Hardt |
| 9,253,609 B2 | 2/2016 | Hosier, Jr. |
| 9,264,443 B2 | 2/2016 | Weisman |
| 9,274,858 B2 | 3/2016 | Milliron et al. |
| 9,280,581 B1 | 3/2016 | Grimes et al. |
| 9,286,149 B2 | 3/2016 | Sampson et al. |
| 9,286,282 B2 | 3/2016 | Ling, III et al. |
| 9,288,118 B1 | 3/2016 | Pattan |
| 9,288,556 B2 | 3/2016 | Kim et al. |
| 9,294,498 B1 | 3/2016 | Yampolskiy et al. |
| 9,299,050 B2 | 3/2016 | Stiffler et al. |
| 9,306,939 B2 | 4/2016 | Chan et al. |
| 9,317,697 B2 | 4/2016 | Maier et al. |
| 9,317,715 B2 | 4/2016 | Schuette et al. |
| 9,325,731 B2 | 4/2016 | Mcgeehan |
| 9,336,184 B2 | 5/2016 | Mital et al. |
| 9,336,220 B2 | 5/2016 | Li et al. |
| 9,336,324 B2 | 5/2016 | Lomme et al. |
| 9,336,332 B2 | 5/2016 | Davis et al. |
| 9,336,400 B2 | 5/2016 | Milman et al. |
| 9,338,188 B1 | 5/2016 | Ahn |
| 9,342,706 B2 | 5/2016 | Chawla et al. |
| 9,344,297 B2 | 5/2016 | Shah et al. |
| 9,344,424 B2 | 5/2016 | Tenenboym et al. |
| 9,344,484 B2 | 5/2016 | Ferris |
| 9,348,802 B2 | 5/2016 | Massand |
| 9,348,862 B2 | 5/2016 | Kawecki, III |
| 9,348,929 B2 | 5/2016 | Eberlein |
| 9,349,016 B1 | 5/2016 | Brisebois et al. |
| 9,350,718 B2 | 5/2016 | Sondhi et al. |
| 9,355,157 B2 | 5/2016 | Mohammed et al. |
| 9,356,961 B1 | 5/2016 | Todd et al. |
| 9,361,446 B1 * | 6/2016 | Demirjian ............ H04L 63/1441 |
| 9,369,488 B2 | 6/2016 | Woods et al. |
| 9,372,869 B2 | 6/2016 | Joseph et al. |
| 9,374,693 B1 * | 6/2016 | Olincy .............. H04M 3/42365 |
| 9,384,199 B2 | 7/2016 | Thereska et al. |
| 9,384,357 B2 | 7/2016 | Patil et al. |
| 9,386,078 B2 | 7/2016 | Reno et al. |
| 9,386,104 B2 | 7/2016 | Adams et al. |
| 9,395,959 B2 | 7/2016 | Hatfield et al. |
| 9,396,332 B2 | 7/2016 | Abrams et al. |
| 9,401,900 B2 | 7/2016 | Levasseur et al. |
| 9,411,967 B2 | 8/2016 | Parecki et al. |
| 9,411,982 B1 | 8/2016 | Dippenaar et al. |
| 9,417,859 B2 | 8/2016 | Gounares et al. |
| 9,418,221 B2 | 8/2016 | Turgeman |
| 9,424,021 B2 | 8/2016 | Zamir |
| 9,424,414 B1 * | 8/2016 | Demirjian ................ G06F 21/36 |
| 9,426,177 B2 | 8/2016 | Wang et al. |
| 9,450,940 B2 | 9/2016 | Belov et al. |
| 9,460,136 B1 | 10/2016 | Todd et al. |
| 9,460,171 B2 | 10/2016 | Marrelli et al. |
| 9,460,307 B2 | 10/2016 | Breslau et al. |
| 9,461,876 B2 | 10/2016 | Van Dusen et al. |
| 9,462,009 B1 | 10/2016 | Kolman et al. |

(56) References Cited

U.S. PATENT DOCUMENTS

| | | |
|---|---|---|
| 9,465,702 B2 | 10/2016 | Gventer et al. |
| 9,465,800 B2 | 10/2016 | Lacey |
| 9,473,446 B2 | 10/2016 | Vijay et al. |
| 9,473,505 B1 | 10/2016 | Asano et al. |
| 9,473,535 B2 | 10/2016 | Sartor |
| 9,477,523 B1 | 10/2016 | Warman et al. |
| 9,477,660 B2 | 10/2016 | Scott et al. |
| 9,477,685 B1 | 10/2016 | Leung et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,495,547 B1 | 11/2016 | Schepis et al. |
| 9,501,523 B2 | 11/2016 | Hyatt et al. |
| 9,507,960 B2 | 11/2016 | Bell et al. |
| 9,509,674 B1 | 11/2016 | Nasserbakht et al. |
| 9,509,702 B2 | 11/2016 | Grigg et al. |
| 9,514,231 B2 | 12/2016 | Eden |
| 9,516,012 B2 | 12/2016 | Chochois et al. |
| 9,521,166 B2 | 12/2016 | Wilson |
| 9,524,500 B2 | 12/2016 | Dave et al. |
| 9,529,989 B2 | 12/2016 | Kling et al. |
| 9,536,108 B2 | 1/2017 | Powell et al. |
| 9,537,546 B2 | 1/2017 | Cordeiro et al. |
| 9,542,568 B2 | 1/2017 | Francis et al. |
| 9,549,047 B1 | 1/2017 | Fredinburg et al. |
| 9,552,395 B2 | 1/2017 | Bayer et al. |
| 9,552,470 B2 | 1/2017 | Turgeman et al. |
| 9,553,918 B1 | 1/2017 | Manion et al. |
| 9,558,497 B2 | 1/2017 | Carvalho |
| 9,569,752 B2 | 2/2017 | Deering et al. |
| 9,571,509 B1 | 2/2017 | Satish et al. |
| 9,571,526 B2 | 2/2017 | Sartor |
| 9,571,559 B2 | 2/2017 | Raleigh et al. |
| 9,571,991 B1 | 2/2017 | Brizendine et al. |
| 9,576,289 B2 | 2/2017 | Henderson et al. |
| 9,578,060 B1 | 2/2017 | Brisebois et al. |
| 9,578,173 B2 | 2/2017 | Sangh et al. |
| 9,582,681 B2 | 2/2017 | Mishra |
| 9,584,964 B2 | 2/2017 | Pelkey |
| 9,589,110 B2 | 3/2017 | Carey et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,652 B2 | 4/2017 | Slater |
| 9,619,661 B1 | 4/2017 | Finkelstein |
| 9,621,357 B2 | 4/2017 | Williams et al. |
| 9,621,566 B2 | 4/2017 | Gupta et al. |
| 9,626,124 B2 | 4/2017 | Lipinski et al. |
| 9,626,680 B1 | 4/2017 | Ryan et al. |
| 9,629,064 B2 | 4/2017 | Graves et al. |
| 9,642,008 B2 | 5/2017 | Wyatt et al. |
| 9,646,095 B1 | 5/2017 | Gottlieb et al. |
| 9,647,949 B2 | 5/2017 | Varki et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasu et al. |
| 9,665,733 B1 | 5/2017 | Sills et al. |
| 9,665,883 B2 | 5/2017 | Roullier et al. |
| 9,672,053 B2 | 6/2017 | Tang et al. |
| 9,672,355 B2 | 6/2017 | Titonis et al. |
| 9,678,794 B1 | 6/2017 | Barrett et al. |
| 9,691,090 B1 | 6/2017 | Barday |
| 9,697,368 B2 | 7/2017 | Dharawat |
| 9,699,209 B2 | 7/2017 | Ng et al. |
| 9,703,549 B2 | 7/2017 | Dufresne |
| 9,704,103 B2 | 7/2017 | Suskind et al. |
| 9,705,840 B2 | 7/2017 | Pujare et al. |
| 9,705,880 B2 | 7/2017 | Siris |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,734,148 B2 | 8/2017 | Bendersky et al. |
| 9,734,255 B2 | 8/2017 | Jiang |
| 9,736,004 B2 | 8/2017 | Jung et al. |
| 9,740,985 B2 | 8/2017 | Byron et al. |
| 9,740,987 B2 | 8/2017 | Dolan |
| 9,749,408 B2 | 8/2017 | Subramani et al. |
| 9,754,091 B2 | 9/2017 | Kode et al. |
| 9,756,059 B2 | 9/2017 | Demirjian et al. |
| 9,760,620 B2 | 9/2017 | Nachnani et al. |
| 9,760,635 B2 | 9/2017 | Bliss et al. |
| 9,760,697 B1 | 9/2017 | Walker |
| 9,760,849 B2 | 9/2017 | Vinnakota et al. |
| 9,762,553 B2 | 9/2017 | Ford et al. |
| 9,767,202 B2 | 9/2017 | Darby et al. |
| 9,767,309 B1 | 9/2017 | Patel et al. |
| 9,769,124 B2 | 9/2017 | Yan |
| 9,773,269 B1 * | 9/2017 | Lazarus ............... G06F 21/00 |
| 9,785,795 B2 | 10/2017 | Grondin et al. |
| 9,787,671 B1 | 10/2017 | Bogrett |
| 9,798,749 B2 | 10/2017 | Saner |
| 9,798,826 B2 | 10/2017 | Wilson et al. |
| 9,798,896 B2 | 10/2017 | Jakobsson |
| 9,800,605 B2 | 10/2017 | Baikalov et al. |
| 9,800,606 B1 | 10/2017 | Yumer |
| 9,804,649 B2 | 10/2017 | Cohen et al. |
| 9,804,928 B2 | 10/2017 | Davis et al. |
| 9,805,381 B2 | 10/2017 | Frank et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,819,684 B2 | 11/2017 | Cernoch et al. |
| 9,825,928 B2 | 11/2017 | Lelcuk |
| 9,830,563 B2 | 11/2017 | Paknad |
| 9,832,633 B2 | 11/2017 | Gerber, Jr. et al. |
| 9,836,598 B2 | 12/2017 | Iyer et al. |
| 9,838,407 B1 | 12/2017 | Oprea et al. |
| 9,838,839 B2 | 12/2017 | Vudali et al. |
| 9,841,969 B2 | 12/2017 | Seibert, Jr. et al. |
| 9,842,042 B2 | 12/2017 | Chhatwal et al. |
| 9,842,349 B2 | 12/2017 | Sawczuk et al. |
| 9,848,005 B2 | 12/2017 | Ardeli et al. |
| 9,848,061 B1 | 12/2017 | Jain et al. |
| 9,852,150 B2 | 12/2017 | Sharpe et al. |
| 9,853,959 B1 | 12/2017 | Kapczynski et al. |
| 9,860,226 B2 | 1/2018 | Thormaehlen |
| 9,864,735 B1 | 1/2018 | Lamprecht |
| 9,876,825 B2 | 1/2018 | Amar et al. |
| 9,877,138 B1 | 1/2018 | Franklin |
| 9,880,157 B2 | 1/2018 | Levak et al. |
| 9,882,935 B2 | 1/2018 | Barday |
| 9,887,965 B2 | 2/2018 | Kay et al. |
| 9,888,377 B1 | 2/2018 | Mccorkendale et al. |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,894,076 B2 | 2/2018 | Li et al. |
| 9,898,613 B1 | 2/2018 | Swerdlow et al. |
| 9,898,739 B2 | 2/2018 | Monastyrsky et al. |
| 9,898,769 B2 | 2/2018 | Barday |
| 9,912,625 B2 | 3/2018 | Muth et al. |
| 9,912,677 B2 | 3/2018 | Chien |
| 9,912,810 B2 | 3/2018 | Segre et al. |
| 9,916,703 B2 | 3/2018 | Levinson et al. |
| 9,922,124 B2 | 3/2018 | Rathod |
| 9,923,927 B1 | 3/2018 | Mcclintock et al. |
| 9,928,379 B1 | 3/2018 | Hoffer |
| 9,934,493 B2 | 4/2018 | Castinado et al. |
| 9,934,544 B1 | 4/2018 | Whitfield et al. |
| 9,936,127 B2 | 4/2018 | Todasco |
| 9,942,214 B1 * | 4/2018 | Burciu ............... H04L 63/08 |
| 9,942,244 B2 | 4/2018 | Lahoz et al. |
| 9,942,276 B2 | 4/2018 | Sartor |
| 9,946,897 B2 | 4/2018 | Lovin |
| 9,948,652 B2 | 4/2018 | Yu et al. |
| 9,948,663 B1 | 4/2018 | Wang et al. |
| 9,953,189 B2 | 4/2018 | Cook et al. |
| 9,954,879 B1 | 4/2018 | Sadaghiani et al. |
| 9,954,883 B2 | 4/2018 | Ahuja et al. |

(56) References Cited

U.S. PATENT DOCUMENTS

| | | |
|---|---|---|
| 9,959,551 B1 | 5/2018 | Schermerhorn et al. |
| 9,959,582 B2 | 5/2018 | Sukman et al. |
| 9,961,070 B2 | 5/2018 | Tang |
| 9,973,518 B2 | 5/2018 | Lee et al. |
| 9,973,585 B2 | 5/2018 | Ruback et al. |
| 9,977,904 B2 | 5/2018 | Khan et al. |
| 9,977,920 B2 | 5/2018 | Danielson et al. |
| 9,983,936 B2 | 5/2018 | Dornemann et al. |
| 9,984,252 B2 | 5/2018 | Pollard |
| 9,990,499 B2 | 6/2018 | Chan et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,019,591 B1 | 7/2018 | Beguin |
| 10,019,741 B2 | 7/2018 | Hesselink |
| 10,021,143 B2 | 7/2018 | Cabrera et al. |
| 10,025,804 B2 | 7/2018 | Vranyes et al. |
| 10,025,836 B2 | 7/2018 | Batchu et al. |
| 10,028,226 B2 | 7/2018 | Ayyagari et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,055,869 B2 | 8/2018 | Borrelli et al. |
| 10,061,847 B2 | 8/2018 | Mohammed et al. |
| 10,069,858 B2 | 9/2018 | Robinson et al. |
| 10,069,914 B1 | 9/2018 | Smith |
| 10,073,924 B2 | 9/2018 | Karp et al. |
| 10,075,437 B1 | 9/2018 | Costigan et al. |
| 10,075,451 B1 | 9/2018 | Hall et al. |
| 10,084,817 B2 | 9/2018 | Saher et al. |
| 10,091,214 B2 | 10/2018 | Godlewski et al. |
| 10,091,312 B1 | 10/2018 | Khanwalkar et al. |
| 10,097,551 B2 | 10/2018 | Chan et al. |
| 10,102,533 B2 | 10/2018 | Barday |
| 10,108,409 B2 | 10/2018 | Pirzadeh et al. |
| 10,122,663 B2 | 11/2018 | Hu et al. |
| 10,122,760 B2 | 11/2018 | Terrill et al. |
| 10,127,403 B2 | 11/2018 | Kong et al. |
| 10,129,211 B2 | 11/2018 | Heath |
| 10,140,666 B1 | 11/2018 | Wang et al. |
| 10,142,113 B2 | 11/2018 | Zaidi et al. |
| 10,152,560 B2 | 12/2018 | Potiagalov et al. |
| 10,158,676 B2 | 12/2018 | Barday |
| 10,165,011 B2 | 12/2018 | Barday |
| 10,169,762 B2 | 1/2019 | Ogawa |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,187,363 B2 | 1/2019 | Smirnoff et al. |
| 10,187,394 B2 | 1/2019 | Bar et al. |
| 10,188,950 B2 | 1/2019 | Biswas et al. |
| 10,204,154 B2 | 2/2019 | Barday et al. |
| 10,205,994 B2 | 2/2019 | Splaine et al. |
| 10,212,134 B2 | 2/2019 | Rai |
| 10,212,175 B2 | 2/2019 | Seul et al. |
| 10,223,533 B2 | 3/2019 | Dawson |
| 10,230,571 B2 | 3/2019 | Rangasamy et al. |
| 10,250,594 B2 | 4/2019 | Chathoth et al. |
| 10,255,602 B2 | 4/2019 | Wang |
| 10,257,127 B2 | 4/2019 | Dotan-Cohen et al. |
| 10,257,181 B1 | 4/2019 | Sherif et al. |
| 10,268,838 B2 | 4/2019 | Yadgiri et al. |
| 10,275,221 B2 | 4/2019 | Thattai et al. |
| 10,275,614 B2 | 4/2019 | Barday et al. |
| 10,282,370 B1 | 5/2019 | Barday et al. |
| 10,282,559 B2 | 5/2019 | Barday et al. |
| 10,284,604 B2 | 5/2019 | Barday et al. |
| 10,289,584 B2 | 5/2019 | Chiba |
| 10,289,857 B1 | 5/2019 | Brinskelle |
| 10,289,866 B2 | 5/2019 | Barday et al. |
| 10,289,867 B2 | 5/2019 | Barday et al. |
| 10,289,870 B2 | 5/2019 | Barday et al. |
| 10,296,504 B2 | 5/2019 | Hock et al. |
| 10,304,442 B1 | 5/2019 | Rudden et al. |
| 10,310,723 B2 | 6/2019 | Rathod |
| 10,311,042 B1 | 6/2019 | Kumar |
| 10,311,475 B2 | 6/2019 | Yuasa |
| 10,311,492 B2 | 6/2019 | Gelfenbeyn et al. |
| 10,318,761 B2 | 6/2019 | Barday et al. |
| 10,320,940 B1 | 6/2019 | Brennan et al. |
| 10,324,960 B1 | 6/2019 | Skvortsov et al. |
| 10,326,768 B2 | 6/2019 | Verweyst et al. |
| 10,326,798 B2 | 6/2019 | Lambert |
| 10,326,841 B2 | 6/2019 | Bradley et al. |
| 10,331,689 B2 | 6/2019 | Sorrentino et al. |
| 10,331,904 B2 | 6/2019 | Sher-Jan et al. |
| 10,333,975 B2 | 6/2019 | Soman et al. |
| 10,346,186 B2 | 7/2019 | Kalyanpur |
| 10,346,635 B2 | 7/2019 | Kumar et al. |
| 10,346,637 B2 | 7/2019 | Barday et al. |
| 10,346,638 B2 | 7/2019 | Barday et al. |
| 10,346,849 B2 | 7/2019 | Ionescu et al. |
| 10,348,726 B2 | 7/2019 | Caluwaert |
| 10,348,775 B2 | 7/2019 | Barday |
| 10,353,673 B2 | 7/2019 | Barday et al. |
| 10,361,857 B2 | 7/2019 | Woo |
| 10,366,241 B2 | 7/2019 | Sartor |
| 10,373,119 B2 | 8/2019 | Driscoll et al. |
| 10,373,409 B2 | 8/2019 | White et al. |
| 10,375,115 B2 | 8/2019 | Mallya |
| 10,387,559 B1 | 8/2019 | Wendt et al. |
| 10,387,577 B2 | 8/2019 | Hill et al. |
| 10,387,657 B2 | 8/2019 | Belfiore, Jr. et al. |
| 10,387,952 B1 | 8/2019 | Sandhu et al. |
| 10,395,201 B2 | 8/2019 | Vescio |
| 10,402,545 B2 | 9/2019 | Gorfein et al. |
| 10,404,729 B2 | 9/2019 | Turgeman |
| 10,417,401 B2 | 9/2019 | Votaw et al. |
| 10,417,621 B2 | 9/2019 | Cassel et al. |
| 10,419,476 B2 | 9/2019 | Parekh |
| 10,423,985 B1 | 9/2019 | Dutta et al. |
| 10,425,492 B2 | 9/2019 | Comstock et al. |
| 10,430,608 B2 | 10/2019 | Peri et al. |
| 10,435,350 B2 | 10/2019 | Ito et al. |
| 10,437,412 B2 | 10/2019 | Barday et al. |
| 10,437,860 B2 | 10/2019 | Barday et al. |
| 10,438,016 B2 | 10/2019 | Barday et al. |
| 10,438,273 B2 | 10/2019 | Burns et al. |
| 10,440,062 B2 | 10/2019 | Barday et al. |
| 10,445,508 B2 | 10/2019 | Sher-Jan et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,453,076 B2 | 10/2019 | Parekh et al. |
| 10,453,092 B1 | 10/2019 | Wang et al. |
| 10,454,934 B2 | 10/2019 | Parimi et al. |
| 10,481,763 B2 | 11/2019 | Bartkiewicz et al. |
| 10,489,454 B1 | 11/2019 | Chen |
| 10,503,926 B2 | 12/2019 | Barday et al. |
| 10,509,644 B2 | 12/2019 | Shoavi et al. |
| 10,510,031 B2 | 12/2019 | Barday et al. |
| 10,521,623 B2 | 12/2019 | Rodriguez et al. |
| 10,534,851 B1 | 1/2020 | Chan et al. |
| 10,535,081 B2 | 1/2020 | Ferreira et al. |
| 10,536,475 B1 | 1/2020 | Mccorkle, Jr. et al. |
| 10,536,478 B2 | 1/2020 | Kirti et al. |
| 10,540,212 B2 | 1/2020 | Feng et al. |
| 10,541,938 B1 | 1/2020 | Timmerman et al. |
| 10,546,135 B1 | 1/2020 | Kassoumeh et al. |
| 10,552,462 B1 | 2/2020 | Hart |
| 10,558,809 B1 | 2/2020 | Joyce et al. |
| 10,558,821 B2 | 2/2020 | Barday et al. |
| 10,564,815 B2 | 2/2020 | Soon-Shiong |
| 10,564,935 B2 | 2/2020 | Barday et al. |
| 10,564,936 B2 | 2/2020 | Barday et al. |
| 10,565,161 B2 | 2/2020 | Barday et al. |
| 10,565,236 B1 | 2/2020 | Barday et al. |
| 10,567,439 B2 | 2/2020 | Barday |
| 10,567,517 B2 | 2/2020 | Weinig et al. |

(56) References Cited

U.S. PATENT DOCUMENTS

| | | |
|---|---|---|
| 10,572,684 B2 | 2/2020 | Lafever et al. |
| 10,572,686 B2 | 2/2020 | Barday et al. |
| 10,574,705 B2 | 2/2020 | Barday et al. |
| 10,581,825 B2 | 3/2020 | Poschel et al. |
| 10,592,648 B2 | 3/2020 | Barday et al. |
| 10,592,692 B2 | 3/2020 | Brannon et al. |
| 10,599,456 B2 | 3/2020 | Lissack |
| 10,606,916 B2 | 3/2020 | Brannon et al. |
| 10,613,971 B1 | 4/2020 | Vasikarla |
| 10,628,553 B1 | 4/2020 | Murrish et al. |
| 10,645,102 B2 | 5/2020 | Hamdi |
| 10,645,548 B2 | 5/2020 | Reynolds et al. |
| 10,649,630 B1 | 5/2020 | Vora et al. |
| 10,650,408 B1 | 5/2020 | Andersen et al. |
| 10,657,469 B2 | 5/2020 | Bade et al. |
| 10,657,504 B1 | 5/2020 | Zimmerman et al. |
| 10,659,566 B1 | 5/2020 | Luah et al. |
| 10,671,749 B2 | 6/2020 | Felice-Steele et al. |
| 10,671,760 B2 | 6/2020 | Esmailzadeh et al. |
| 10,678,945 B2 | 6/2020 | Barday et al. |
| 10,685,140 B2 | 6/2020 | Barday et al. |
| 10,706,176 B2 | 7/2020 | Brannon et al. |
| 10,706,226 B2 | 7/2020 | Byun et al. |
| 10,708,305 B2 | 7/2020 | Barday et al. |
| 10,713,387 B2 | 7/2020 | Brannon et al. |
| 10,726,145 B2 | 7/2020 | Duminy et al. |
| 10,726,153 B2 | 7/2020 | Nerurkar et al. |
| 10,726,158 B2 | 7/2020 | Brannon et al. |
| 10,732,865 B2 | 8/2020 | Jain et al. |
| 10,735,388 B2 | 8/2020 | Rose et al. |
| 10,740,487 B2 | 8/2020 | Barday et al. |
| 10,747,893 B2 | 8/2020 | Kiriyama et al. |
| 10,747,897 B2 | 8/2020 | Cook |
| 10,749,870 B2 | 8/2020 | Brouillette et al. |
| 10,762,213 B2 | 9/2020 | Rudek et al. |
| 10,762,230 B2 | 9/2020 | Ancin et al. |
| 10,762,236 B2 | 9/2020 | Brannon et al. |
| 10,769,302 B2 | 9/2020 | Barday et al. |
| 10,769,303 B2 | 9/2020 | Brannon et al. |
| 10,776,510 B2 | 9/2020 | Antonelli et al. |
| 10,776,518 B2 | 9/2020 | Barday et al. |
| 10,778,792 B1 | 9/2020 | Handy Bosma et al. |
| 10,783,256 B2 | 9/2020 | Brannon et al. |
| 10,785,173 B2 | 9/2020 | Willett et al. |
| 10,785,299 B2 | 9/2020 | Gupta et al. |
| 10,789,594 B2 | 9/2020 | Moshir et al. |
| 10,791,150 B2 | 9/2020 | Barday et al. |
| 10,795,527 B1 | 10/2020 | Legge et al. |
| 10,796,020 B2 | 10/2020 | Barday et al. |
| 10,796,260 B2 | 10/2020 | Brannon et al. |
| 10,798,133 B2 | 10/2020 | Barday et al. |
| 10,803,196 B2 | 10/2020 | Bodegas Martinez et al. |
| 10,805,331 B2 | 10/2020 | Boyer et al. |
| 10,831,831 B2 | 11/2020 | Greene |
| 10,834,590 B2 | 11/2020 | Furgemanavi et al. |
| 10,846,433 B2 | 11/2020 | Brannon et al. |
| 10,853,356 B1 | 12/2020 | Mcpherson et al. |
| 10,853,501 B2 | 12/2020 | Brannon |
| 10,860,721 B1 | 12/2020 | Gentile |
| 10,860,742 B2 | 12/2020 | Joseph et al. |
| 10,860,979 B2 | 12/2020 | Geffen et al. |
| 10,878,127 B2 | 12/2020 | Brannon et al. |
| 10,885,485 B2 | 1/2021 | Brannon et al. |
| 10,891,393 B2 | 1/2021 | Currier et al. |
| 10,893,074 B2 | 1/2021 | Sartor |
| 10,896,394 B2 | 1/2021 | Brannon et al. |
| 10,902,490 B2 | 1/2021 | He et al. |
| 10,909,488 B2 | 2/2021 | Hecht et al. |
| 10,924,514 B1 | 2/2021 | Altman et al. |
| 10,929,557 B2 | 2/2021 | Chavez |
| 10,949,555 B2 | 3/2021 | Rattan et al. |
| 10,949,565 B2 | 3/2021 | Barday et al. |
| 10,957,326 B2 | 3/2021 | Bhaya et al. |
| 10,963,571 B2 | 3/2021 | Bar Joseph et al. |
| 10,963,572 B2 | 3/2021 | Belfiore, Jr. et al. |
| 10,965,547 B1 | 3/2021 | Esposito et al. |
| 10,970,418 B2 | 4/2021 | Durvasula et al. |
| 10,972,509 B2 | 4/2021 | Barday et al. |
| 10,976,950 B1 | 4/2021 | Trezzo et al. |
| 10,983,963 B1 | 4/2021 | Venkatasubramanian et al. |
| 10,984,458 B1 | 4/2021 | Gutierrez |
| 10,997,318 B2 | 5/2021 | Barday et al. |
| 11,003,748 B2 | 5/2021 | Oliker et al. |
| 11,012,475 B2 | 5/2021 | Patnala et al. |
| 11,023,528 B1 | 6/2021 | Lee et al. |
| 11,023,921 B2 | 6/2021 | Wang et al. |
| 11,037,168 B1 | 6/2021 | Lee et al. |
| 11,057,356 B2 | 7/2021 | Malhotra et al. |
| 11,057,427 B2 | 7/2021 | Wright et al. |
| 11,062,051 B2 | 7/2021 | Barday et al. |
| 11,068,318 B2 | 7/2021 | Kuesel et al. |
| 11,068,584 B2 | 7/2021 | Burriesci et al. |
| 11,068,618 B2 | 7/2021 | Brannon et al. |
| 11,068,797 B2 | 7/2021 | Bhide et al. |
| 11,068,847 B2 | 7/2021 | Boutros et al. |
| 11,093,643 B2 | 8/2021 | Hennebert |
| 11,093,950 B2 | 8/2021 | Hersh et al. |
| 11,138,299 B2 | 10/2021 | Brannon et al. |
| 11,144,622 B2 | 10/2021 | Brannon et al. |
| 11,144,678 B2 | 10/2021 | Dondini et al. |
| 11,144,862 B1 | 10/2021 | Jackson et al. |
| 11,195,134 B2 | 12/2021 | Brannon et al. |
| 11,201,929 B2 | 12/2021 | Dudmesh et al. |
| 11,210,420 B2 | 12/2021 | Brannon et al. |
| 11,238,390 B2 | 2/2022 | Brannon et al. |
| 11,240,273 B2 | 2/2022 | Barday et al. |
| 11,246,520 B2 | 2/2022 | Clifford et al. |
| 11,252,159 B2 | 2/2022 | Kannan et al. |
| 11,256,777 B2 | 2/2022 | Brannon et al. |
| 11,263,262 B2 | 3/2022 | Chen |
| 11,327,996 B2 | 5/2022 | Reynolds et al. |
| 2002/0004736 A1 | 1/2002 | Roundtree et al. |
| 2002/0049907 A1 | 4/2002 | Woods et al. |
| 2002/0055932 A1 | 5/2002 | Wheeler et al. |
| 2002/0077941 A1 | 6/2002 | Halligan et al. |
| 2002/0103854 A1 | 8/2002 | Okita |
| 2002/0129216 A1 | 9/2002 | Collins |
| 2002/0161594 A1 | 10/2002 | Bryan et al. |
| 2002/0161733 A1 | 10/2002 | Grainger |
| 2003/0041250 A1 | 2/2003 | Proudler |
| 2003/0065641 A1 | 4/2003 | Chaloux |
| 2003/0093680 A1 | 5/2003 | Astley et al. |
| 2003/0097451 A1 | 5/2003 | Bjorksten et al. |
| 2003/0097661 A1 | 5/2003 | Li et al. |
| 2003/0115142 A1 | 6/2003 | Brickell et al. |
| 2003/0130893 A1 | 7/2003 | Farmer |
| 2003/0131001 A1 | 7/2003 | Matsuo |
| 2003/0131093 A1 | 7/2003 | Aschen et al. |
| 2003/0140150 A1 | 7/2003 | Kemp et al. |
| 2003/0167216 A1 | 9/2003 | Brown et al. |
| 2003/0212604 A1 | 11/2003 | Cullen |
| 2004/0002818 A1 | 1/2004 | Kulp et al. |
| 2004/0025053 A1 | 2/2004 | Hayward |
| 2004/0088235 A1 | 5/2004 | Ziekle et al. |
| 2004/0098366 A1 | 5/2004 | Sinclair et al. |
| 2004/0098493 A1 | 5/2004 | Rees |
| 2004/0111359 A1 | 6/2004 | Hudock |
| 2004/0186912 A1 | 9/2004 | Harlow et al. |
| 2004/0193907 A1 | 9/2004 | Patanella |
| 2005/0022198 A1 | 1/2005 | Olapurath et al. |
| 2005/0033616 A1 | 2/2005 | Vavul et al. |
| 2005/0076294 A1 | 4/2005 | Dehamer et al. |
| 2005/0114343 A1 | 5/2005 | Wesinger et al. |
| 2005/0144066 A1 | 6/2005 | Cope et al. |
| 2005/0197884 A1 | 9/2005 | Mullen, Jr. |
| 2005/0198177 A1 | 9/2005 | Black |
| 2005/0198646 A1 | 9/2005 | Kortela |
| 2005/0246292 A1 | 11/2005 | Sarcanin |
| 2005/0278538 A1 | 12/2005 | Fowler |
| 2006/0031078 A1 | 2/2006 | Pizzinger et al. |
| 2006/0035204 A1 | 2/2006 | Lamarche et al. |
| 2006/0075122 A1 | 4/2006 | Lindskog et al. |
| 2006/0149730 A1 | 7/2006 | Curtis |
| 2006/0156052 A1 | 7/2006 | Bodnar et al. |

(56) References Cited

U.S. PATENT DOCUMENTS

| | | |
|---|---|---|
| 2006/0190280 A1 | 8/2006 | Hoebel et al. |
| 2006/0206375 A1 | 9/2006 | Scott et al. |
| 2006/0224422 A1 | 10/2006 | Cohen |
| 2006/0253597 A1 | 11/2006 | Mujica |
| 2006/0256945 A1* | 11/2006 | Noble ............... H04M 3/5158 379/211.02 |
| 2006/0259416 A1 | 11/2006 | Johnson |
| 2007/0011058 A1 | 1/2007 | Dev |
| 2007/0027715 A1 | 2/2007 | Gropper et al. |
| 2007/0061125 A1 | 3/2007 | Bhatt et al. |
| 2007/0061393 A1 | 3/2007 | Moore |
| 2007/0130101 A1 | 6/2007 | Anderson et al. |
| 2007/0130323 A1 | 6/2007 | Landsman et al. |
| 2007/0157311 A1 | 7/2007 | Meier et al. |
| 2007/0173355 A1 | 7/2007 | Klein |
| 2007/0179793 A1 | 8/2007 | Bagchi et al. |
| 2007/0180490 A1 | 8/2007 | Renzi et al. |
| 2007/0192438 A1 | 8/2007 | Goei |
| 2007/0266420 A1 | 11/2007 | Hawkins et al. |
| 2007/0283171 A1 | 12/2007 | Breslin et al. |
| 2008/0005194 A1 | 1/2008 | Smolen et al. |
| 2008/0015927 A1 | 1/2008 | Ramirez |
| 2008/0028065 A1 | 1/2008 | Caso et al. |
| 2008/0028435 A1 | 1/2008 | Strickland et al. |
| 2008/0047016 A1 | 2/2008 | Spoonamore |
| 2008/0120699 A1 | 5/2008 | Spear |
| 2008/0140696 A1 | 6/2008 | Mathuria |
| 2008/0189306 A1 | 8/2008 | Hewett et al. |
| 2008/0195436 A1 | 8/2008 | Whyte |
| 2008/0222271 A1 | 9/2008 | Spires |
| 2008/0235177 A1 | 9/2008 | Kim et al. |
| 2008/0270203 A1 | 10/2008 | Holmes et al. |
| 2008/0270351 A1 | 10/2008 | Thomsen |
| 2008/0270381 A1 | 10/2008 | Thomsen |
| 2008/0270382 A1 | 10/2008 | Thomsen et al. |
| 2008/0270451 A1 | 10/2008 | Thomsen et al. |
| 2008/0270462 A1 | 10/2008 | Thomsen |
| 2008/0281649 A1 | 11/2008 | Morris |
| 2008/0282320 A1 | 11/2008 | Denovo et al. |
| 2008/0288271 A1 | 11/2008 | Faust |
| 2008/0288299 A1 | 11/2008 | Schultz |
| 2009/0012896 A1 | 1/2009 | Arnold |
| 2009/0022301 A1 | 1/2009 | Mudaliar |
| 2009/0037975 A1 | 2/2009 | Ishikawa et al. |
| 2009/0119500 A1 | 5/2009 | Roth et al. |
| 2009/0132419 A1 | 5/2009 | Grammer et al. |
| 2009/0138276 A1 | 5/2009 | Hayashida et al. |
| 2009/0140035 A1 | 6/2009 | Miller |
| 2009/0144702 A1 | 6/2009 | Atkin et al. |
| 2009/0158249 A1 | 6/2009 | Tomkins et al. |
| 2009/0172705 A1 | 7/2009 | Cheong |
| 2009/0182818 A1 | 7/2009 | Krywaniuk |
| 2009/0187764 A1 | 7/2009 | Astakhov et al. |
| 2009/0204452 A1 | 8/2009 | Iskandar et al. |
| 2009/0204820 A1 | 8/2009 | Brandenburg et al. |
| 2009/0210347 A1 | 8/2009 | Sarcanin |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0010912 A1 | 1/2010 | Jones et al. |
| 2010/0010968 A1 | 1/2010 | Redlich et al. |
| 2010/0077484 A1 | 3/2010 | Paretti et al. |
| 2010/0082533 A1 | 4/2010 | Nakamura et al. |
| 2010/0094650 A1 | 4/2010 | Tran et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0223349 A1 | 9/2010 | Thorson |
| 2010/0228786 A1 | 9/2010 | Török |
| 2010/0234987 A1 | 9/2010 | Benschop et al. |
| 2010/0235297 A1 | 9/2010 | Mamorsky |
| 2010/0235915 A1 | 9/2010 | Memon et al. |
| 2010/0262624 A1 | 10/2010 | Pullikottil |
| 2010/0268628 A1 | 10/2010 | Pitkow et al. |
| 2010/0268932 A1 | 10/2010 | Bhattacharjee |
| 2010/0281313 A1 | 11/2010 | White et al. |
| 2010/0287114 A1 | 11/2010 | Bartko et al. |
| 2010/0333012 A1 | 12/2010 | Adachi et al. |
| 2011/0006996 A1 | 1/2011 | Smith et al. |
| 2011/0010202 A1 | 1/2011 | Neale |
| 2011/0082794 A1 | 4/2011 | Blechman |
| 2011/0137696 A1 | 6/2011 | Meyer et al. |
| 2011/0145154 A1 | 6/2011 | Rivers et al. |
| 2011/0153396 A1 | 6/2011 | Marcuvitz et al. |
| 2011/0191664 A1 | 8/2011 | Sheleheda et al. |
| 2011/0208850 A1 | 8/2011 | Sheleheda et al. |
| 2011/0209067 A1 | 8/2011 | Bogess et al. |
| 2011/0218866 A1* | 9/2011 | Wilson ............... G06Q 30/02 705/14.73 |
| 2011/0231896 A1 | 9/2011 | Tovar |
| 2011/0238573 A1 | 9/2011 | Varadarajan |
| 2011/0252456 A1 | 10/2011 | Hatakeyama |
| 2011/0302643 A1 | 12/2011 | Pichna et al. |
| 2012/0041939 A1 | 2/2012 | Amsterdamski |
| 2012/0084151 A1 | 4/2012 | Kozak et al. |
| 2012/0084349 A1 | 4/2012 | Lee et al. |
| 2012/0102411 A1 | 4/2012 | Sathish |
| 2012/0102543 A1 | 4/2012 | Kohli et al. |
| 2012/0109830 A1 | 5/2012 | Vogel |
| 2012/0110674 A1 | 5/2012 | Belani et al. |
| 2012/0116923 A1 | 5/2012 | Irving et al. |
| 2012/0131438 A1 | 5/2012 | Li et al. |
| 2012/0143650 A1 | 6/2012 | Crowley et al. |
| 2012/0144499 A1 | 6/2012 | Tan et al. |
| 2012/0191596 A1 | 7/2012 | Kremen et al. |
| 2012/0226621 A1 | 9/2012 | Petran et al. |
| 2012/0239557 A1 | 9/2012 | Weinflash et al. |
| 2012/0254320 A1 | 10/2012 | Dove et al. |
| 2012/0259752 A1 | 10/2012 | Agee |
| 2012/0323700 A1 | 12/2012 | Aleksandrovich et al. |
| 2012/0330769 A1 | 12/2012 | Arceo |
| 2012/0330869 A1 | 12/2012 | Durham |
| 2013/0004933 A1 | 1/2013 | Bhaskaran |
| 2013/0018954 A1 | 1/2013 | Cheng |
| 2013/0085801 A1 | 4/2013 | Sharpe et al. |
| 2013/0091156 A1 | 4/2013 | Raiche et al. |
| 2013/0103485 A1 | 4/2013 | Postrel |
| 2013/0111323 A1 | 5/2013 | Taghaddos et al. |
| 2013/0124257 A1 | 5/2013 | Schubert |
| 2013/0159351 A1 | 6/2013 | Hamann et al. |
| 2013/0160120 A1 | 6/2013 | Malaviya et al. |
| 2013/0171968 A1 | 7/2013 | Wang |
| 2013/0179982 A1 | 7/2013 | Bridges et al. |
| 2013/0179988 A1 | 7/2013 | Bekker et al. |
| 2013/0185806 A1 | 7/2013 | Hatakeyama |
| 2013/0211872 A1 | 8/2013 | Cherry et al. |
| 2013/0218829 A1 | 8/2013 | Martinez |
| 2013/0219459 A1 | 8/2013 | Bradley |
| 2013/0254139 A1 | 9/2013 | Lei |
| 2013/0254649 A1 | 9/2013 | ONeill |
| 2013/0254699 A1 | 9/2013 | Bashir et al. |
| 2013/0262328 A1 | 10/2013 | Federgreen |
| 2013/0282438 A1 | 10/2013 | Hunter et al. |
| 2013/0282466 A1 | 10/2013 | Hampton |
| 2013/0290169 A1 | 10/2013 | Bathula et al. |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006355 A1 | 1/2014 | Kirihata |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Ciurea |
| 2014/0040161 A1 | 2/2014 | Berlin |
| 2014/0040979 A1 | 2/2014 | Barton et al. |
| 2014/0041048 A1 | 2/2014 | Goodwin et al. |
| 2014/0047551 A1 | 2/2014 | Nagasu et al. |
| 2014/0052463 A1 | 2/2014 | Cashman et al. |

(56) References Cited

U.S. PATENT DOCUMENTS

| | | |
|---|---|---|
| 2014/0067973 A1 | 3/2014 | Eden |
| 2014/0074550 A1 | 3/2014 | Chourey |
| 2014/0074645 A1 | 3/2014 | Ingram |
| 2014/0089027 A1 | 3/2014 | Brown |
| 2014/0089039 A1 | 3/2014 | Mcclellan |
| 2014/0108173 A1 | 4/2014 | Cooper et al. |
| 2014/0108968 A1 | 4/2014 | Vishria |
| 2014/0137257 A1 | 5/2014 | Martinez et al. |
| 2014/0142988 A1 | 5/2014 | Grosso et al. |
| 2014/0143011 A1 | 5/2014 | Mudugu et al. |
| 2014/0143844 A1 | 5/2014 | Goertzen |
| 2014/0164476 A1 | 6/2014 | Thomson |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0222468 A1 | 8/2014 | Araya et al. |
| 2014/0244309 A1 | 8/2014 | Francois |
| 2014/0244325 A1 | 8/2014 | Cartwright |
| 2014/0244375 A1 | 8/2014 | Kim |
| 2014/0244399 A1 | 8/2014 | Orduna et al. |
| 2014/0257917 A1 | 9/2014 | Spencer et al. |
| 2014/0258093 A1 | 9/2014 | Gardiner et al. |
| 2014/0278539 A1 | 9/2014 | Edwards |
| 2014/0278663 A1 | 9/2014 | Samuel et al. |
| 2014/0278730 A1 | 9/2014 | Muhart et al. |
| 2014/0278802 A1 | 9/2014 | Macpherson |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289366 A1 | 9/2014 | Choi et al. |
| 2014/0289681 A1 | 9/2014 | Wielgosz |
| 2014/0289862 A1 | 9/2014 | Gorfein et al. |
| 2014/0317171 A1 | 10/2014 | Fox et al. |
| 2014/0324480 A1 | 10/2014 | Dufel et al. |
| 2014/0337041 A1 | 11/2014 | Madden et al. |
| 2014/0337466 A1 | 11/2014 | Li et al. |
| 2014/0344015 A1 | 11/2014 | Puértolas-Montañés et al. |
| 2015/0006514 A1 | 1/2015 | Hung |
| 2015/0012363 A1 | 1/2015 | Grant et al. |
| 2015/0019530 A1 | 1/2015 | Felch |
| 2015/0026056 A1 | 1/2015 | Calman et al. |
| 2015/0026260 A1 | 1/2015 | Worthley |
| 2015/0033112 A1 | 1/2015 | Norwood et al. |
| 2015/0066577 A1 | 3/2015 | Christiansen et al. |
| 2015/0066865 A1 | 3/2015 | Yara et al. |
| 2015/0088598 A1 | 3/2015 | Acharyya et al. |
| 2015/0088635 A1 | 3/2015 | Maycotte et al. |
| 2015/0106264 A1 | 4/2015 | Johnson |
| 2015/0106867 A1 | 4/2015 | Liang |
| 2015/0106948 A1 | 4/2015 | Holman et al. |
| 2015/0106949 A1 | 4/2015 | Holman et al. |
| 2015/0121462 A1 | 4/2015 | Courage et al. |
| 2015/0143258 A1 | 5/2015 | Carolan et al. |
| 2015/0149362 A1 | 5/2015 | Baum et al. |
| 2015/0154520 A1 | 6/2015 | Federgreen et al. |
| 2015/0169318 A1 | 6/2015 | Nash |
| 2015/0172296 A1 | 6/2015 | Fujioka |
| 2015/0178740 A1 | 6/2015 | Borawski et al. |
| 2015/0199534 A1 | 7/2015 | Francis et al. |
| 2015/0199541 A1 | 7/2015 | Koch et al. |
| 2015/0199702 A1 | 7/2015 | Singh |
| 2015/0229664 A1 | 8/2015 | Hawthorn et al. |
| 2015/0235049 A1 | 8/2015 | Cohen et al. |
| 2015/0235050 A1 | 8/2015 | Wouhaybi et al. |
| 2015/0235283 A1 | 8/2015 | Nishikawa |
| 2015/0242638 A1 | 8/2015 | Bitran et al. |
| 2015/0242778 A1 | 8/2015 | Wilcox et al. |
| 2015/0242858 A1 | 8/2015 | Smith et al. |
| 2015/0248391 A1 | 9/2015 | Watanabe |
| 2015/0254597 A1 | 9/2015 | Jahagirdar |
| 2015/0261887 A1 | 9/2015 | Joukov |
| 2015/0262189 A1 | 9/2015 | Vergeer |
| 2015/0264417 A1 | 9/2015 | Spitz et al. |
| 2015/0269384 A1 | 9/2015 | Holman et al. |
| 2015/0271167 A1 | 9/2015 | Kalai |
| 2015/0288715 A1 | 10/2015 | Hotchkiss |
| 2015/0309813 A1 | 10/2015 | Patel |
| 2015/0310227 A1 | 10/2015 | Ishida et al. |
| 2015/0310575 A1 | 10/2015 | Shelton |
| 2015/0348200 A1 | 12/2015 | Fair et al. |
| 2015/0356362 A1 | 12/2015 | Demos |
| 2015/0379430 A1 | 12/2015 | Dirac et al. |
| 2016/0006760 A1 | 1/2016 | Lala et al. |
| 2016/0012465 A1 | 1/2016 | Sharp |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0080405 A1 | 3/2016 | Schler et al. |
| 2016/0099963 A1 | 4/2016 | Mahaffey et al. |
| 2016/0103963 A1 | 4/2016 | Mishra |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0140466 A1 | 5/2016 | Sidebottom et al. |
| 2016/0143570 A1 | 5/2016 | Valacich et al. |
| 2016/0148143 A1 | 5/2016 | Anderson et al. |
| 2016/0148259 A1 | 5/2016 | Baek et al. |
| 2016/0162269 A1 | 6/2016 | Pogorelik et al. |
| 2016/0164915 A1 | 6/2016 | Cook |
| 2016/0180386 A1 | 6/2016 | Konig |
| 2016/0188450 A1 | 6/2016 | Appusamy et al. |
| 2016/0189156 A1 | 6/2016 | Kim et al. |
| 2016/0196189 A1 | 7/2016 | Miyagi et al. |
| 2016/0225000 A1 | 8/2016 | Glasgow |
| 2016/0232465 A1 | 8/2016 | Kurtz et al. |
| 2016/0232534 A1 | 8/2016 | Lacey et al. |
| 2016/0234319 A1 | 8/2016 | Griffin |
| 2016/0253497 A1 | 9/2016 | Christodorescu et al. |
| 2016/0255139 A1 | 9/2016 | Rathod |
| 2016/0261631 A1 | 9/2016 | Vissamsetty et al. |
| 2016/0262163 A1 | 9/2016 | Gonzalez Garrido et al. |
| 2016/0277429 A1* | 9/2016 | Demirjian ............... G06F 21/36 |
| 2016/0292453 A1 | 10/2016 | Patterson et al. |
| 2016/0292621 A1 | 10/2016 | Ciccone et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0335531 A1 | 11/2016 | Mullen et al. |
| 2016/0342811 A1 | 11/2016 | Whitcomb et al. |
| 2016/0359861 A1 | 12/2016 | Manov et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0032395 A1 | 2/2017 | Kaufman et al. |
| 2017/0032408 A1 | 2/2017 | Kumar et al. |
| 2017/0034101 A1 | 2/2017 | Kumar et al. |
| 2017/0041324 A1 | 2/2017 | Ionutescu et al. |
| 2017/0046399 A1 | 2/2017 | Sankaranarasimhan et al. |
| 2017/0046753 A1 | 2/2017 | Deupree, IV |
| 2017/0061501 A1 | 3/2017 | Horwich |
| 2017/0068785 A1 | 3/2017 | Experton et al. |
| 2017/0070495 A1 | 3/2017 | Cherry et al. |
| 2017/0075513 A1 | 3/2017 | Watson et al. |
| 2017/0093917 A1 | 3/2017 | Chandra et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |
| 2017/0171325 A1 | 6/2017 | Perez |
| 2017/0177324 A1 | 6/2017 | Frank et al. |
| 2017/0180378 A1 | 6/2017 | Tyler et al. |
| 2017/0180505 A1 | 6/2017 | Shaw et al. |

(56) References Cited

U.S. PATENT DOCUMENTS

| | | |
|---|---|---|
| 2017/0185758 A1* | 6/2017 | Oliker .................. G06F 21/316 |
| 2017/0193017 A1 | 7/2017 | Migliori |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220685 A1 | 8/2017 | Yan et al. |
| 2017/0220964 A1 | 8/2017 | Datta Ray |
| 2017/0249394 A1 | 8/2017 | Loeb et al. |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0273050 A1* | 9/2017 | Levak ................ G01N 15/1456 |
| 2017/0278004 A1 | 9/2017 | Mcelhinney et al. |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0289199 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2017/0353404 A1 | 12/2017 | Hodge |
| 2018/0032757 A1 | 2/2018 | Michael |
| 2018/0039975 A1 | 2/2018 | Hefetz |
| 2018/0041498 A1 | 2/2018 | Kikuchi |
| 2018/0046753 A1 | 2/2018 | Shelton |
| 2018/0046939 A1 | 2/2018 | Meron et al. |
| 2018/0063174 A1 | 3/2018 | Grill et al. |
| 2018/0063190 A1 | 3/2018 | Wright et al. |
| 2018/0082024 A1 | 3/2018 | Curbera et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0131574 A1 | 5/2018 | Jacobs et al. |
| 2018/0131658 A1 | 5/2018 | Bhagwan et al. |
| 2018/0165637 A1 | 6/2018 | Romero et al. |
| 2018/0198614 A1 | 7/2018 | Neumann |
| 2018/0204281 A1 | 7/2018 | Painter et al. |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Crispen |
| 2018/0301222 A1 | 10/2018 | Dew, Sr. et al. |
| 2018/0307859 A1 | 10/2018 | Lafever et al. |
| 2018/0336509 A1 | 11/2018 | Guttmann |
| 2018/0343215 A1 | 11/2018 | Ganapathi et al. |
| 2018/0349583 A1 | 12/2018 | Turgeman et al. |
| 2018/0351888 A1 | 12/2018 | Howard |
| 2018/0352003 A1 | 12/2018 | Winn et al. |
| 2018/0357243 A1 | 12/2018 | Yoon |
| 2018/0365720 A1 | 12/2018 | Goldman et al. |
| 2018/0374030 A1 | 12/2018 | Barday et al. |
| 2018/0375814 A1 | 12/2018 | Hart |
| 2019/0005210 A1 | 1/2019 | Wiederspohn et al. |
| 2019/0012211 A1 | 1/2019 | Selvaraj |
| 2019/0012672 A1 | 1/2019 | Francesco |
| 2019/0019184 A1 | 1/2019 | Lacey et al. |
| 2019/0050547 A1 | 2/2019 | Welsh et al. |
| 2019/0087570 A1 | 3/2019 | Sloane |
| 2019/0096020 A1 | 3/2019 | Barday et al. |
| 2019/0108353 A1 | 4/2019 | Sadeh et al. |
| 2019/0130132 A1 | 5/2019 | Barbas et al. |
| 2019/0138496 A1 | 5/2019 | Yamaguchi |
| 2019/0139087 A1 | 5/2019 | Dabbs et al. |
| 2019/0148003 A1 | 5/2019 | Van Hoe |
| 2019/0156053 A1 | 5/2019 | Vogel et al. |
| 2019/0156058 A1 | 5/2019 | Van Dyne et al. |
| 2019/0171801 A1 | 6/2019 | Barday et al. |
| 2019/0179652 A1 | 6/2019 | Hesener et al. |
| 2019/0180051 A1 | 6/2019 | Barday et al. |
| 2019/0182294 A1 | 6/2019 | Rieke et al. |
| 2019/0188402 A1 | 6/2019 | Wang et al. |
| 2019/0266200 A1 | 8/2019 | Francolla |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0272492 A1 | 9/2019 | Elledge et al. |
| 2019/0281059 A1* | 9/2019 | Chittampally ........ G06F 16/953 |
| 2019/0294818 A1 | 9/2019 | Barday et al. |
| 2019/0332802 A1 | 10/2019 | Barday et al. |
| 2019/0332807 A1 | 10/2019 | Lafever et al. |
| 2019/0333118 A1 | 10/2019 | Crimmins et al. |
| 2019/0354709 A1 | 11/2019 | Brinskelle |
| 2019/0356684 A1* | 11/2019 | Sinha .................. H04L 63/1458 |
| 2019/0362169 A1 | 11/2019 | Lin et al. |
| 2019/0362268 A1 | 11/2019 | Fogarty et al. |
| 2019/0377901 A1 | 12/2019 | Balzer et al. |
| 2019/0378073 A1 | 12/2019 | Lopez et al. |
| 2019/0384934 A1 | 12/2019 | Kim |
| 2019/0392162 A1 | 12/2019 | Stern et al. |
| 2019/0392170 A1 | 12/2019 | Barday et al. |
| 2019/0392171 A1 | 12/2019 | Barday et al. |
| 2020/0020454 A1 | 1/2020 | Mcgarvey et al. |
| 2020/0050966 A1 | 2/2020 | Enuka et al. |
| 2020/0051117 A1 | 2/2020 | Mitchell |
| 2020/0057781 A1 | 2/2020 | Mccormick |
| 2020/0074471 A1 | 3/2020 | Adjaoute |
| 2020/0081865 A1 | 3/2020 | Farrar et al. |
| 2020/0082270 A1 | 3/2020 | Gu et al. |
| 2020/0090197 A1 | 3/2020 | Rodriguez et al. |
| 2020/0092179 A1 | 3/2020 | Chieu et al. |
| 2020/0110589 A1 | 4/2020 | Bequet et al. |
| 2020/0110904 A1* | 4/2020 | Shinde ................ G06F 21/6272 |
| 2020/0117737 A1 | 4/2020 | Gopalakrishnan et al. |
| 2020/0137097 A1 | 4/2020 | Zimmermann et al. |
| 2020/0143301 A1 | 5/2020 | Bowers |
| 2020/0143797 A1 | 5/2020 | Manoharan et al. |
| 2020/0159952 A1 | 5/2020 | Dain et al. |
| 2020/0159955 A1 | 5/2020 | Barlik et al. |
| 2020/0167653 A1 | 5/2020 | Manjunath et al. |
| 2020/0175424 A1 | 6/2020 | Kursun |
| 2020/0183655 A1 | 6/2020 | Barday et al. |
| 2020/0186355 A1 | 6/2020 | Davies |
| 2020/0193018 A1 | 6/2020 | Van Dyke |
| 2020/0193022 A1 | 6/2020 | Lunsford et al. |
| 2020/0210558 A1 | 7/2020 | Barday et al. |
| 2020/0210620 A1 | 7/2020 | Haletky |
| 2020/0211002 A1 | 7/2020 | Steinberg |
| 2020/0220901 A1 | 7/2020 | Barday et al. |
| 2020/0226156 A1 | 7/2020 | Borra et al. |
| 2020/0226196 A1 | 7/2020 | Brannon et al. |
| 2020/0242259 A1 | 7/2020 | Chirravuri et al. |
| 2020/0242719 A1 | 7/2020 | Lee |
| 2020/0250342 A1 | 8/2020 | Miller et al. |
| 2020/0252413 A1 | 8/2020 | Buzbee et al. |
| 2020/0252817 A1 | 8/2020 | Brouillette et al. |
| 2020/0272764 A1 | 8/2020 | Brannon et al. |
| 2020/0285755 A1 | 9/2020 | Kassoumeh et al. |
| 2020/0293679 A1 | 9/2020 | Handy Bosma et al. |
| 2020/0296171 A1 | 9/2020 | Mocanu et al. |
| 2020/0302089 A1 | 9/2020 | Barday et al. |
| 2020/0310917 A1 | 10/2020 | Tkachev et al. |
| 2020/0311310 A1 | 10/2020 | Barday et al. |
| 2020/0344243 A1 | 10/2020 | Brannon et al. |
| 2020/0356695 A1 | 11/2020 | Brannon et al. |
| 2020/0364369 A1 | 11/2020 | Brannon et al. |
| 2020/0372178 A1 | 11/2020 | Barday et al. |
| 2020/0394327 A1 | 12/2020 | Childress et al. |
| 2020/0401380 A1 | 12/2020 | Jacobs et al. |
| 2020/0401962 A1 | 12/2020 | Gottemukkala et al. |
| 2020/0410117 A1 | 12/2020 | Barday et al. |
| 2020/0410131 A1 | 12/2020 | Barday et al. |
| 2020/0410132 A1 | 12/2020 | Brannon et al. |
| 2021/0012341 A1 | 1/2021 | Garg et al. |
| 2021/0056569 A1 | 2/2021 | Silberman et al. |
| 2021/0075775 A1 | 3/2021 | Cheng et al. |
| 2021/0081567 A1 | 3/2021 | Park et al. |
| 2021/0099449 A1 | 4/2021 | Frederick et al. |
| 2021/0110047 A1 | 4/2021 | Fang |
| 2021/0125089 A1 | 4/2021 | Nickl et al. |
| 2021/0152496 A1* | 5/2021 | Kim ..................... H04L 51/02 |
| 2021/0182940 A1 | 6/2021 | Gupta et al. |
| 2021/0224402 A1 | 7/2021 | Sher-Jan et al. |

(56) References Cited

U.S. PATENT DOCUMENTS

| | | | |
|---|---|---|---|
| 2021/0233157 A1 | 7/2021 | Crutchfield, Jr. |
| 2021/0243595 A1 | 8/2021 | Buck et al. |
| 2021/0248247 A1 | 8/2021 | Poothokaran et al. |
| 2021/0256163 A1 | 8/2021 | Fleming et al. |
| 2021/0279360 A1 | 9/2021 | Gimenez Palop et al. |
| 2021/0288995 A1 | 9/2021 | Attar et al. |
| 2021/0297441 A1 | 9/2021 | Olalere |
| 2021/0303828 A1 | 9/2021 | Lafreniere et al. |
| 2021/0312061 A1 | 10/2021 | Schroeder et al. |
| 2021/0314328 A1 | 10/2021 | Simons |
| 2021/0326786 A1 | 10/2021 | Sun et al. |
| 2021/0328969 A1 | 10/2021 | Gaddam et al. |
| 2021/0382949 A1 | 12/2021 | Yastrebenetsky et al. |
| 2021/0397735 A1 | 12/2021 | Samatov et al. |
| 2021/0400018 A1 | 12/2021 | Vettaikaran et al. |
| 2021/0406712 A1 | 12/2021 | Bhide et al. |
| 2022/0137850 A1 | 5/2022 | Boddu et al. |
| 2022/0171759 A1 | 6/2022 | Jindal et al. |
| 2022/0414255 A1 | 12/2022 | Wang et al. |

FOREIGN PATENT DOCUMENTS

| | | |
|---|---|---|
| CN | 112115859 | 12/2020 |
| EP | 1394698 | 3/2004 |
| EP | 2031540 | 3/2009 |
| KR | 20130024345 | 3/2013 |
| KR | 20130062500 | 6/2013 |
| WO | 2001033430 | 5/2001 |
| WO | 20020067158 | 8/2002 |
| WO | 20030050773 | 6/2003 |
| WO | 2005008411 | 1/2005 |
| WO | 2007002412 | 1/2007 |
| WO | 2008/134203 | 11/2008 |
| WO | 2012174659 | 12/2012 |
| WO | 2015116905 | 8/2015 |
| WO | 2020/146028 | 7/2020 |
| WO | 2022006421 | 1/2022 |

OTHER PUBLICATIONS

Bjorn Greif, "Cookie Pop-up Blocker: Cliqz Automatically Denies Consent Requests", Aug. 11, 2019 (Year: 2019).*
Jones et al., "AI and the Ethics of Automating Consent", 2018 (Year: 2018).*
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Jun. 8, 2022, from corresponding U.S. Appl. No. 17/722,551.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 16, 2022, from corresponding U.S. Appl. No. 17/486,350.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 2, 2022, from corresponding U.S. Appl. No. 16/872,130.
Notice of Allowance, dated Mar. 2, 2022, from corresponding U.S. Appl. No. 17/535,098.
Notice of Allowance, dated Mar. 21, 2022, from corresponding U.S. Appl. No. 17/366,754.
Notice of Allowance, dated Mar. 22, 2022, from corresponding U.S. Appl. No. 17/475,244.
Notice of Allowance, dated Mar. 22, 2022, from corresponding U.S. Appl. No. 17/504,102.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 28, 2022, from corresponding U.S. Appl. No. 17/499,609.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated Mar. 31, 2022, from corresponding U.S. Appl. No. 17/476,209.
Notice of Allowance, dated Mar. 4, 2022, from corresponding U.S. Appl. No. 17/409,999.
Notice of Allowance, dated May 1, 2020, from corresponding U.S. Appl. No. 16/586,202.
Notice of Allowance, dated May 11, 2020, from corresponding U.S. Appl. No. 16/786,196.
Notice of Allowance, dated May 11, 2022, from corresponding U.S. Appl. No. 17/395,759.
Notice of Allowance, dated May 13, 2021, from corresponding U.S. Appl. No. 17/101,915.
Notice of Allowance, dated May 18, 2022, from corresponding U.S. Appl. No. 17/670,354.
Notice of Allowance, dated May 19, 2020, from corresponding U.S. Appl. No. 16/505,430.
Notice of Allowance, dated May 19, 2020, from corresponding U.S. Appl. No. 16/808,496.
Notice of Allowance, dated May 20, 2020, from corresponding U.S. Appl. No. 16/707,762.
Notice of Allowance, dated May 21, 2018, from corresponding U.S. Appl. No. 15/896,790.
Notice of Allowance, dated May 25, 2022, from corresponding U.S. Appl. No. 16/872,031.
Notice of Allowance, dated May 26, 2021, from corresponding U.S. Appl. No. 16/808,493.
Notice of Allowance, dated May 26, 2021, from corresponding U.S. Appl. No. 16/865,874.

(56) References Cited

OTHER PUBLICATIONS

Notice of Allowance, dated May 26, 2021, from corresponding U.S. Appl. No. 17/199,514.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
Written Opinion of the International Searching Authority, dated Sep. 15, 2021, from corresponding International Application No. PCT/US2021/033631.
Abdullah et al, "The Mapping Process of Unstructured Data to the Structured Data", ACM, pp. 151-155 (Year: 2013).
Acar, Gunes, et al, The Web Never Forgets, Computerand Communications Security, ACM, Nov. 3, 2014, pp. 674-689.
Aghasian, Erfan, et al, Scoring Users' Privacy Disclosure Across Multiple Online Social Networks,IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework", IEEE, pp. 659-662 (Year: 2009).
Agrawal et al, "Securing Electronic Health Records Without Impeding the Flow of Information," International Journal of Medical Informatics 76, 2007, pp. 471-479 (Year: 2007).
Ahmad et al, "Task-Oriented Access Model for Secure Data Sharing Over Cloud," ACM, pp. 1-7 (Year: 2015).
Ahmad, et al, "Performance of Resource Management Algorithms for Processable Bulk Data Transfer Tasks in Grid Environments," ACM, pp. 177-188 (Year: 2008).
Alaa et al, "Personalized Risk Scoring for Critical Care Prognosis Using Mixtures of Gaussian Processes," Apr. 27, 2017, IEEE, vol. 65, issue 1, pp. 207-217 (Year: 2017).
Ali et al, "Age Estimation from Facial Images Using Biometric Ratios and Wrinkle Analysis," IEEE, 2015, pp. 1-5 (Year: 2015).
Alkalha et al, "Investigating the Effects of Human Resource Policies on Organizational Performance: An Empirical Study on Commercial Banks Operating in Jordan," European Journal of Economics, Finance and Administrative Science, pp. 1-22 (Year: 2012).

Aman et al, "Detecting Data Tampering Attacks in Synchrophasor Networks using Time Hopping," IEEE, pp. 1-6 (Year: 2016).
Amar et al, "Privacy-Aware Infrastructure for Managing Personal Data," ACM, pp. 571-572, Aug. 22-26, 2016 (Year: 2016).
Antunes et al, "Preserving Digital Data in Heterogeneous Environments", ACM, pp. 345-348, 2009 (Year: 2009).
Ardagna, et al, "A Privacy-Aware Access Control System," Journal of Computer Security, 16:4, pp. 369-397 (Year: 2008).
AvePoint, Automating Privacy Impact Assessments, AvePoint, Inc.
AvePoint, AvePoint Privacy Impact Assessment 1: User Guide, Cumulative Update 2, Revision E, Feb. 2015, AvePoint, Inc.
AvePoint, Installing and Configuring the APIA System, International Association of Privacy Professionals, AvePoint, Inc.
Ball, et al, "Aspects of the Computer-Based Patient Record," Computers in Healthcare, Springer-Verlag New York Inc., pp. 1-23 (Year: 1992).
Banerjee et al, "Link Before You Share: Managing Privacy Policies through Blockchain," IEEE, pp. 4438-4447 (Year: 2017).
Bang et al, "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Bansal et al, "Integrating Big Data: A Semantic Extract-Transform-Load Framework," IEEE, pp. 42-50 (Year: 2015).
Bao et al, "Performance Modeling and Workflow Scheduling of Microservice-Based Applications in Clouds," IEEE Transactions on Parallel and Distributed Systems, vol. 30, No. 9, Sep. 2019, pp. 2101-2116 (Year: 2019).
Barker, "Personalizing Access Control by Generalizing Access Control," ACM, pp. 149-158 (Year: 2010).
Barr, "Amazon Rekognition Update—Estimated Age Range for Faces," AWS News Blog, Feb. 10, 2017, pp. 1-5 (Year: 2017).
Bayardo et al, "Technological Solutions for Protecting Privacy," Computer 36.9 (2003), pp. 115-118, (Year: 2003).
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bertino et al, "Towards Mechanisms for Detection and Prevention of Data Exfiltration by Insiders," Mar. 22, 2011, ACM, pp. 10-19 (Year: 2011).
Bhargav-Spantzel et al., Receipt Management—Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Bieker, et al, "Privacy-Preserving Authentication Solutions—Best Practices for Implementation and EU Regulatory Perspectives," Oct. 29, 2014, IEEE, pp. 1-10 (Year: 2014).
Bin, et al, "Research on Data Mining Models for the Internet of Things," IEEE, pp. 1-6 (Year: 2010).
Bindschaedler et al, "Privacy Through Fake Yet Semantically Real Traces," xrxiv.org, Cornell University Library, 201 Olin Library Cornell University Ithaca, NY 14853, May 27, 2015 (Year: 2015).
Binns, et al, "Data Havens, or Privacy Sans Frontières? A Study of International Personal Data Transfers," ACM, pp. 273-274 (Year: 2002).
Bjorn Greif, "Cookie Pop-up Blocker: Cliqz Automatically Denies Consent Requests," Cliqz.com, pp. 1-9, Aug. 11, 2019 (Year: 2019).
Borgida, "Description Logics in Data Management," IEEE Transactions on Knowledge and Data Engineering, vol. 7, No. 5, Oct. 1995, pp. 671-682 (Year: 1995).
Brandt et al, "Efficient Metadata Management in Large Distributed Storage Systems," IEEE, pp. 1-9 (Year: 2003).
Grolinger, et al, "Data Management in Cloud Environments: NoSQL and NewSQL Data Stores," Journal of Cloud Computing: Advances, Systems and Applications, pp. 1-24 (Year: 2013).
Guo, et al, "OPAL: A Passe-partout for Web Forms," ACM, pp. 353-356 (Year: 2012).
Gustarini, et al, "Evaluation of Challenges in Human Subject Studies "In-the-Wild" Using Subjects' Personal Smartphones," ACM, pp. 1447-1456 (Year: 2013).

(56) References Cited

OTHER PUBLICATIONS

Hacigümüs, Hakan, et al., Executing SQL over Encrypted Data in the Database-Service-Provider Model, ACM, Jun. 4, 2002, pp. 216-227.
Halevy, et al, "Schema Mediation in Peer Data Management Systems," IEEE, Proceedings of the 19th International Conference on Data Engineering, 2003, pp. 505-516 (Year: 2003).
Han et al, "Demographic Estimation from Face Images: Human vs. Machine Performance," IEEE, 2015, pp. 1148-1161 (Year: 2015).
Hauch, et al, "Information Intelligence: Metadata for Information Discovery, Access, and Integration," ACM, pp. 793-798 (Year: 2005).
He et al, "A Crowdsourcing Framework for Detecting of Cross-Browser Issues in Web Application," ACM, pp. 1-4, Nov. 6, 2015 (Year: 2015).
Heil et al, "Downsizing and Rightsizing," https://web.archive.org/web/20130523153311/https://www.referenceforbusiness.com/management/De-Ele/Downsizing-and-Rightsizing.html (Year: 2013).
Hernandez, et al, "Data Exchange with Data-Metadata Translations," ACM, pp. 260-273 (Year: 2008).
Hinde, "A Model to Assess Organisational Information Privacy Maturity Against the Protection of Personal Information Act" Dissertation University of Cape Town 2014, pp. 1-121 (Year: 2014).
Hodge, et al, "Managing Virtual Data Marts with Metapointer Tables," pp. 1-7 (Year: 2002).
Horrall et al, "Evaluating Risk: IBM's Country Financial Risk and Treasury Risk Scorecards," Jul. 21, 2014, IBM, vol. 58, issue 4, pp. 2:1-2:9 (Year: 2014).
Hu, et al, "Attribute Considerations for Access Control Systems," NIST Special Publication 800-205, Jun. 2019, pp. 1-42 (Year: 2019).
Hu, et al, "Guide to Attribute Based Access Control (ABAC) Definition and Considerations (Draft)," NIST Special Publication 800-162, pp. 1-54 (Year: 2013).
Huang, et al, "A Study on Information Security Management with Personal Data Protection," IEEE, Dec. 9, 2011, pp. 624-630 (Year: 2011).
Huettner, "Digital Risk Management: Protecting Your Privacy, Improving Security, and Preparing for Emergencies," IEEE, pp. 136-138 (Year: 2006).
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
Huo et al, "A Cloud Storage Architecture Model for Data-Intensive Applications," IEEE, pp. 1-4 (Year: 2011).
IAPP, Daily Dashboard, PIA Tool Stocked With New Templates for DPI, Infosec, International Association of Privacy Professionals, Apr. 22, 2014.
IAPP, ISO/IEC 27001 Information Security Management Template, Resource Center, International Association of Privacy Professionals.
Imran et al, "Searching in Cloud Object Storage by Using a Metadata Model", IEEE, 2014, retrieved online on Apr. 1, 2020, pp. 121-128. Retrieved from the Internet: URL: https://ieeexplore.ieee.org/stamp/stampjsp? (Year: 2014).
Iordanou et al, "Tracing Cross Border Web Tracking," Oct. 31, 2018, pp. 329-342, ACM (Year: 2018).
Islam, et al, "Mixture Model Based Label Association Techniques for Web Accessibility," ACM, pp. 67-76 (Year: 2010).
Jayasinghe et al, "Matching Facial Images Using Age Related Morphing Changes," ISSRI, 2009, pp. 2901-2907 (Year: 2009).
Jensen, et al, "Temporal Data Management," IEEE Transactions on Knowledge and Data Engineering, vol. 11, No. 1, Jan./Feb. 1999, pp. 36-44 (Year: 1999).
Jiahao Chen et al. "Fairness Under Unawareness: Assessing Disparity when Protected Class is Unobserved," axrxiv.org, Cornell University Library, 201 Olin Library Cornell University, Ithaca, NY 14853, Nov. 27, 2018 (Nov. 27, 2018), Section 2, Figure 2. (Year 2018).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Jones et al, "AI and the Ethics of Automating Consent," IEEE, pp. 64-72, May 2018 (Year: 2018).
Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/1 0.1145/3200000/3196462/p78-joonbakhsh.pdf? (Year: 2018).
Jun et al, "Scalable Multi-Access Flash Store for Big Data Analytics," ACM, pp. 55-64 (Year: 2014).
Khan et al, "Wrinkles Energy Based Age Estimation Using Discrete Cosine Transform," IEEE, 2015, pp. 1-4 (Year: 2015).
Kirkham, et al, "A Personal Data Store for an Internet of Subjects," IEEE, pp. 92-97 (Year: 2011).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Kristian et al, "Human Facial Age Classification Using Active Shape Module, Geometrical Feature, and Support Vendor Machine on Early Growth Stage," ISICO, 2015, pp. 1-8 (Year: 2015).
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).
Lasierra et al, "Data Management in Home Scenarios Using an Autonomic Ontology-Based Approach," IEEE, pp. 94-99 (Year: 2012).
Leadbetter, et al, "Where Big Data Meets Linked Data: Applying Standard Data Models to Environmental Data Streams," IEEE, pp. 2929-2937 (Year: 2016).
Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).
Lenzerini et al, "Ontology-based Data Management," ACM, pp. 5-6 (Year: 2011).
Lewis, James et al, "Microservices," Mar. 25, 2014 (Mar. 25, 2014),XP055907494, Retrieved from the Internet: https://martinfowler.com/articles/microservices.html [retrieved on Mar. 31, 2022].
Li, Ninghui, et al, t-Closeness: Privacy Beyond k-Anonymity and l-Diversity, IEEE, 2014, p. 106-115.
Liu et al, "A Novel Approach for Detecting Browser-based Silent Miner," IEEE, pp. 490-497 (Year: 2018).
Liu et al, "Cross-Geography Scientific Data Transferring Trends and Behavior," ACM, pp. 267-278 (Year: 2018).
Liu et al, "Overview on Ontology Mapping and Approach," IEEE, pp. 592-595 (Year: 2011).
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Liu, Yandong, et al, "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).
Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Notice of Allowance, dated Jan. 26, 2022, from corresponding U.S. Appl. No. 17/491,906.
Notice of Allowance, dated Jan. 29, 2020, from corresponding U.S. Appl. No. 16/278,119.
Notice of Allowance, dated Jan. 31, 2022, from corresponding U.S. Appl. No. 17/472,948.

(56) References Cited

OTHER PUBLICATIONS

Notice of Allowance, dated Jan. 5, 2022, from corresponding U.S. Appl. No. 17/475,241.
Notice of Allowance, dated Jan. 6, 2021, from corresponding U.S. Appl. No. 16/595,327.
Notice of Allowance, dated Jan. 6, 2022, from corresponding U.S. Appl. No. 17/407,765.
Notice of Allowance, dated Jan. 7, 2022, from corresponding U.S. Appl. No. 17/222,725.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 19, 2021, from corresponding U.S. Appl. No. 17/306,252.
Notice of Allowance, dated Jul. 20, 2022, from corresponding U.S. Appl. No. 16/938,509.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Jul. 27, 2022, from corresponding U.S. Appl. No. 17/679,750.
Notice of Allowance, dated Jul. 29, 2022, from corresponding U.S. Appl. No. 17/670,341.
Notice of Allowance, dated Jul. 31, 2019, from corresponding U.S. Appl. No. 16/221,153.
Notice of Allowance, dated Jul. 7, 2022, from corresponding U.S. Appl. No. 17/571,871.
Notice of Allowance, dated Jul. 8, 2021, from corresponding U.S. Appl. No. 17/201,040.
Notice of Allowance, dated Jun. 1, 2020, from corresponding U.S. Appl. No. 16/813,321.
Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 14, 2022, from corresponding U.S. Appl. No. 17/679,734.
Notice of Allowance, dated Jun. 16, 2020, from corresponding U.S. Appl. No. 16/798,818.
Notice of Allowance, dated Jun. 16, 2022, from corresponding U.S. Appl. No. 17/119,080.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 2, 2021, from corresponding U.S. Appl. No. 17/198,581.
Notice of Allowance, dated Jun. 2, 2022, from corresponding U.S. Appl. No. 17/493,290.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.
Notice of Allowance, dated Jun. 23, 2022, from corresponding U.S. Appl. No. 17/588,645.
Notice of Allowance, dated Jun. 27, 2018, from corresponding U.S. Appl. No. 15/882,989.
Notice of Allowance, dated Jun. 29, 2022, from corresponding U.S. Appl. No. 17/675,118.
Notice of Allowance, dated Jun. 4, 2019, from corresponding U.S. Appl. No. 16/159,566.
Notice of Allowance, dated May 27, 2020, from corresponding U.S. Appl. No. 16/820,208.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 27, 2022, from corresponding U.S. Appl. No. 17/543,546.
Notice of Allowance, dated May 28, 2019, from corresponding U.S. Appl. No. 16/277,568.
Notice of Allowance, dated May 28, 2020, from corresponding U.S. Appl. No. 16/799,279.
Notice of Allowance, dated May 28, 2021, from corresponding U.S. Appl. No. 16/862,944.
Notice of Allowance, dated May 31, 2022, from corresponding U.S. Appl. No. 17/679,715.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 6, 2022, from corresponding U.S. Appl. No. 17/666,886.
Notice of Allowance, dated May 7, 2020, from corresponding U.S. Appl. No. 16/505,426.
Notice of Allowance, dated May 7, 2021, from corresponding U.S. Appl. No. 17/194,662.
Notice of Allowance, dated Nov. 14, 2019, from corresponding U.S. Appl. No. 16/436,616.
Notice of Allowance, dated Nov. 16, 2021, from corresponding U.S. Appl. No. 17/491,871.
Notice of Allowance, dated Nov. 2, 2018, from corresponding U.S. Appl. No. 16/054,762.
Notice of Allowance, dated Nov. 22, 2021, from corresponding U.S. Appl. No. 17/383,889.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.

(56) References Cited

OTHER PUBLICATIONS

Notice of Allowance, dated Nov. 3, 2020, from corresponding U.S. Appl. No. 16/719,071.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Nov. 9, 2020, from corresponding U.S. Appl. No. 16/595,342.
Notice of Allowance, dated Oct. 1, 2021, from corresponding U.S. Appl. No. 17/340,395.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 22, 2021, from corresponding U.S. Appl. No. 17/346,847.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 29, 2021, from corresponding U.S. Appl. No. 17/316,179.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
International Search Report, dated Apr. 12, 2022, from corresponding International Application No. PCT/US2022/016735.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Dec. 22, 2021, from corresponding International Application No. PCT/US2021/051217.
International Search Report, dated Feb. 11, 2022, from corresponding International Application No. PCT/US2021/053518.
International Search Report, dated Feb. 14, 2022, from corresponding International Application No. PCT/US2021/058274.
International Search Report, dated Jan. 14, 2019, from corresponding International Application No. PCT/US2018/046949.
International Search Report, dated Jan. 5, 2022, from corresponding International Application No. PCT/US2021/050497.
International Search Report, dated Jan. 7, 2019, from corresponding International Application No. PCT/US2018/055772.
International Search Report, dated Jun. 1, 2022, from corresponding International Application No. PCT/US2022/016930.
International Search Report, dated Jun. 21, 2017, from corresponding International Application No. PCT/US2017/025600.
International Search Report, dated Jun. 22, 2022, from corresponding International Application No. PCT/US2022/019358.
International Search Report, dated Jun. 24, 2022, from corresponding International Application No. PCT/US2022/019882.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 18, 2022, from corresponding International Application No. PCT/US2022/013733.
International Search Report, dated Mar. 4, 2019, from corresponding International Application No. PCT/US2018/055773.

(56) References Cited

OTHER PUBLICATIONS

International Search Report, dated Mar. 4, 2019, from corresponding International Application No. PCT/US2018/055774.
International Search Report, dated May 12, 2022, from corresponding International Application No. PCT/US2022/015929.
International Search Report, dated May 17, 2022, from corresponding International Application No. PCT/US2022/015241.
International Search Report, dated May 19, 2022, from corresponding International Application No. PCT/US2022/015637.
International Search Report, dated Nov. 12, 2021, from corresponding International Application No. PCT/US2021/043481.
International Search Report, dated Nov. 19, 2018, from corresponding International Application No. PCT/US2018/046939.
International Search Report, dated Nov. 3, 2021, from corresponding International Application No. PCT/US2021/040893.
Notice of Allowance, dated Apr. 28, 2021, from corresponding U.S. Appl. No. 17/181,828.
Notice of Allowance, dated Apr. 28, 2022, from corresponding U.S. Appl. No. 17/592,922.
Notice of Allowance, dated Apr. 28, 2022, from corresponding U.S. Appl. No. 17/670,352.
Notice of Allowance, dated Apr. 29, 2020, from corresponding U.S. Appl. No. 16/700,049.
Notice of Allowance, dated Apr. 29, 2022, from corresponding U.S. Appl. No. 17/387,421.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 4, 2022, from corresponding U.S. Appl. No. 17/493,332.
Notice of Allowance, dated Apr. 4, 2022, from corresponding U.S. Appl. No. 17/572,298.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 22, 2022, from corresponding U.S. Appl. No. 17/499,595.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 3, 2022, from corresponding U.S. Appl. No. 17/668,714.
Notice of Allowance, dated Aug. 30, 2018, from corresponding U.S. Appl. No. 15/996,208.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 4, 2022, from corresponding U.S. Appl. No. 17/670,349.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Aug. 9, 2021, from corresponding U.S. Appl. No. 16/881,699.
Notice of Allowance, dated Aug. 9, 2022, from corresponding U.S. Appl. No. 17/832,313.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 13, 2021, from corresponding U.S. Appl. No. 16/908,081.
Notice of Allowance, dated Dec. 13, 2021, from corresponding U.S. Appl. No. 17/347,853.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 2, 2021, from corresponding U.S. Appl. No. 16/901,654.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.
Notice of Allowance, dated Nov. 16, 2022, from corresponding U.S. Appl. No. 17/860,255.
Notice of Allowance, dated Nov. 9, 2022, from corresponding U.S. Appl. No. 17/187,329.
Notice of Allowance, dated Sep. 30, 2022, from corresponding U.S. Appl. No. 17/867,068.
Office Action, dated Nov. 15, 2022, from corresponding U.S. Appl. No. 17/200,698.
Office Action, dated Oct. 27, 2022, from corresponding U.S. Appl. No. 17/161,159.
Office Action, dated Sep. 8, 2022, from corresponding U.S. Appl. No. 17/850,244.
Sanzo et al, "Analytical Modeling of Lock-Based Concurrency Control with Arbitrary Transaction Data Access Patterns," ACM, pp. 69-78 (Year: 2010).
Sarkar et al, "Towards Enforcement of the EU GDPR: Enabling Data Erasure," 2018 IEEE Confs on Internet of Things, Green Computing and Communications, Cyber, Physical and Social Computing, Smart Data, Blockchain, Computer and Information Technology, Congress on Cybermatics, 2018, pp. 222-229, IEEE (Year: 2018).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.

(56) References Cited

OTHER PUBLICATIONS

Sedinic et al, "Security Risk Management in Complex Organization," May 29, 2015, IEEE, pp. 1331-1337 (Year: 2015).
Shahriar et al, "A Model-Based Detection of Vulnerable and Malicious Browser Extensions," IEEE, pp. 198-207 (Year: 2013).
Shankar et al, "Doppleganger: Better Browser Privacy Without the Bother," Proceedings of the 13th ACM Conference on Computer and Communications Security; [ACM Conference on Computer and Communications Security], New York, NY: ACM, US, Oct. 30, 2006, pp. 154-167 (Year: 2006).
Shulz et al, "Generative Data Models for Validation and Evaluation of Visualization Techniques," ACM, pp. 1-13 (Year: 2016).
Singh, et al, "A Metadata Catalog Service for Data Intensive Applications," ACM, pp. 1-17 (Year: 2003).
Sjosten et al, "Discovering Browser Extensions via Web Accessible Resources," ACM, pp. 329-336, Mar. 22, 2017 (Year: 2017).
Slezak, et al, "Brighthouse: An Analytic Data Warehouse for Ad-hoc Queries," ACM, pp. 1337-1345 (Year: 2008).
Soceanu, et al, "Managing the Privacy and Security of eHealth Data," May 29, 2015, IEEE, pp. 1-8 (Year: 2015).
Srinivasan et al, "Descriptive Data Analysis of File Transfer Data," ACM, pp. 1-8 (Year: 2014).
Srivastava, Agrima, et al, Measuring Privacy Leaks in Online Social Networks, International Conference on Advances in Computing, Communications and Informatics (ICACCI), 2013.
Stack Overflow, "Is there a way to force a user to scroll to the bottom of a div?," Stack Overflow, pp. 1-11, Nov. 2013. [Online], Available: https://stackoverflow.com/questions/2745935/is-there-a-way-to-force-a-user-to-scroll-to-the-bottom-of-a-div (Year: 2013).
Stern, Joanna, "iPhone Privacy Is Broken . . . and Apps Are to Blame", The Wall Street Journal, wsj.com, May 31, 2019.
Strodl, et al, "Personal & SOHO Archiving," Vienna University of Technology, Vienna, Austria, JCDL '08, Jun. 16-20, 2008, Pittsburgh, Pennsylvania, USA, pp. 115-123 (Year: 2008).
Sukumar et al, "Review on Modern Data Preprocessing Techniques in Web Usage Mining (WUM)," IEEE, 2016, pp. 64-69 (Year: 2016).
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Tanasa et al, "Advanced Data Preprocessing for Intersites Web Usage Mining," IEEE, Mar. 2004, pp. 59-65 (Year: 2004).
Tanwar, et al, "Live Forensics Analysis: Violations of Business Security Policy," 2014 International Conference on Contemporary Computing and Informatics (IC31), 2014, pp. 971-976 (Year: 2014).
The Cookie Collective, Optanon Cookie Policy Generator, The Cookie Collective, Year 2016, http://web.archive.org/web/20160324062743/https:/optanon.com/.
Thomas et al, "MooM—A Prototype Framework for Management of Ontology Mappings," IEEE, pp. 548-555 (Year: 2011).
Thuraisingham, "Security Issues for the Semantic Web," Proceedings 27th Annual International Computer Software and Applications Conference, COMPSAC 2003, Dallas, TX, USA, 2003, pp. 633-638 (Year: 2003).
TRUSTe Announces General Availability of Assessment Manager for Enterprises to Streamline Data Privacy Management with Automation, PRNewswire, Mar. 4, 2015.
Tsai et al, "Determinants of Intangible Assets Value: The Data Mining Approach," Knowledge Based System, pp. 67-77 http://www.elsevier.com/locate/knosys (Year: 2012).
Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).
Van Eijk et al, "The Impact of User Location on Cookie Notices (Inside and Outside of the European Union," IEEE Security & Privacy Workshop on Technology and Consumer Protection (CONPRO '19), Jan. 1, 2019 (Year: 2019).
Vukovic et al, "Managing Enterprise IT Systems Using Online Communities," Jul. 9, 2011, IEEE, pp. 552-559. (Year: 2011).
Wang et al, "Revealing Key Non-Financial Factors for Online Credit-Scoring in E-Financing," 2013, IEEE, pp. 1-6 (Year: 2013).
Wang et al, "Secure and Efficient Access to Outsourced Data," ACM, pp. 55-65 (Year: 2009).
Weaver et al, "Understanding Information Preview in Mobile Email Processing", ACM, pp. 303-312, 2011 (Year: 2011).
Wong et al, "Ontology Mapping for the Interoperability Problem in Network Management," IEEE, pp. 2058-2068 (Year: 2005).
Wu et al, "Data Mining with Big Data," IEEE, Jan. 2014, pp. 97-107, vol. 26, No. 1, (Year: 2014).
www.truste.com (1), 200150207, Internet Archive Wayback Machine, www.archive.org,2_7_2015.
Xu, et al., "GatorShare: A File System Framework for High-Throughput Data Management," ACM, pp. 776-786 (Year: 2010).
Yang et al, "DAC-MACS: Effective Data Access Control for Multiauthority Cloud Storage Systems," IEEE, pp. 1790-1801 (Year: 2013).
Yang et al, "Mining Web Access Sequence with Improved Apriori Algorithm," IEEE, 2017, pp. 780-784 (Year: 2017).
Ye et al, "An Evolution-Based Cache Scheme for Scalable Mobile Data Access," ACM, pp. 1-7 (Year: 2007).
Yin et al, "Multibank Memory Optimization for Parallel Data Access in Multiple Data Arrays", ACM, pp. 1-8 (Year: 2016).
Yiu et al, "Outsourced Similarity Search on Metric Data Assets", IEEE, pp. 338-352 (Year: 2012).
Yu, "Using Data from Social Media Websites to Inspire the Design of Assistive Technology", ACM, pp. 1-2 (Year: 2016).
Yu, et al, "Performance and Fairness Issues in Big Data Transfers," ACM, pp. 9-11 (Year: 2014).
Yue et al, "An Automatic HTTP Cookie Management System," Computer Networks, Elsevier, Amsterdam, NL, vol. 54, No. 13, Sep. 15, 2010, pp. 2182-2198 (Year: 2010).
Zannone, et al, "Maintaining Privacy on Derived Objects," ACM, pp. 10-19 (Year: 2005).
Zeldovich, Nickolai, et al, Making Information Flow Explicit in HiStar, OSDI '06: 7th USENIX Symposium on Operating Systems Design and Implementation, USENIX Association, p. 263-278.
Zhang et al, "Data Transfer Performance Issues for a Web Services Interface to Synchrotron Experiments", ACM, pp. 59-65 (Year: 2007).
Zhang et al, "Dynamic Topic Modeling for Monitoring Market Competition from Online Text and Image Data", ACM, pp. 1425-1434 (Year: 2015).
Zheng, et al, "Methodologies for Cross-Domain Data Fusion: An Overview," IEEE, pp. 16-34 (Year: 2015).
Zheng, et al, "Toward Assured Data Deletion in Cloud Storage," IEEE, vol. 34, No. 3, pp. 101-107 May/Jun. 2020 (Year: 2020).
Zhu, et al, "Dynamic Data Integration Using Web Services," IEEE, pp. 1-8 (Year: 2004).
Notice of Allowance, dated Dec. 3, 2019, from corresponding U.S. Appl. No. 16/563,749.
Notice of Allowance, dated Dec. 30, 2021, from corresponding U.S. Appl. No. 16/938,520.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 8, 2021, from corresponding U.S. Appl. No. 17/397,472.
Notice of Allowance, dated Dec. 9, 2019, from corresponding U.S. Appl. No. 16/565,261.

(56) References Cited

OTHER PUBLICATIONS

Notice of Allowance, dated Dec. 9, 2020, from corresponding U.S. Appl. No. 16/404,491.
Notice of Allowance, dated Feb. 1, 2022, from corresponding U.S. Appl. No. 17/346,509.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 14, 2022, from corresponding U.S. Appl. No. 16/623,157.
Notice of Allowance, dated Feb. 19, 2019, from corresponding U.S. Appl. No. 16/159,632.
Notice of Allowance, dated Feb. 19, 2021, from corresponding U.S. Appl. No. 16/832,451.
Notice of Allowance, dated Feb. 22, 2022, from corresponding U.S. Appl. No. 17/535,065.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 24, 2022, from corresponding U.S. Appl. No. 17/234,205.
Notice of Allowance, dated Feb. 24, 2022, from corresponding U.S. Appl. No. 17/549,170.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Feb. 4, 2022, from corresponding U.S. Appl. No. 17/520,272.
Notice of Allowance, dated Feb. 8, 2022, from corresponding U.S. Appl. No. 17/342,153.
Notice of Allowance, dated Jan. 1, 2021, from corresponding U.S. Appl. No. 17/026,727.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 24, 2022, from corresponding U.S. Appl. No. 17/340,699.
Notice of Allowance, dated Jan. 25, 2021, from corresponding U.S. Appl. No. 16/410,336.
Notice of Allowance, dated Jan. 26, 2018, from corresponding U.S. Appl. No. 15/619,469.
International Search Report, dated Nov. 3, 2021, from corresponding International Application No. PCT/US2021/044910.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
International Search Report, dated Sep. 15, 2021, from corresponding International Application No. PCT/US2021/033631.
Written Opinion of the International Searching Authority, dated Jun. 6, 2017, from corresponding International Application No. PCT/US2017/025611.
Written Opinion of the International Searching Authority, dated Apr. 12, 2022, from corresponding International Application No. PCT/US2022/016735.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.

(56) References Cited

OTHER PUBLICATIONS

Written Opinion of the International Searching Authority, dated Dec. 14, 2018, from corresponding International Application No. PCT/US2018/045296.
Written Opinion of the International Searching Authority, dated Dec. 22, 2021, from corresponding International Application No. PCT/US2021/051217.
Written Opinion of the International Searching Authority, dated Feb. 11, 2022, from corresponding International Application No. PCT/US2021/053518.
Written Opinion of the International Searching Authority, dated Feb. 14, 2022, from corresponding International Application No. PCT/US2021/058274.
Written Opinion of the International Searching Authority, dated Jan. 14, 2019, from corresponding International Application No. PCT/US2018/046949.
Written Opinion of the International Searching Authority, dated Jan. 5, 2022, from corresponding International Application No. PCT/US2021/050497.
Written Opinion of the International Searching Authority, dated Jan. 7, 2019, from corresponding International Application No. PCT/US2018/055772.
Written Opinion of the International Searching Authority, dated Jun. 1, 2022, from corresponding International Application No. PCT/US2022/016930.
Written Opinion of the International Searching Authority, dated Jun. 21, 2017, from corresponding International Application No. PCT/US2017/025600.
Written Opinion of the International Searching Authority, dated Jun. 22, 2022, from corresponding International Application No. PCT/US2022/019358.
Written Opinion of the International Searching Authority, dated Jun. 24, 2022, from corresponding International Application No. PCT/US2022/019882.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 18, 2022, from corresponding International Application No. PCT/US2022/013733.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated May 12, 2022, from corresponding International Application No. PCT/US2022/015929.
Written Opinion of the International Searching Authority, dated May 17, 2022, from corresponding International Application No. PCT/US2022/015241.
Written Opinion of the International Searching Authority, dated May 19, 2022, from corresponding International Application No. PCT/US2022/015637.
Written Opinion of the International Searching Authority, dated Nov. 12, 2021, from corresponding International Application No. PCT/US2021/043481.
Written Opinion of the International Searching Authority, dated Nov. 19, 2018, from corresponding International Application No. PCT/US2018/046939.
Written Opinion of the International Searching Authority, dated Nov. 3, 2021, from corresponding International Application No. PCT/US2021/040893.
Written Opinion of the International Searching Authority, dated Nov. 3, 2021, from corresponding International Application No. PCT/US2021/044910.
Written Opinion of the International Searching Authority, dated Oct. 11, 2018, from corresponding International Application No. PCT/US2018/043975.
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Final Office Action, dated Apr. 1, 2022, from corresponding U.S. Appl. No. 17/370,650.
Final Office Action, dated Apr. 23, 2020, from corresponding U.S. Appl. No. 16/572,347.
Final Office Action, dated Apr. 25, 2022, from corresponding U.S. Appl. No. 17/149,421.
Final Office Action, dated Apr. 27, 2021, from corresponding U.S. Appl. No. 17/068,454.
Final Office Action, dated Apr. 28, 2022, from corresponding U.S. Appl. No. 16/925,550.
Final Office Action, dated Apr. 5, 2022, from corresponding U.S. Appl. No. 17/013,756.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 27, 2021, from corresponding U.S. Appl. No. 17/161,159.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Aug. 9, 2021, from corresponding U.S. Appl. No. 17/119,080.
Final Office Action, dated Dec. 10, 2021, from corresponding U.S. Appl. No. 17/187,329.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 25, 2022, from corresponding U.S. Appl. No. 17/346,586.
Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Jul. 1, 2022, from corresponding U.S. Appl. No. 17/187,329.
Final Office Action, dated Jul. 21, 2021, from corresponding U.S. Appl. No. 17/151,334.
Final Office Action, dated Jul. 6, 2022, from corresponding U.S. Appl. No. 17/200,698.
Final Office Action, dated Jul. 7, 2021, from corresponding U.S. Appl. No. 17/149,421.

(56) References Cited

OTHER PUBLICATIONS

Final Office Action, dated Jun. 10, 2022, from corresponding U.S. Appl. No. 17/161,159.
Final Office Action, dated Jun. 29, 2022, from corresponding U.S. Appl. No. 17/020,275.
Final Office Action, dated Jun. 9, 2022, from corresponding U.S. Appl. No. 17/494,220.
Final Office Action, dated Mar. 21, 2022, from corresponding U.S. Appl. No. 17/373,444.
Final Office Action, dated Mar. 22, 2022, from corresponding U.S. Appl. No. 17/380,485.
Final Office Action, dated Mar. 26, 2021, from corresponding U.S. Appl. No. 17/020,275.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated May 12, 2022, from corresponding U.S. Appl. No. 17/499,624.
Final Office Action, dated May 14, 2021, from corresponding U.S. Appl. No. 17/013,756.
Final Office Action, dated May 16, 2022, from corresponding U.S. Appl. No. 17/480,377.
Final Office Action, dated May 2, 2022, from corresponding U.S. Appl. No. 17/499,595.
Final Office Action, dated May 24, 2022, from corresponding U.S. Appl. No. 17/499,582.
Final Office Action, dated Nov. 29, 2017, from corresponding U.S. Appl. No. 15/619,237.
Final Office Action, dated Oct. 26, 2021, from corresponding U.S. Appl. No. 17/306,496.
Office Action, dated Jan. 28, 2020, from corresponding U.S. Appl. No. 16/712,104.
Office Action, dated Jan. 29, 2021, from corresponding U.S. Appl. No. 17/101,106.
Office Action, dated Jan. 31, 2022, from corresponding U.S. Appl. No. 17/493,290.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 4, 2022, from corresponding U.S. Appl. No. 17/480,377.
Office Action, dated Jan. 7, 2020, from corresponding U.S. Appl. No. 16/572,182.
Office Action, dated Jan. 7, 2022, from corresponding U.S. Appl. No. 17/387,421.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jul. 27, 2022, from corresponding U.S. Appl. No. 17/831,713.
Office Action, dated Jul. 28, 2022, from corresponding U.S. Appl. No. 16/925,550.
Office Action, dated Jul. 7, 2022, from corresponding U.S. Appl. No. 17/370,650.
Office Action, dated Jun. 1, 2020, from corresponding U.S. Appl. No. 16/862,952.
Office Action, dated Jun. 1, 2022, from corresponding U.S. Appl. No. 17/306,496.
Office Action, dated Jun. 14, 2022, from corresponding U.S. Appl. No. 17/346,586.
Office Action, dated Jun. 16, 2022, from corresponding U.S. Appl. No. 17/689,683.
Office Action, dated Jun. 24, 2019, from corresponding U.S. Appl. No. 16/410,336.
Office Action, dated Jun. 24, 2021, from corresponding U.S. Appl. No. 17/234,205.
Office Action, dated Jun. 27, 2019, from corresponding U.S. Appl. No. 16/404,405.
Office Action, dated Jun. 7, 2021, from corresponding U.S. Appl. No. 17/200,698.
Office Action, dated Jun. 9, 2021, from corresponding U.S. Appl. No. 17/222,523.
Office Action, dated Mar. 1, 2022, from corresponding U.S. Appl. No. 17/119,080.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Office Action, dated Mar. 2, 2022, from corresponding U.S. Appl. No. 17/020,275.
Office Action, dated Mar. 2, 2022, from corresponding U.S. Appl. No. 17/161,159.
Office Action, dated Mar. 2, 2022, from corresponding U.S. Appl. No. 17/200,698.
Office Action, dated Mar. 20, 2020, from corresponding U.S. Appl. No. 16/778,709.
Office Action, dated Mar. 21, 2022, from corresponding U.S. Appl. No. 17/571,871.
Office Action, dated Mar. 22, 2022, from corresponding U.S. Appl. No. 17/187,329.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 30, 2021, from corresponding U.S. Appl. No. 17/151,399.
Office Action, dated Mar. 4, 2019, from corresponding U.S. Appl. No. 16/237,083.
Office Action, dated May 12, 2022, from corresponding U.S. Appl. No. 17/509,974.
Office Action, dated May 14, 2020, from corresponding U.S. Appl. No. 16/808,497.
Office Action, dated May 14, 2020, from corresponding U.S. Appl. No. 16/808,503.

(56) References Cited

OTHER PUBLICATIONS

Office Action, dated May 15, 2020, from corresponding U.S. Appl. No. 16/808,493.
Office Action, dated May 16, 2018, from corresponding U.S. Appl. No. 15/882,989.
Office Action, dated May 16, 2022, from corresponding U.S. Appl. No. 17/679,750.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 24, 2022, from corresponding U.S. Appl. No. 17/674,187.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated May 9, 2022, from corresponding U.S. Appl. No. 16/840,943.
Office Action, dated Nov. 1, 2017, from corresponding U.S. Appl. No. 15/169,658.
Office Action, dated Nov. 10, 2021, from corresponding U.S. Appl. No. 17/380,485.
Office Action, dated Nov. 10, 2021, from corresponding U.S. Appl. No. 17/409,999.
Office Action, dated Nov. 12, 2020, from corresponding U.S. Appl. No. 17/034,355.
Office Action, dated Nov. 12, 2020, from corresponding U.S. Appl. No. 17/034,772.
Office Action, dated Nov. 12, 2021, from corresponding U.S. Appl. No. 17/346,586.
Office Action, dated Nov. 12, 2021, from corresponding U.S. Appl. No. 17/373,444.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 16, 2021, from corresponding U.S. Appl. No. 17/370,650.
Office Action, dated Nov. 16, 2021, from corresponding U.S. Appl. No. 17/486,350.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 23, 2021, from corresponding U.S. Appl. No. 17/013,756.
Office Action, dated Nov. 24, 2020, from corresponding U.S. Appl. No. 16/925,628.
Office Action, dated Nov. 26, 2021, from corresponding U.S. Appl. No. 16/925,550.
Office Action, dated Nov. 4, 2021, from corresponding U.S. Appl. No. 17/491,906.
Office Action, dated Nov. 8, 2021, from corresponding U.S. Appl. No. 16/872,130.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 12, 2021, from corresponding U.S. Appl. No. 17/346,509.
Office Action, dated Oct. 14, 2020, from corresponding U.S. Appl. No. 16/927,658.
Office Action, dated Oct. 15, 2018, from corresponding U.S. Appl. No. 16/054,780.
Office Action, dated Oct. 15, 2021, from corresponding U.S. Appl. No. 16/908,081.
Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 15, 2021, from corresponding U.S. Appl. No. 16/623,157.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 24, 2021, from corresponding U.S. Appl. No. 17/342,153.
Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Restriction Requirement, dated Apr. 10, 2019, from corresponding U.S. Appl. No. 16/277,715.
Restriction Requirement, dated Apr. 12, 2022, from corresponding U.S. Appl. No. 17/584,187.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 17, 2021, from corresponding U.S. Appl. No. 17/475,244.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.

(56) References Cited

OTHER PUBLICATIONS

Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.
Restriction Requirement, dated Nov. 10, 2021, from corresponding U.S. Appl. No. 17/366,754.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Notice of Allowance, dated Apr. 12, 2017, from corresponding U.S. Appl. No. 15/256,419.
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 17, 2020, from corresponding U.S. Appl. No. 16/593,639.
Notice of Allowance, dated Apr. 19, 2021, from corresponding U.S. Appl. No. 17/164,029.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 20, 2022, from corresponding U.S. Appl. No. 17/573,808.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 27, 2022, from corresponding U.S. Appl. No. 17/573,999.
Notice of Allowance, dated Apr. 28, 2021, from corresponding U.S. Appl. No. 17/135,445.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 4, 2022, from corresponding U.S. Appl. No. 17/828,953.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Dec. 11, 2019, from corresponding U.S. Appl. No. 16/578,712.
Office Action, dated Dec. 13, 2021, from corresponding U.S. Appl. No. 17/476,209.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 2, 2021, from corresponding U.S. Appl. No. 17/504,102.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 27, 2021, from corresponding U.S. Appl. No. 17/493,332.
Office Action, dated Dec. 29, 2021, from corresponding U.S. Appl. No. 17/479,807.
Office Action, dated Dec. 3, 2018, from corresponding U.S. Appl. No. 16/055,998.
Office Action, dated Dec. 30, 2021, from corresponding U.S. Appl. No. 17/149,421.
Office Action, dated Dec. 31, 2018, from corresponding U.S. Appl. No. 16/160,577.
Office Action, dated Dec. 7, 2021, from corresponding U.S. Appl. No. 17/499,609.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 16, 2022, from corresponding U.S. Appl. No. 16/872,031.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 26, 2019, from corresponding U.S. Appl. No. 16/228,250.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Feb. 9, 2022, from corresponding U.S. Appl. No. 17/543,546.
Office Action, dated Jan. 14, 2022, from corresponding U.S. Appl. No. 17/499,595.
Office Action, dated Jan. 18, 2019, from corresponding U.S. Appl. No. 16/055,984.
Office Action, dated Jan. 21, 2022, from corresponding U.S. Appl. No. 17/499,624.

(56) References Cited

OTHER PUBLICATIONS

Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 25, 2022, from corresponding U.S. Appl. No. 17/494,220.
Office Action, dated Jan. 27, 2020, from corresponding U.S. Appl. No. 16/656,895.
Lu et al, "An HTTP Flooding Detection Method Based on Browser Behavior," IEEE, pp. 1151-1154 (Year: 2006).
Lu, "How Machine Learning Mitigates Racial Bias in the US Housing Market," Available as SSRN 3489519, pp. 1-73, Nov. 2019 (Year: 2019).
Luu, et al., "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).
Ma Ziang, et al., "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http://dx.doi.org/10.1145/2889160.2889178, p. 653, r.col. par. 1-3; figure 3 (Year: 2016).
Mandal, et al, "Automated Age Prediction Using Wrinkles Features of Facial Images and Neural Network," International Journal of Emerging Engineering Research and Technology, vol. 5, Issue 2, Feb. 2017, pp. 12-20 (Year: 2017).
Maret et al, "Multimedia Information Interchange: Web Forms Meet Data Servers", IEEE, pp. 499-505 (Year: 1999).
Martin, et al, "Hidden Surveillance by Web Sites: Web Bugs in Contemporary Use," Communications of the ACM, vol. 46, No. 12, Dec. 2003, pp. 258-264. Internet source https://doi.org/10.1145/953460.953509 (Year: 2003).
Matte et al, "Do Cookie Banners Respect my Choice?: Measuring Legal Compliance of Banners from IAB Europe's Transparency and Consent Framework," 2020 IEEE Symposium on Security and Privacy (SP), 2020, pp. 791-809 (Year: 2020).
McGarth et al, "Digital Library Technology for Locating and Accessing Scientific Data", ACM, pp. 188-194 (Year: 1999).
Mesbah et al., "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Milic et al, "Comparative Analysis of Metadata Models on e-Government Open Data Platforms," IEEE, pp. 119-130 (Year: 2021).
Moiso et al, "Towards a User-Centric Personal Data Ecosystem the Role of the Bank of Individual's Data," 2012 16th International Conference on Intelligence in Next Generation Networks, Berlin, 2012, pp. 202-209 (Year: 2012).
Moscoso-Zea et al, "Datawarehouse Design for Educational Data Mining," IEEE, pp. 1-6 (Year: 2016).
Mudepalli et al., "An efficient data retrieval approach using blowfish encryption on cloud CipherText Retrieval in Cloud Computing" IEEE, pp. 267-271 (Year: 2017).
Mundada et al, "Half-Baked Cookies: Hardening Cookie-Based Authentication for the Modern Web," Proceedings of the 11th ACM on Asia Conference on Computer and Communications Security, 2016, pp. 675-685 (Year: 2016).
Nemec et al, "Assessment of Query Execution Performance Using Selected Business Intelligence Tools and Experimental Agile Oriented Data Modeling Approach," Sep. 16, 2015, IEEE, pp. 1327-1333. (Year: 2015).
Newman et al, "High Speed Scientific Data Transfers using Software Defined Networking," ACM, pp. 1-9 (Year: 2015).
Newman, "Email Archive Overviews using Subject Indexes", ACM, pp. 652-653, 2002 (Year: 2002).
Nishikawa, Taiji, English Translation of JP 2019154505, Aug. 27, 2019 (Year: 2019).
Niu, et al, "Achieving Data Truthfulness and Privacy Preservation in Data Markets", IEEE Transactions on Knowledge and Data Engineering, IEEE Service Centre, Los Alamitos, CA, US, vol. 31, No. 1, Jan. 1, 2019, pp. 105-119 (Year 2019).
Notice of Filing Date for Petition for Post-Grant Review of related U.S. Pat. No. 9,691,090 dated Apr. 12, 2018.
Nouwens et al, "Dark Patterns after the GDPR: Scraping Consent Pop-ups and Demonstrating their Influence," ACM, pp. 1-13, Apr. 25, 2020 (Year: 2020).
O'Keefe et al, "Privacy-Preserving Data Linkage Protocols," Proceedings of the 2004 ACM Workshop on Privacy in the Electronic Society, 2004, pp. 94-102 (Year: 2004).
Olenski, Steve, For Consumers, Data Is a Matter of Trust, CMO Network, Apr. 18, 2016, https://www.forbes.com/sites/steveolenski/2016/04/18/for-consumers-data-is-a-matter-of-trust/#2e48496278b3.
Ozdikis et al, "Tool Support for Transformation from an OWL Ontology to an HLA Object Model," ACM, pp. 1-6 (Year: 2010).
Paes, "Student Research Abstract: Automatic Detection of Cross-Browser Incompatibilities using Machine Learning and Screenshot Similarity," ACM, pp. 697-698, Apr. 3, 2017 (Year: 2017).
Pearson, et al, "A Model-Based Privacy Compliance Checker," IJEBR, vol. 5, No. 2, pp. 63-83, 2009, Nov. 21, 2008. [Online]. Available: http://dx.doi.org/10.4018/jebr.2009040104 (Year: 2008).
Pechenizkiy et al, "Process Mining Online Assessment Data," Educational Data Mining, pp. 279-288 (Year: 2009).
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Ping et al, "Wide Area Placement of Data Replicas for Fast and Highly Available Data Access," ACM, pp. 1-8 (Year: 2011).
Popescu-Zeletin, "The Data Access and Transfer Support in a Local Heterogeneous Network (HMINET)", IEEE, pp. 147-152 (Year: 1979).
Porter, "De-Identified Data and Third Party Data Mining: The Risk of Re-Identification of Personal Information," Shidler JL Com. & Tech. 5, 2008, pp. 1-9 (Year: 2008).
Pretorius, et al, "Attributing Users Based on Web Browser History," 2017 IEEE Conference on Application, Information and Network Security (AINS), 2017, pp. 69-74 (Year: 2017).
Preuveneers et al, "Access Control with Delegated Authorization Policy Evaluation for Data-Driven Microservice Workflows," Future Internet 2017, MDPI, pp. 1-21 (Year: 2017).
Qing-Jiang et al, "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Qiu, et al, "Design and Application of Data Integration Platform Based on Web Services and XML," IEEE, pp. 253-256 (Year: 2016).
Qu et al, "Metadata Type System: Integrate Presentation, Data Models and Extraction to Enable Exploratory Browsing Interfaces," ACM, pp. 107-116 (Year: 2014).
Radu, et al, "Analyzing Risk Evaluation Frameworks and Risk Assessment Methods," IEEE, Dec. 12, 2020, pp. 1-6 (Year: 2020).
Rakers, "Managing Professional and Personal Sensitive Information," ACM, pp. 9-13, Oct. 24-27, 2010 (Year: 2010).
Reardon et al., User-Level Secure Deletion on Log-Structured File Systems, ACM, 2012, retrieved online on Apr. 22, 2021, pp. 1-11. Retrieved from the Internet: URL: http://citeseerx.ist.psu.edu/viewdoc/download;jsessionid=450713515DC7F19F8ED09AE961D4B60E. (Year: 2012).

(56) References Cited

OTHER PUBLICATIONS

Regulation (EU) 2016/679, "On the protection of natural persons with regard to the processing of personal data and on the free movement of such data, and repealing Directive 95/46/EC (General Data Protection Regulation)," Official Journal of the European Union, May 4, 2016, pp. L 119/1-L 119/88 (Year: 2016).
Roesner et al, "Detecting and Defending Against Third-Party Tracking on the Web," 9th USENIX Symposium on Networked Systems Design and Implementation, Apr. 11, 2013, pp. 1-14, ACM (Year: 2013).
Rozepz, "What is Google Privacy Checkup? Everything You Need to Know," Tom's Guide web post, Apr. 26, 2018, pp. 1-11 (Year: 2018).
Sachinopoulou et al, "Ontology-Based Approach for Managing Personal Health and Wellness Information," IEEE, pp. 1802-1805 (Year: 2007).
Salim et al, "Data Retrieval and Security using Lightweight Directory Access Protocol", IEEE, pp. 685-688 (Year: 2009).
Sanchez-Rola et al, "Can I Opt Out Yet?: GDPR and the Global Illusion of Cookie Control," Proceedings of the 2019 ACM Asia Conference on Computer and Communications Security, 2019, pp. 340-351 (Year: 2019).
Santhisree, et al, "Web Usage Data Clustering Using Dbscan Algorithm and Set Similarities," IEEE, pp. 220-224 (Year: 2010).
Final Office Action, dated Oct. 28, 2021, from corresponding U.S. Appl. No. 17/234,205.
Final Office Action, dated Oct. 29, 2021, from corresponding U.S. Appl. No. 17/020,275.
Final Office Action, dated Sep. 17, 2021, from corresponding U.S. Appl. No. 17/200,698.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Office Action, dated Apr. 1, 2021, from corresponding U.S. Appl. No. 17/119,080.
Office Action, dated Apr. 12, 2022, from corresponding U.S. Appl. No. 17/670,341.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 18, 2022, from corresponding U.S. Appl. No. 17/670,349.
Office Action, dated Apr. 2, 2021, from corresponding U.S. Appl. No. 17/151,334.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Apr. 8, 2022, from corresponding U.S. Appl. No. 16/938,509.
Office Action, dated Aug. 12, 2022, from corresponding U.S. Appl. No. 17/679,734.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 17, 2022, from corresponding U.S. Appl. No. 17/373,444.
Office Action, dated Aug. 17, 2022, from corresponding U.S. Appl. No. 17/836,430.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 19, 2022, from corresponding U.S. Appl. No. 17/584,187.
Office Action, dated Aug. 2, 2022, from corresponding U.S. Appl. No. 17/670,354.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Bujlow et al, "Web Tracking: Mechanisms, Implications, and Defenses," Proceedings of the IEEE, Aug. 1, 2017, vol. 5, No. 8, pp. 1476-1510 (Year: 2017).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al, "Enforcing Access Control Over Data Streams," ACM, pp. 21-30 (Year: 2007).
Carpineto et al, "Automatic Assessment of Website Compliance to the European Cookie Law with CooLCheck," Proceedings of the 2016 ACM on Workshop on Privacy in the Electronic Society, 2016, pp. 135-138 (Year: 2016).
Castro et al, "Creating Lightweight Ontologies for Dataset Description," IEEE, pp. 1-4 (Year: 2014).
Cerpzone, "How to Access Data on Data Archival Storage and Recovery System", https://www.saj.usace.army.mil/Portals/44/docs/Environmental/Lake%20O%20Watershed/15February2017/How%

(56) References Cited

OTHER PUBLICATIONS

20To%20Access%20Model%20Data%20on%20DASR.pdf?ver=2017-02-16-095535-633, Feb. 16, 2017.

Cha et al, "A Data-Driven Security Risk Assessment Scheme for Personal Data Protection," IEEE, pp. 50510-50517 (Year: 2018).

Cha, et al, "Process-Oriented Approach for Validating Asset Value for Evaluating Information Security Risk," IEEE, Aug. 31, 2009, pp. 379-385 (Year: 2009).

Chang et al, "A Ranking Approach for Human Age Estimation Based on Face Images," IEEE, 2010, pp. 3396-3399 (Year: 2010).

Chapados et al, "Scoring Models for Insurance Risk Sharing Pool Optimization," 2008, IEEE, pp. 97-105 (Year: 2008).

Cheng, Raymond, et al, "Radiatus: A Shared-Nothing Server-Side Web Architecture," Proceedings of the Seventh ACM Symposium on Cloud Computing, Oct. 5, 2016, pp. 237-250 (Year: 2016).

Choi et al, "A Survey on Ontology Mapping," ACM, pp. 34-41 (Year: 2006).

Choi et al, "Retrieval Effectiveness of Table of Contents and Subject Headings," ACM, pp. 103-104 (Year: 2007).

Chowdhury et al, "A System Architecture for Subject-Centric Data Sharing", ACM, pp. 1-10 (Year: 2018).

Chowdhury et al, "Managing Data Transfers in Computer Clusters with Orchestra," ACM, pp. 98-109 (Year: 2011).

Civili et al, "Mastro Studio: Managing Ontology-Based Data Access Applications," ACM, pp. 1314-1317, Aug. 26-30, 2013 (Year: 2013).

Cruz et al, "Interactive User Feedback in Ontology Matching Using Signature Vectors," IEEE, pp. 1321-1324 (Year: 2012).

Cudre-Mauroux, "ESWC 2008 Ph.D. Symposium," The ESWC 2008 Ph.D. Symposium is sponsored by the Okkam project (http://fp7.okkam.org/), MIT, pp. 1-92 (Year: 2008).

Cui et al, "Domain Ontology Management Environment," IEEE, pp. 1-9 (Year: 2000).

Czeskis et al, "Lightweight Server Support for Browser-based CSRF Protection," Proceedings of the 22nd International Conference on World Wide Web, 2013, pp. 273-284 (Year: 2013).

Decision Regarding Institution of Post-Grant Review in Case PGR2018-00056 for U.S. Pat. No. 9,691,090 B1, Oct. 11, 2018.

Degeling et al, "We Value Your Privacy . . . Now Take Some Cookies: Measuring the GDPRs Impact on Web Privacy," arxiv.org, Cornell University Library, 201 Olin Library Cornell University, Ithaca, NY 14853, Aug. 15, 2018, pp. 1-15 (Year: 2019).

Dimou et al, "Machine-Interpretable Dataset and Service Descriptions for Heterogeneous Data Access and Retrieval", ACM, pp. 145-152 (Year: 2015).

Dokholyan et al, "Regulatory and Ethical Considerations for Linking Clinical and Administrative Databases," American Heart Journal 157.6 (2009), pp. 971-982 (Year: 2009).

Dowling, "Auditing Global HR Compliance," published May 23, 2014, retrieved from https://www.shrm.org/resourcesandtools/hr-topics/ global-hr/pages/auditing-global-hr-compliance.aspx Jul. 2, 2022 (Year: 2014).

Dunkel et al, "Data Organization and Access for Efficient Data Mining", IEEE, pp. 522-529 (Year: 1999).

Dwork, Cynthia, Differential Privacy, Microsoft Research, p. 1-12.

Edinger et al, "Age and Gender Estimation of Unfiltered Faces," IEEE, 2014, pp. 2170-2179 (Year: 2014).

Emerson, et al, "A Data Mining Driven Risk Profiling Method for Road Asset Management," ACM, pp. 1267-1275 (Year: 2013).

Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.

Everypixel Team, "A New Age Recognition API Detects the Age of People on Photos," May 20, 2019, pp. 1-5 (Year: 2019).

Ex Parte Quayle Action, dated May 10, 2022, from corresponding U.S. Appl. No. 17/668,714.

Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.

Falbo et al, "An Ontological Approach to Domain Engineering," ACM, pp. 351-358 (Year: 2002).

Fan et al, "Intrusion Investigations with Data-hiding for Computer Log-file Forensics," IEEE, pp. 1-6 (Year: 2010).

Final Written Decision Regarding Post-Grant Review in Case PGR2018-00056 for U.S. Pat. No. 9,691,090 B1, Oct. 10, 2019.

Francis, Andre, Business Mathematics and Statistics, South-Western Cengage Learning, 2008, Sixth Edition.

Friedman et al, "Data Mining with Differential Privacy," ACM, Jul. 2010, pp. 493-502 (Year: 2010).

Friedman et al, "Informed Consent in the Mozilla Browser: Implementing Value-Sensitive Design," Proceedings of the 35th Annual Hawaii International Conference on System Sciences, 2002, IEEE, pp. 1-10 (Year: 2002).

Frikken, Keith B., et al, Yet Another Privacy Metric for Publishing Micro-data, Miami University, Oct. 27, 2008, p. 117-121.

Fung et al, "Discover Information and Knowledge from Websites using an Integrated Summarization and Visualization Framework", IEEE, pp. 232-235 (Year: 2010).

Gajare et al, "Improved Automatic Feature Selection Approach for Health Risk Prediction," Feb. 16, 2018, IEEE, pp. 816-819 (Year: 2018).

Geko et al, "An Ontology Capturing the Interdependence of the General Data Protection Regulation (GDPR) and Information Security," ACM, pp. 1-6, Nov. 15-16, 2018 (Year: 2018).

Ghiglieri, Marco et al.; Personal DLP for Facebook, 2014 IEEE International Conference on Pervasive Computing and Communication Workshops (Percom Workshops); IEEE; Mar. 24, 2014; pp. 629-634.

Gilda, et al, "Blockchain for Student Data Privacy and Consent," 2018 International Conference on Computer Communication and Informatics, Jan. 4-6, 2018, IEEE, pp. 1-5 (Year: 2018).

Golab, et al, "Issues in Data Stream Management," ACM, SIGMOD Record, vol. 32, No. 2, Jun. 2003, pp. 5-14 (Year: 2003).

Golfarelli et al, "Beyond Data Warehousing: What's Next in Business Intelligence?," ACM, pp. 1-6 (Year: 2004).

Gonçalves et al, "The XML Log Standard for Digital Libraries: Analysis, Evolution, and Deployment," IEEE, pp. 312-314 (Year: 2003).

Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.

Gowadia et al, "RDF Metadata for XML Access Control," ACM, pp. 31-48 (Year: 2003).

Final Office Action, dated Mar. 13, 2023, from corresponding U.S. Appl. No. 17/161,159.

International Search Report, dated Jan. 27, 2023, from corresponding International Application No. PCT/US2022/045520.

Notice of Allowance, dated Feb. 14, 2023, from corresponding U.S. Appl. No. 17/373,444.

Notice of Allowance, dated Feb. 2, 2023, from corresponding U.S. Appl. No. 17/850,244.

Notice of Allowance, dated Jan. 25, 2023, from corresponding U.S. Appl. No. 17/675,760.

Notice of Allowance, dated Mar. 13, 2023, from corresponding U.S. Appl. No. 17/200,698.

Office Action, dated Feb. 2, 2023, from corresponding U.S. Appl. No. 17/872,266.

Written Opinion of the International Searching Authority, dated Jan. 27, 2023, from corresponding International Application No. PCT/US2022/045520.

Hammer, Eran et al., "The OAuth 2.0 Authorization Framework draft-ietf-oauth-v2-26," Internet Engineering Task Force, IETF; StandardWorkingDraft, Internet Society (ISOC) 4, Rue Des Falaises CH- 1205 Geneva, Switzeriand, Jun. 8, 2012 (Jun. 8, 2012), pp. 1-71, XP015083227, [retrieved on Jun. 8, 2012] the whole document.

(56) References Cited

OTHER PUBLICATIONS

Invitation to Pay Additional Fees, dated May 2, 2023, from corresponding International Application No. PCT/JS2023/011446.
Office Action, dated May 4, 2023, from corresponding U.S. Appl. No. 18/096,935.

* cited by examiner

DATA PROCESSING SYSTEMS AND METHODS FOR PREVENTING EXECUTION OF AN ACTION DOCUMENTING A CONSENT REJECTION

CROSS-REFERENCE TO RELATED APPLICATIONS

This application is a continuation of U.S. patent application Ser. No. 17/476,209, filed Sep. 15, 2021, which claims the benefit of U.S. Provisional Patent Application Ser. No. 63/078,560, filed Sep. 15, 2020, which are hereby incorporated herein by reference in their entirety.

BACKGROUND

Various websites use tracking tools, such as cookies, to track a user and/or the user's behavior as they are using a browser application (or simply browser) to visit one or more webpages. Such tracking tools may, for example, track a user's interests, location, age, and/or search trends by detecting and analyzing the user's interaction with the webpages. While this information may be used by a website provider to enhance the user's experience, this information may also, or instead, be provided (e.g., sold) to third parties that may use the information, for example, to provide the user with advertisements that are customized to the user. On some websites, the tracking tools themselves are created and/or provided by the third parties seeking to collect user information.

Privacy laws and regulations may require that websites obtain consent from a user before using tracking tools to collect a user's personal data. Many users consent to the use of such tracking tools because the use of tracking tools may enhance the user's experience on websites. For example, some users may consent to the use of cookies as they browse on-line shopping websites because they want to receive offers (e.g., discounts, coupons) that are tailored to their needs and interests. Some users, on the other hand, prefer to block the use of some or all tracking tools. This has resulted in a demand for automated tools to reject the use of tracking tools.

To fill this demand, various developers now offer automated applications that can be integrated into a web browser application (e.g., add-ins, extensions, plug-ins, etc.) that automatically reject any request for consent to use tracking tools.

SUMMARY

In some aspects, a consent management computing system forgoes updating consent data for at least one invocation of a consent rejection function by an automated consent rejection tool. For instance, a system can include the consent management computing system communicatively coupled to a user device. The user device can detect browser states of a browser application, such as requests for online content, and can also detect invocations of a consent rejection function. The consent management computing system can document consent rejection for at least one of the invocations. The consent management computing system can also prevent documentation for at least one additional consent rejection via an invocation initiated by an automated consent rejection tool.

In some aspects, a method is provided that involves operations performed by computing hardware. The operations can include detecting a browser state of a browser application executed on a user device, such as a request for a webpage, and transmitting an instruction to the browser application instructing the browser application to present a consent request interface on the user device. The consent request interface can be generated by configuring, on the consent request interface, a first control element configured to invoke a consent rejection function and a second control element configured to invoke a consent acceptance function. The operations can also include detecting an invocation of the consent rejection function as well as an additional invocation of the consent rejection function. The operations can also include documenting a consent rejection via the invocation of the consent rejection function, determining that the additional invocation was initiated by an automated consent rejection tool, and preventing documentation of the rejection of consent via the additional invocation.

In some aspects, a non-transitory computer-readable medium storing program code is provided. When executed by processing hardware, the program code configures the processing hardware to perform operations. The operations can include generating, based on a browser application accessing online content, a consent request interface associated with the webpage and transmitting an instruction to the browser application instructing the browser application to present the consent request interface on the user device. The operations can also include detecting invocations of a consent rejection function accessible via the consent request interface. The operations can also include can also include documenting a consent rejection via at least one of the invocations of the consent rejection function, and preventing documentation of the consent rejection via another invocation. An automated consent rejection tool can invoke the consent rejection function.

In some aspects, determining that an invocation was initiated by an automated consent rejection tool involves determining that data associated with the invocation does not comprise a valid token.

In additional or alternative aspects, determining that an invocation was initiated by an automated consent rejection tool involves determining that a consent request interface was not visible to a user of the user device when the invocation occurred.

In additional or alternative aspects, determining that an invocation was initiated by an automated consent rejection tool involves determining that the function call counter exceeds a threshold. Examples of a threshold include a number of function calls and a rate of function calls.

BRIEF DESCRIPTION OF THE DRAWINGS

Various aspects of a system and method for automatically redacting unstructured data from a data subject access request are described below. In the course of this description, reference will be made to the accompanying drawings, which are not necessarily drawn to scale, and wherein.

DETAILED DESCRIPTION

Figure 1:
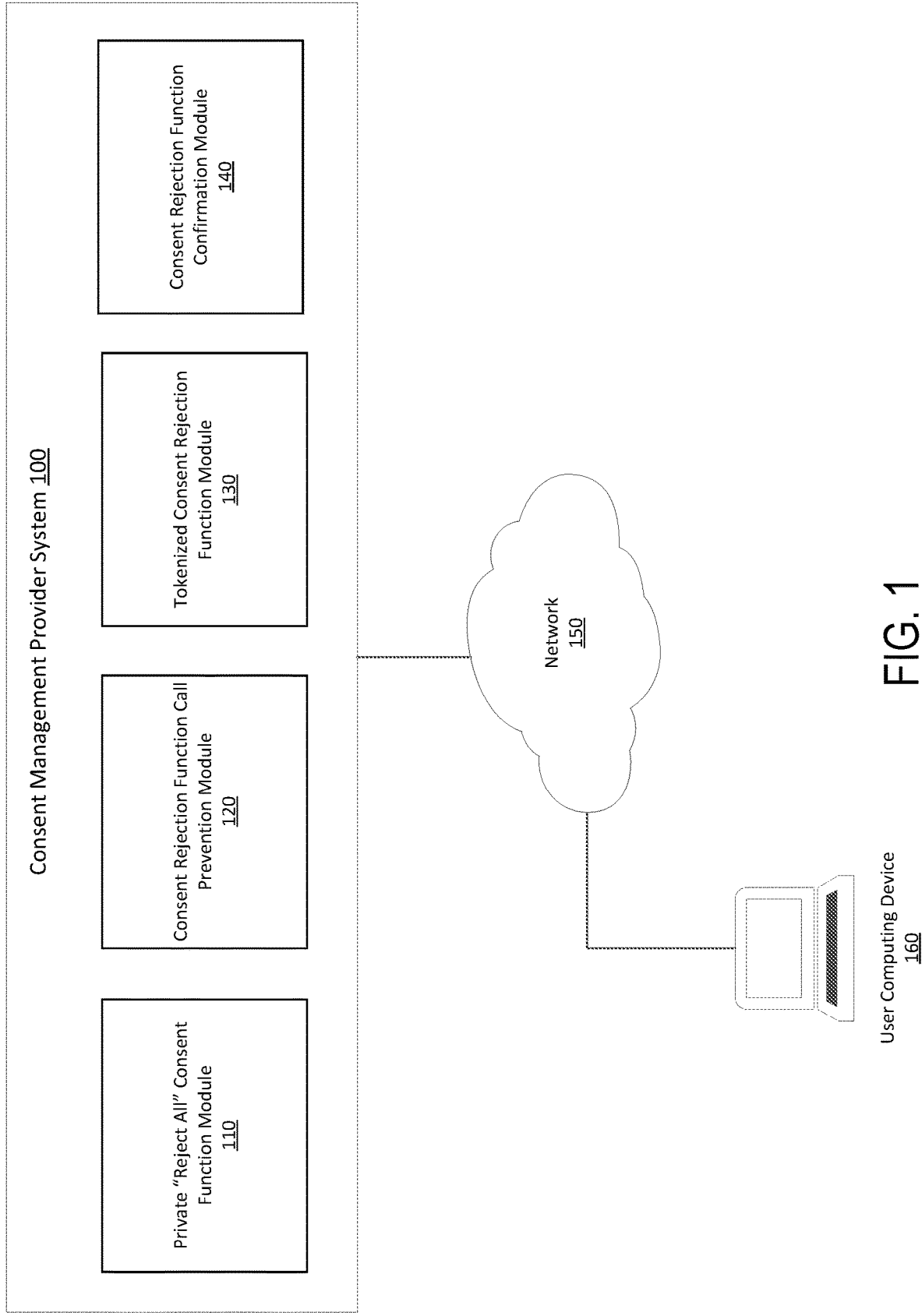
FIG. 1 depicts an example of a computing environment for detecting use of technologies that automatically attempt to block the presentation of a consent request and/or the receipt of consent from a user according to various aspects.

Various aspects now will be described more fully hereinafter with reference to the accompanying drawings. It should be understood that the invention may be embodied in many different forms and should not be construed as limited to the embodiments set forth herein. Rather, these aspects are provided so that this disclosure will be thorough and complete, and will fully convey the scope of the invention to those skilled in the art. Like numbers refer to like elements throughout.

Detection and Prevention of Automated Consent Rejection Tools

The use of tracking tools (e.g., "cookies") that collect information about a user's interactions with a website and/or webpage has steadily increased over time, as have the privacy laws and regulations applicable to the use of such tools. These laws and regulations may require that websites obtain consent from a user before using tracking tools to collect the user's personal data and/or other interaction information. With the increased use of tracking tools has come an increase in the use of automated consent rejection applications or tools. These tools are designed to block the presentation of an interface or other means of requesting tracking tool consent. The intent of such tools is to automatically deny consent to the use of tracking tools. However, without user interaction with a consent request interface or other consent request means, it may be unclear as to whether affirmation or denial of user consent was actually received.

Automated consent rejection tools may take many forms. The automated consent rejection tool includes program code executable by processing hardware to perform one or more operations, such as issue one or more calls to execute a method or function that rejects or denies a website's request to collect user data (e.g., personal data) and/or may simulate a click, virtually submit, and/or otherwise activate one or more of control elements to simulate a user clicking, submitting, or otherwise activating the one or more elements to deny or reject consent on behalf of the user. The program code for the automated consent rejection tool can be installed on a computing device of a user who is visiting a website. In one example, such an automated consent rejection tool may take the form of a browser extension (which may be referred to as a "plug-in" or an "add-in") integrated into a browser application that automatically blocks a request for consent. A browser application can include a software tool for accessing content, software functions, or other features over the Internet. Examples of a browser application include, but are not limited to, a software application for accessing different websites (e.g., a CHROME® browser or a MICROSOFT EDGE® browser), an application installed on a computing device that is designed to access specific content providers (e.g., a social media application or a banking application for a specific bank), etc.

These automated consent rejection extensions may issue one or more calls to execute a method or function that rejects or denies a website's request to collect user data (e.g., personal data). For example, an automated consent rejection extension may call a function that rejects all requests for consent (e.g., a "RejectAll( )" function or any similar function or method, may be referred to as a "reject all" method or function). By performing such a function call, the extension may automatically suppress a banner or prevent other means of requesting consent from being presented to a user.

An automated consent rejection extension may also, or instead, scan the text of a webpage and/or associated code (e.g., HTML code) for one or more elements (e.g., HTML elements) associated with denying or rejecting a request (e.g., all requests) for consent. In response to detecting such elements, the extension may simulate a click, virtually submit, and/or otherwise activate one or more of the detected elements to simulate a user clicking, submitting, or otherwise activating the one or more elements to deny or reject consent on behalf of the user. By performing these actions before the webpage has time to fully render the user interface on the screen, the extension may suppress a banner or prevent other means of requesting consent from being seen by the user at all.

In various aspects, a system for detecting an automated consent rejection tool may be configured to detect the use of technologies that automatically attempt to block the presentation of a consent request and/or the receipt of consent from a user. Such a system may be a consent management provider (CMP) system that obtains and manages consent data on behalf of an entity. The system, in response to detecting such a tool, may take steps to ensure that a request for consent is still presented to a user, despite the presence and/or execution of the automated consent rejection tool.

Generation and Use of Private Consent Rejection Methods and Functions

Automated consent rejection tools will often use a call to a public method or function configured on a webpage that rejects or denies all requests presented for consent, such as a banner, interface, or other visual request to approve the use of one or more tracking tools (e.g., cookies). A "public" method or function is a method or function that has a commonly used name for such functions and/or methods that reject requests for consent so that automated consent rejection tools are able to recognize such functions or methods more easily on a webpage. Alternatively, or in addition, automated consent rejection tools may scan code (e.g., HTML code) associated with a webpage to identify text that may be associated with one or more elements for denying or rejecting a request for consent and then simulate and/or submit a click corresponding to such elements. In response to detecting the call of such a method or function and/or the simulation of a click of a reject/deny element (e.g., based on and/or in combination with various criteria), the system may reject the call or click and/or request user intervention in order to complete execution of the method or function.

In various aspects, in order to prevent an automated consent rejection tools from preemptively closing a request for consent, the system may configure a webpage with a private method or function that, when called, may deny (e.g., all) requests for consent (e.g., via a banner requesting consent to use cookies). Here, a "private" method or function is a method or function given a name that is not commonly used by functions and/or methods that reject requests for consent and are generally unrecognizable by automated consent rejection tools. Therefore, in particular aspects, the system may obfuscate the calls to such private methods and/or functions to form obfuscated consent rejection functions so that they do not have standardized names and/or are not publicly or commonly known. In such aspects, the system may label such functions and/or methods with names based on, or associated with, the particular domain at which they are to be used. For example, rather than using a common and/or public call name (e.g., "RejectAll( )") for a function that rejects all requests for consent, the system may label such a "reject all" function configured on a first webpage in a first domain with a first particular label (e.g., "9d7fa9( )") and a different particular name for a similar function configured on a second webpage in a second domain (e.g., "adskfjoi0( )"). By using such customized and/or private function/method calls, the system may prevent automated consent rejection tools from blocking banners and/or other requests for consent by ensuring that the names of the functions or methods for rejecting all requests for consent remain unknown to such automated tools and/or difficult to discover. In such aspects, these automated tools may have no way of determining the proper means to call the private (or obfuscated) function or method, and therefore, no way to easily and generally deny all requests for consent. Also, with various websites and/or webpages using different private or obfuscated names for such functions, a provider of automated tools for blocking consent requests will have much greater difficulty in calling such functions because it will be much more difficult to discover and maintain up-to-date knowledge of each particular private function name, rather than one or a handful of commonly used names for functions or methods that reject all requests for consent.

In particular aspects, the system may configure a webpage with one or more private "reject all" method/function calls and one or more public "reject all" method/function calls. In other aspects, the system may configure a webpage with only private "reject all" method/function calls or public "reject all" method/function calls. In various aspects, the system may also, or instead, configure a webpage with any combination of any number of public and/or private "accept all" functions or methods that accept or provide consent to all requests for consent.

In aspects that include the use of a public "reject all" method or function call (e.g., "RejectAll( )"), for example, in a webpage that is also configured with a private "reject all" method or function call, the system may configure the code associated with the public method of function call to perform no functions or no function related to rejecting consent. For example, the system may configure such a method or function to be empty, return without taking any consent rejection actions, return null, and/or perform other actions that do not reject consent. A consent rejection action includes program code executable by processing hardware to perform one or more operations, such as recording the consent rejection and/or blocking the use of a tracking tool used on a website. For example, a consent rejection action may involve recording the consent rejection in some type of repository for documentation purposes. In addition, a consent rejection action may involve blocking the use of some type of tracking tool such as a cookie. The program code for a consent rejection action can be installed on a server within a CMP system or on a computing device being used by the user who is visiting the website.

In particular aspects, a public "reject all" method or function may be configured to perform consent rejection actions, but those actions may differ from those performed by an obfuscated "reject all" method or function. In this way, the system may be able to detect and track the issuer of calls to such methods or functions. For example, the system may determine and/or record that an internal system issued a call to the obfuscated "reject all" method or function by virtue of the call being made to the obfuscated "reject all" method or function, whereas the system may determine and/or record that an external system issued a call to the public "reject all" method or function by virtue of the call being made to the "reject all" method or function that is available and/or known outside of internal systems.

In various aspects that employ one or more private function or method calls that reject all requests for consent, the system may "seed" (e.g., insert, include) the values or labels for such calls into one or more scripts and/or code associated with a website and/or webpage so that these values would be known to the system, but difficult or impossible for a third party (e.g., a provider of automated tools for blocking consent requests) to guess or discover. In this way, the system may ensure that such private function or method calls are available to it without making such calls public. In particular aspects, the system may generate a name for such a function or method randomly, based at least in part on website-related and/or webpage-related information (e.g., domain, URL, etc.), based at least in part on any other information, and/or based at least in part on any combination thereof.

Detection and Blocking of Automated Consent Rejection Tools

In various aspects, the system may be configured to also, or instead, enable the use of one or more public methods or functions to deny or reject all requests for consent (e.g., a public "reject all" method or function), but may analyze the manner in which a call to such a function or method is made to determine if the particular function/method is being called by an automated consent rejection tool.

In particular aspects, the system may analyze the timing of a call to a particular function or method to deny or reject a request for consent (e.g., a call to a public "reject all" method or function) to determine whether the function call is likely to have been made by an automated tool. The system may determine whether such a function call was made before or after the presentation of the request for consent has been rendered to the user. If the function call was made before the webpage was able to render the request for consent (e.g., via a consent request interface) to the user, the system may determine that such a call was made by an automated tool because the call was made before a human user reasonably would have been able (e.g., would have been physically able) to see and respond to the request such as, for example, by clicking on a control element configured in the consent request interface that would have generated a call to the consent rejection function or method. Here, for example, the consent request interface may have been generated to include a first control element, such as a button, dropdown menu, checkbox, etc., that can be activated (e.g., click on) to generate the call to the consent rejection function or method. In addition, the consent request interface may have been generated to include a second control element, such as a button, dropdown menu, checkbox, etc., that can be activated (e.g., click on) to generate a call to a consent acceptance function or method. A consent acceptance function includes program code executable by processing hardware to perform one or more operations, such as submitting and/or recording a consent acceptance from the user who is visiting the website to allow for performance of one or more actions on the web site such as the use of a tracking tool to collect data (e.g., personal data) on the user. The program code for a consent acceptance function can be installed on a server within a CMP system or on a computing device being used by the user who is visiting the web site.

If the system determines that the function call was made before the consent request interface was presented to a user or otherwise rendered, the system may take steps in response to ensure that a request for consent is presented to the user. For example, if the system determines that the function call was made before the consent request interface was presented, the system may not process such a call as a valid consent rejection or may otherwise perform no consent rejection actions despite the function call. The system may also, or instead, continue to take steps to generate, present, and/or render the consent request interface (e.g., on a web browser application executing on a user device). In some aspects, in response to determining that the function call was made after the consent request interface was rendered, but faster than a human reasonably could have responded to seeing the consent request interface (e.g., the function call was made within 10 milliseconds—or another predetermined period of time—of the consent request interface being rendered), the system may not process such a call as a valid consent rejection or may otherwise perform no consent rejection actions despite the function call.

If the system determines that the call was made some time after the webpage was able to generate, present, and/or render the consent request interface (e.g., on a web browser application executing on a user device), the system may determine that such a call could have been the result of human user interaction in response to the request for consent (e.g., by a human user clicking on a control on the consent request interface that activated a call to the function or method to reject consent). In this case, the system may process the consent rejection normally or otherwise process the call to the consent rejection function as a valid call.

In various aspects, the system may analyze the number and/or frequency (e.g., rate) of multiple calls to one or more consent rejection functions or methods to deny or reject (e.g., all) requests for consent to determine whether the calls were likely to have been made by an automated tool. For example, by analyzing the number of calls to a rejection function, the number of calls to the rejection function in a certain period of time (frequency/rate), or the number of calls to the rejection function during a particular activity (e.g., a single loading of the webpage), the system may determine whether the number or rate of function calls corresponds to human activity or to the actions of an automated tool. If many calls to a consent rejection method or function were made (e.g., 30-40 calls), or many calls were made in a short amount of time (e.g., 30-40 times or more in a very brief time period, such as during the loading of a single webpage), the system may determine that such multiple calls were made by an automated tool. In response, the system may not process such calls as valid consent rejections or otherwise may perform no consent rejection actions despite the multiple calls to the consent rejection function. In such cases, the system may continue to take steps to ensure that a request for consent is presented to the user by, for example, generating, presenting, and/or rendering the consent request interface (e.g., on a web browser application executing on a user device) despite the consent rejection function calls.

If a call to a consent rejection method or function is made only once or multiple calls are made a relatively few times (e.g., 1-5 times, less than 10 times, etc.), the system may determine that calls were made by a human user (e.g., clicking a control on a consent request interface once or a few times). In this case, the system may process the consent rejection normally or otherwise process the call to the consent rejection function as a valid function call.

In various aspects, the system may analyze information provided or associated with a call to a function or method to deny or reject (e.g., all) requests for consent to determine whether the call is likely to have been made by an automated tool. For example, the system may integrate a requirement that a signed token be "passed" in (e.g., provided within or associated with) the call to a public "reject all" function on a particular website (e.g., "RejectAll(signed_key)"). This token may be generated and passed to the system when the function call is generated using the controls on a consent request interface that may be manipulated by a user. However, an automated tool that generates function calls automatically and sends them directly to the system (e.g., without user interaction with the consent request interface) may not have knowledge or means of generating and passing such a token. Because the automated tool cannot generate an appropriate token, the function calls generated by such a tool may be detected by the system by virtue of the absence of such a token in the tool's function calls.

In such aspects, when a function is called via a webpage (e.g., in response to manual human user interaction with a consent request interface), the system may evaluate the token generated by the web page in response to the user interaction and transmitted in the function call to the system to determine whether it corresponds to an appropriate webpage-generated token (e.g., a token associated with an owner, operator, or other authorized entity associated with the webpage or associated website, etc.) or not. If not, the system may determine that the function call was made by an automated tool and take steps to ensure that a request for consent is still presented to the user and may not perform consent rejection actions. In this way, the system may distinguish between a function call generated by a user directly activating a control element on the webpage and a function call automatically made and transmitted directly to the system by a browser extension or other automated consent rejection tool. In determining whether a call is likely to have been made by an automated tool, the system may analyze any information that may be passed by a call to a function or method, or any information associated with a function or method.

In various aspects, the system may take additional steps to determine whether a call to a consent rejection function was made by, or otherwise originated with, a human user. For example, if the system determines, using any one or more of the methods set forth herein, that one or more calls to a consent rejection method or function have likely been made by an automated consent rejection tool, the system may be configured to take one or more additional steps to ensure that the denial of the request for consent was not received from a human user. Alternatively, or in addition, if the system determines, using any one or more of the methods set forth herein, that one or more calls to a consent rejection method or function have likely been made by a human user and not by an automated tool, the system may be configured to take one or more additional steps to ensure that the denial of the request for consent was not received from an automated consent rejection tool. A consent rejection function includes program code executable by processing hardware to perform one or more operations, such as submitting and/or recording a consent rejection from the user who is visiting the website and has declined performance of one or more activities on the website, such as the use of a tracking tool to collect data (e.g., personal data) on the user, and/or taking steps to block performance of the one or more activities. The program code for a consent rejection function can be installed on a server within a CMP system or on a computing device being used by the user who is visiting the website.

In various aspects, in order to determine whether a call to a consent rejection function originated with a human user, the system may, in response to a detection of such a function call, prevent or suspend the execution of the call and present a consent rejection confirmation interface that requests further user input regarding consent despite the function call. In particular aspects, the system may suspend the execution of the call and present an interface to the user requesting manual confirmation that a human user is interacting with the system by providing a specific type of input, such as typing in characters recognized in an image (e.g., text "CAPTCHA") and/or selecting one or more images that include a particular item from a group of images (e.g., image "CAPTCHA"). If the user provides the appropriate input, the system may determine to confirm that the user is a human user and may continue or allow the execution of the consent rejection function call. If the user fails to provide the appropriate input to the consent rejection confirmation interface, the system may cancel the execution of the consent rejection function. In such cases, the system may also continue to attempt to obtain consent from a human user.

Example Computing Environment

Referring now to the figures, FIG. 1 depicts an example of a computing environment for detecting an automated consent rejection tool being used to automatically attempt to block the presentation of a consent request and/or the receipt of consent from a user according to various aspects. Here, a user on a user computing device 160 may be visiting a website and requesting to render a webpage for the website. The user may be using a browser application residing on the user computing device 160 that includes a browser extension configured for blocking consent requests (e.g., an automated consent rejection extension). In some instances, the automated consent rejection extension may automatically submit a call to a "reject all" method or function associated with the webpage. In other instances, the automated consent rejection extension may simulate a click to activate one or more elements to simulate the user clicking the elements to deny or reject consent on behalf of the user and as a result, submitting the call to the "reject all" method or function. Thus, the call may be communicated over a network 150 to a consent management provider (CMP) system 100 as shown in FIG. 1

The CMP system 100 or a computing system that provides a website that can execute program code for providing one or more interfaces, such as a consent request interface or a consent rejection confirmation interface. Each of these interfaces includes program code executable by processing hardware to perform one or more functions. These functions can include detecting events generated by an input device that is operated by a user (e.g., mouse clicks, dragging inputs, taps, pinches, applying pressure with a stylus, etc.). Additionally or alternatively, these functions can include implementing commands indicated by the user-generated events.

In one example, a consent request interface could include one or more sets of program code that control the operation of a display device (e.g., by rendering one or more interfaces on the display device that solicit input indicative of a consent to a transaction) and obtain data for transmission to a remote computing system (e.g., by receiving the input indicative of a consent to a transaction). For instance, one or more interface elements (e.g., menus, pop-up dialogs, etc.) within the consent request interface could allow an input device to provide input indicating consent to a transaction. One or more event listeners for the consent request interface can detect events, such as data entry in certain fields or menu selections, that are used to indicate consent. These events could include detecting interaction with the consent request interface itself (e.g., clicking a displayed button) or detecting interaction with other content in which the consent request interface is displayed (e.g., clicking on features provided by a website after the consent request interface notifies a user that continued interaction indicates consent). The program code for the consent request interface could include or communicate with other program code for transmitting consent data (e.g., the input or control data derived from the input) to the CMP system 100 or a computing system that provides a website.

Additionally or alternatively, a consent rejection confirmation interface could include one or more sets of program code that control the operation of a display device (e.g., by rendering one or more interfaces on the display device that solicit input confirming rejection of consent to a transaction) and obtain data for transmission to a remote computing system (e.g., by receiving the input confirming the rejection of consent). For instance, one or more interface elements (e.g., menus, pop-up dialogs, etc.) within the consent rejection confirmation interface could allow an input device to provide input confirming that consent to a transaction has been rejected. One or more event listeners for the consent rejection confirmation interface can detect events, such as data entry in certain fields or menu selections, that are used to provide this input. These events could include detecting interaction with the consent rejection confirmation interface itself (e.g., clicking a displayed button) or detecting interaction with other content in which the consent rejection confirmation interface is displayed (e.g., clicking on features provided by a website after the consent rejection confirmation interface notifies a user that continued interaction indicates consent). The program code for the consent rejection confirmation interface could include or communicate with other program code for transmitting consent data (e.g., the input or control data derived from the input) to the CMP system 100 or a computing system that provides a website.

Accordingly, in various aspects, the CMP system 100 receiving the call to the "reject all" method or function from the user computing device 160 may comprise one or more servers executing a number of different modules to perform the functionality as just described. Specifically, in particular aspects, the CMP system 100 includes a Private "Reject All" Consent Function Module 110. The Private "Reject All" Consent Function Module 110 is configured in various aspects to determine whether to perform the functionality associated with the call or not. For instance, in some aspects, the Private "Reject All" Consent Function Module 110 determines whether the call has been made to an obfuscated "reject all" method or function or a public "reject all" method or function and performs corresponding actions accordingly. For example, the Private "Reject All" Consent Function Module 110 may reject all consent for the user (e.g., process the consent rejection for the user) if the call has been made to an obfuscated "reject all" function and perform no consent rejection action for the user (e.g., not process the consent rejection for the user) if the call has been made to a public "reject all" function.

In addition, in particular aspects, the CMP system 100 includes a Consent Rejection Function Call Prevention Module 120. The Consent Rejection Function Call Prevention Module 120 is configured to in some aspects to determine whether the call has been received before a consent interface can be rendered and displayed to the user. If this is the case, then the Consent Rejection Function Call Prevention Module 120 does not process the consent rejection for the user. In addition, the Consent Rejection Function Call Prevention Module 120 is configured in some aspects to determine whether the call results in a number of calls being made to the method or function that exceeds a threshold. If this is the case, then the Consent Rejection Function Call Prevention Module 120 also does not process the consent rejection for the user.

Further, in particular aspects, the CMP system 100 includes a Tokenized Consent Rejection Function Module 130. The Tokenized Consent Rejection Function Module 130 is configured in various aspects to determine whether the call received from the user device 160 is associated with a valid token. If so, then the call is considered to have originated from the user and the Tokenized Consent Rejection Function Module 130 processes the consent rejection accordingly. If not, then the Tokenized Consent Rejection Function Module 130 does not process the consent rejection for the user.

Finally, in particular aspects, the CMP system 100 includes a Consent Rejection Function Confirmation Module 140. The Consent Rejection Function Confirmation Module 140 is configured to determine whether the call has likely originated from the user (e.g., a human) or an automated tool. If the Consent Rejection Function Confirmation Module 140 determines the call has not likely originated from the user, then the Consent Rejection Function Confirmation Module 140 presents a consent rejection confirmation interface to the user to confirm the consent rejection. If the user does confirm the consent rejection through the consent rejection confirmation interface, then the Consent Rejection Function Confirmation Module 140 processes the consent rejection accordingly. If not, then the Consent Rejection Function Confirmation Module 140 does not process the consent rejection for the user. Further detail is now provided on the configuration and functionality of the different modules 110, 120, 130, 140 according to various aspects of the disclosure.

Private "Reject All" Consent Function Process

Figure 2:
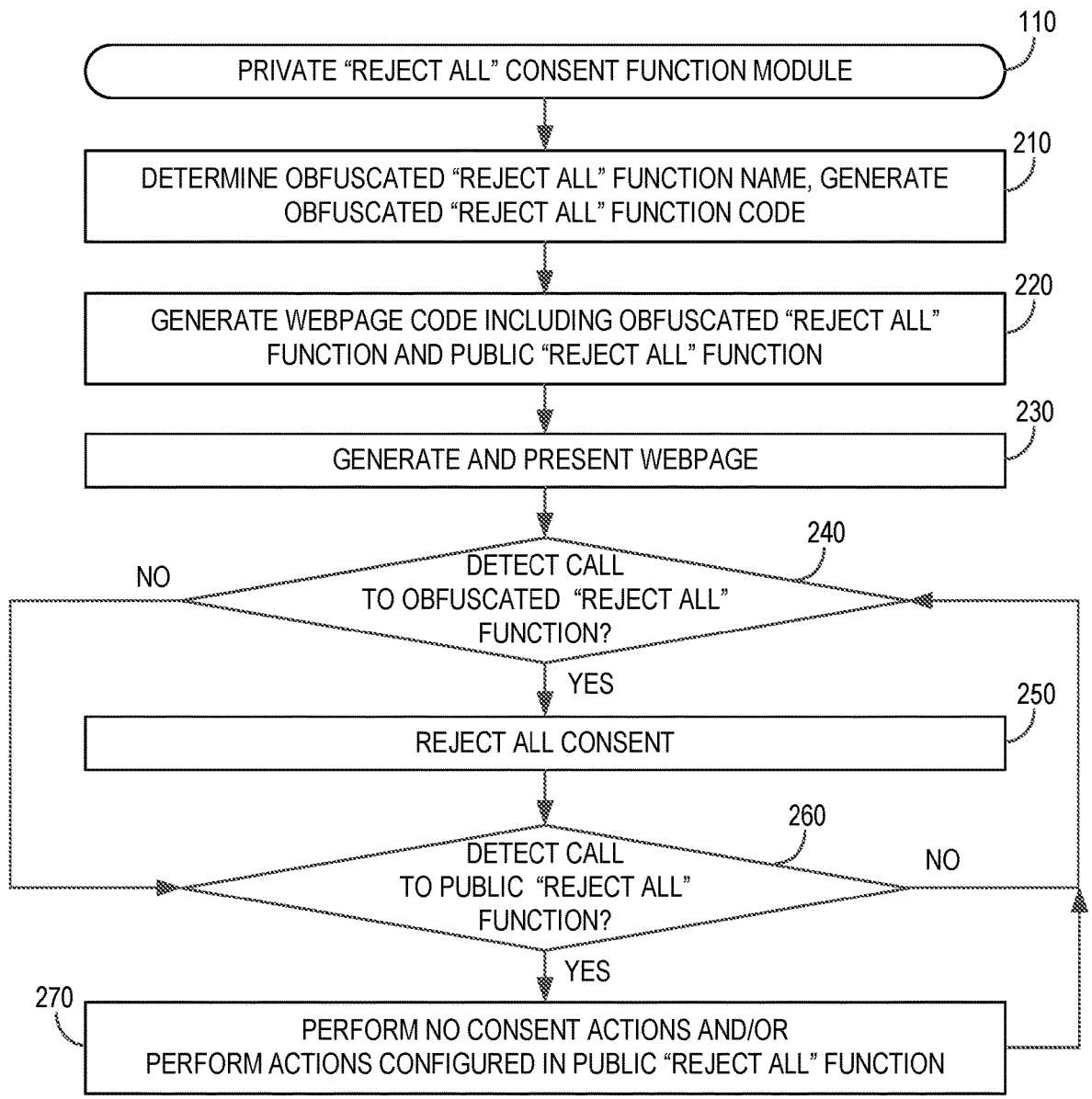
FIG. 2 is a flow chart showing an example of a process performed by a Private "Reject All" Consent Function Module according to various aspects.

FIG. 2 illustrates an example of a private "reject all" consent function generation and operation process that may be performed by a Private "Reject All" Consent Function Module 110 according to various aspects. In executing the Private "Reject All" Consent Function Module 110, the system begins at Step 210 by determining a name for an obfuscated "reject all" function. In particular aspects, the system may randomly generate a function name. In other aspects, the system may generate a function name based on a domain associated with the webpage to be generated and/or use any other information that may be associated with the webpage. In particular aspects, the system may take steps to ensure that the function name generated does not match a function name already in use (e.g., in the same domain, in code associated with another webpage, etc.). Further at Step 210, the system may generate the function code for the obfuscated "reject all" function.

At Step 220, the system may generate the webpage code for a webpage and may include or integrate into such code the obfuscated "reject all" function generated at Step 210. In particular aspects, the code generated for the webpage may also include a public "reject all" function. As noted herein, this public "reject all" function may perform no consent rejection actions or different consent rejection actions from those performed by the obfuscated "reject all" function generated at Step 210. In other particular aspects, the code generated for the webpage may not include a public "reject all" function.

At Step 230, the system may receive a request or instruction to generate and/or present the webpage and may, in response, generate and transmit one or more instructions to present the webpage (e.g., on a web browser application executing on a user device).

At Step 240, the system may determine whether a call to the obfuscated "reject all" function has been detected. If so, at Step 250, the system may perform the consent rejections functions associated with the obfuscated "reject all" function.

At Step 260, in those aspects that include a public "reject all" function associated with the webpage, the system may determine whether a call to the public "reject all" function has been detected. If so, at Step 270, the system may perform the consent rejections functions associated with the public "reject all" function (e.g., different functions than those associated with the obfuscated "reject all" function or no consent reject functions).

Automated Consent Rejection Function Call Prevention Process

Figure 3:
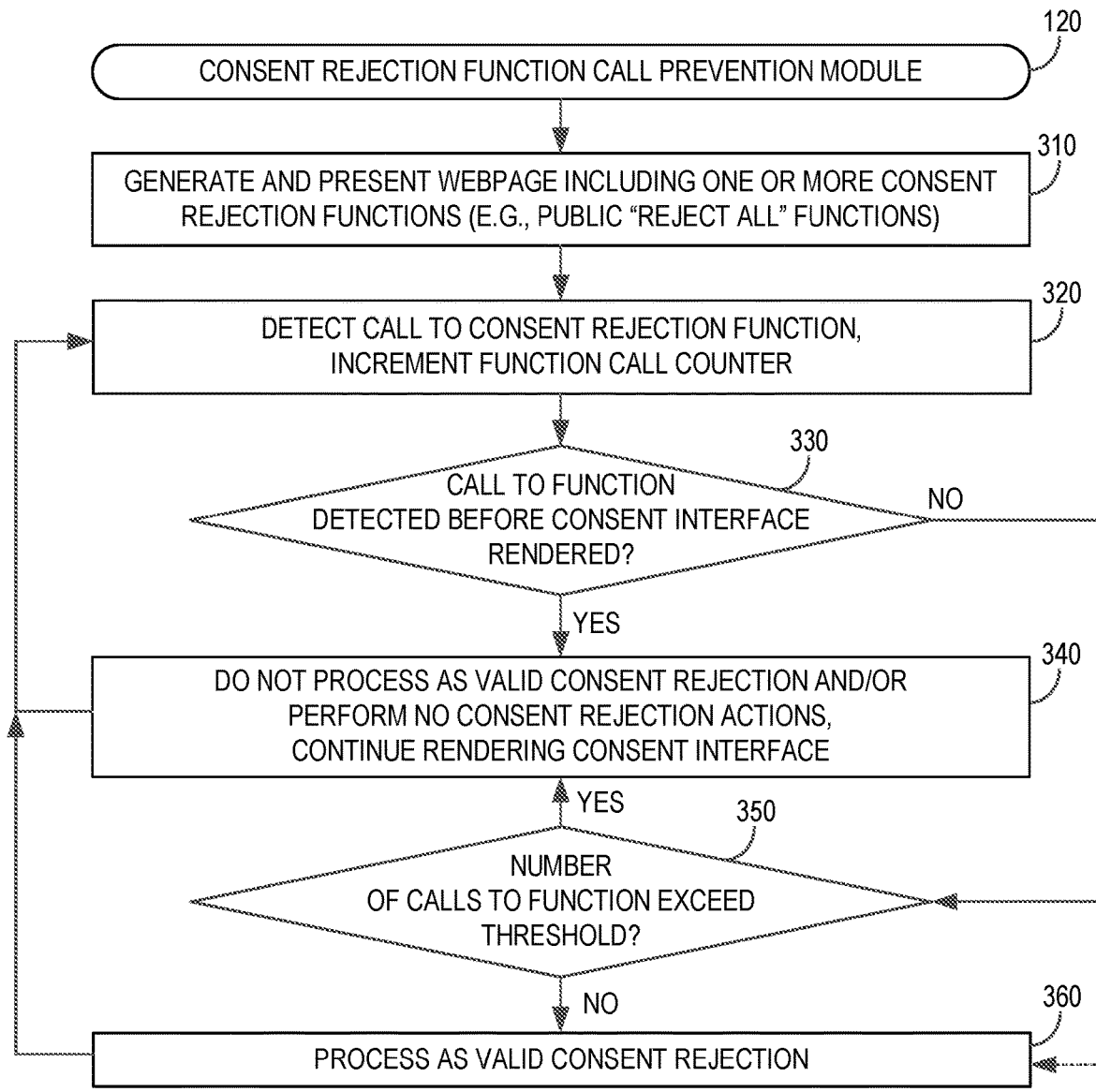
FIG. 3 is a flow chart showing an example of a process performed by a Consent Rejection Function Call Prevention Module according to various aspects.

FIG. 3 illustrates an example of an automatic consent rejection function call prevention process that may be performed by a Consent Rejection Function Call Prevention Module 120 according to various aspects. In executing the Consent Rejection Function Call Prevention Module 120, the system begins at Step 310 by generating and transmitting an instruction to present a webpage (e.g., on a web browser application executing on a user device) that is configured and/or associated with one or more consent rejection functions (e.g., a "reject all" function).

At Step 320, the system may detect a call to a particular consent rejection function configured on the webpage. In response to detecting this function call, the system may update function call data for the particular consent rejection function by incrementing a function call counter associated with the particular consent rejection function (and may first initialize such a counter if the function call is the first call detected to this particular consent rejection function). The function call counter includes program code executable by processing hardware to perform one or more operations, such as indicate a number of times in which a call had been made to the particular consent rejection function since the webpage was generated and presented to a user. The program code for the automated consent rejection tool can be installed on a server within the system. The system can access and use the function call counter by accessing memory in which the function call counter is being stored (e.g., memory of a server used in the system) and increment the counter accordingly. In particular aspects, the system may generate, initialize, and maintain a function call counter for each particular consent rejection function configured on a webpage that tracks the number of times the particular consent rejection function has been called since the webpage was generated and presented to a user. Alternatively, or in addition, a function call counter for a particular consent rejection function may track the number of times the particular consent rejection function has been called in a particular time period and/or during a particular activity, such as a single loading of the webpage.

Alternatively, or in addition, the system may generate, initialize, and maintain a function call counter for all, or a subset, of the consent rejection functions configured on a webpage. In such aspects, the system may track the number of calls to one or more of various consent rejection functions configured on a webpage using a single counter that tracks the total number of calls to the functions associated with the counter (as opposed to the number of calls to each particular consent rejection function). Such a function call counter may track the number of times the any of the consent rejection functions associated with the counter have been called since the webpage was generated and presented to a user. Alternatively, or in addition, a function call counter for one or more various consent rejection functions may track the number of times that any one of the associated consent rejection functions have been called in a particular time period and/or during a particular activity, such as a single loading of the webpage. Still further, the system may track the number of calls to one or more various consent rejection functions across multiple webpages within a website, in a domain, or in a subdomain.

At Step 330, the system may determine whether the call to the consent rejection function detected at Step 320 was received by the system before the consent interface that allows a human user to provide input that would generate a call to that particular consent rejection function has been rendered on a user device. In particular aspects, this particular step may involve the system updating function call data for the consent rejection function by determining a time of detection of the call to the consent rejection function and using the time of detection in determining whether the call was received before the consent interface has been rendered on the user device. If the function call was detected before the associated consent interface was fully rendered, the system may determine that the call must have been made by an automated tool because the interface that allows a user to provide input that would generate such a function call was not available to the user. The system also may determine that the call must have been made by an automated tool because the function call was made after the consent request interface was rendered but before the user reasonably could have responded (e.g., a response in less than 10 milliseconds). However, if the function call was detected after the consent interface was rendered, the system may determine that the function call may have been the result of human user interaction and may therefore process the consent rejection normally.

If the interface providing a means for a human user to generate the detected function call was not rendered before detecting the function call, the system may, at Step 340, not process the function call as a valid consent rejection and/or may not perform the consent rejection actions or activities associated with the function call. The system may also, at Step 340, continue to take actions to ensure that the consent interface is presented to a user to obtain consent preferences. In this case, the system may return to Step 320 for subsequent function call detection. If, at Step 330, the system determines that the function call was detected after a rendering of the associated consent interface on a user device, the system may then move to Step 350 to determine whether the number of calls to that particular function exceeds a threshold or rate of function calls that may indicate the use of an automated tool. Alternatively, the system may, at Step 360, process the consent rejection normally and/or perform the actions and/or activities associated with the function call.

At Step 350, the system may determine whether the number of calls to a particular consent rejection function or a set of consent rejection functions associated with a particular function call counter exceeds a threshold. Depending on the aspect, the threshold may be manually or automatically set. For instance, in particular aspects, the threshold may be set by an individual through an interface provided by the system. In other aspects, the threshold may be set through an automated process such as the system automatically setting the threshold based on a history of automated tools submitting multiple calls to a consent rejection function. For example, in some aspects, the system may be configured to make use of a machine learning model that has been trained on a history of automated tools submitting multiple calls to generate a threshold.

Accordingly, the system may be configured to determine that any number of calls to a particular consent rejection function or a set of consent rejection functions greater than a predetermined threshold value (e.g., 25, 30, 50, etc.) indicates that the calls are likely being made by an automated tool. Alternatively, or in addition, the threshold may be a rate threshold indicating a number of calls in a particular time period or during a particular activity. For example, the system may be configured to determine that a rate of function calls (e.g., a number of calls to a particular consent rejection function or a set of consent rejection functions (e.g., 25, 30, 50, etc.) within a particular time period (e.g., 30 seconds, one minute, five minutes, etc.)) greater than a predetermined rate threshold value (e.g., one call per second, 100 calls per minute, 250 calls within five minutes, etc.) indicates that the calls are likely being made by an automated tool. In another example, the system may be configured to determine that a number of calls to a particular consent rejection function or a set of consent rejection functions greater than a predetermined threshold value (e.g., 25, 30, 50, etc.) during a single loading of the webpage indicates that the calls are likely being made by an automated tool.

If, at Step 350, the system determines that the number of calls to a particular consent rejection function or a set of consent rejection functions exceeds the threshold number of calls or rate, the system may, at Step 340, not process the function calls as valid consent rejections and/or may not perform the consent rejection actions or activities associated with the function call, continuing to take actions to ensure that the consent interface is presented to a user and/or consent preferences are otherwise properly obtained. If, at Step 350, the system determines that the number of calls to a particular consent rejection function or a set of consent rejection functions does not exceed the threshold number of calls or rate, the system may move to Step 360 to process the consent rejection normally and/or perform the actions and/or activities associated with the function call. If, at Step 240, the system does not process the function calls as valid consent rejections and/or does not perform the consent rejection actions or activities associated with the function call, the system may also return to Step 220 to analyze subsequent calls to one or more consent rejection function calls.

Tokenized Consent Rejection Function Process

Figure 4:
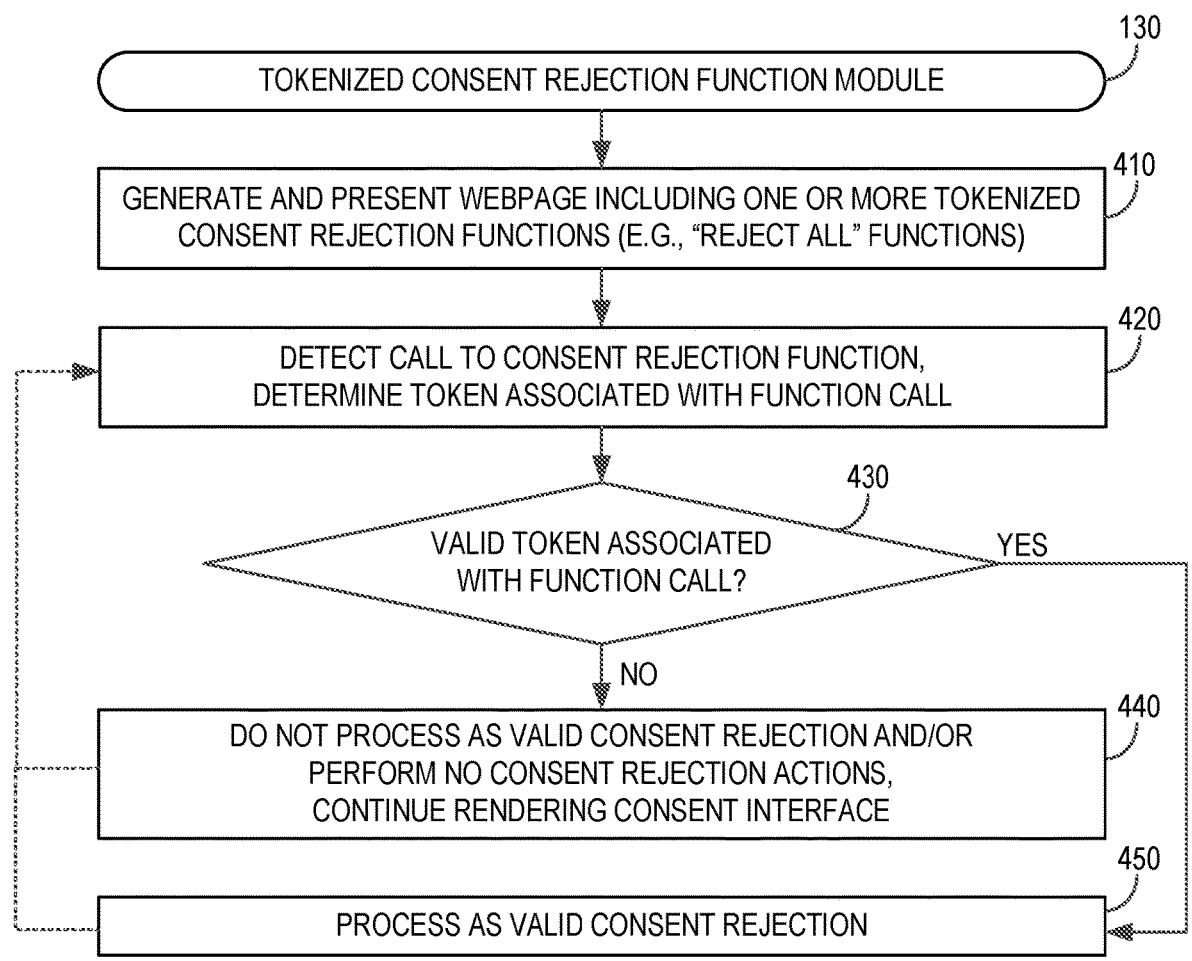
FIG. 4 is a flow chart showing an example of a process performed by a Tokenized Consent Rejection Function Module according to various aspects.

FIG. 4 illustrates an example of a tokenized consent rejection function process that may be performed by a Tokenized Consent Rejection Function Module 130 according to various aspects. In executing the Tokenized Consent Rejection Function Module 130, the system begins at Step 410 by generating and transmitting an instruction to present a webpage (e.g., on a web browser application executing on a user device) that is configured and/or associated with one or more tokenized consent rejection functions (e.g., a public "reject all" function). The webpage may be configured to generate and present (e.g., on a web browser application executing on a user device) a consent request interface that includes a consent rejection control element that is configured to generate a call to one or more consent rejection functions. This interface may be configured to generate and/or include a particular token with the call to one or more consent rejection functions that it generates and/or transmits to the system in response to a user activation of the consent rejection control element on the consent request interface.

At Step 420, the system may detect a call to a particular consent rejection function configured on the webpage. In response to detecting this function call, the system may analyze the information included with the function call and/or associated with the function call to identify one or more tokens. In particular aspects, the webpage may generate and/or include such a token when a user activates a control element that generates a call to a consent rejection function on a consent request interface. Alternatively, or in addition, the system may include information in a function call (e.g., a pointer) that indicates such a token.

At Step 430, the system may determine whether the token associated with the detected function call is a valid token (e.g., that it is associated with the webpage and/or a consent request interface). If the token is not valid (or not present), the system may determine that the call must have been made by an unauthorized system or script (e.g., an automated tool, a browser extension, etc.) because the call does not include a token that would have been included if the call was made by the consent request interface associated with the webpage. However, if the token is valid, the system may determine that the function call must have been made as a result of human user interaction with the consent request interface associated with the webpage and may therefore process the consent rejection normally.

If the token is determined to be invalid at Step 430, the system, at Step 440, may not process the function call as a valid consent rejection and/or may not perform the consent rejection actions or activities associated with the function call. The system may also, at Step 440, continue to take actions to ensure that the consent request interface is presented to a user to obtain consent preferences. In this case, the system may return to Step 420 to detect any subsequent consent rejection function calls.

If, at Step 430, the system determines that the token is valid, the system may then move to Step 450 to process the consent rejection normally and/or perform the actions and/or activities associated with the detected function call. The system may also continue to detect and evaluate subsequent consent rejection function calls at Step 420.

Consent Rejection Function Confirmation Process

Figure 5:
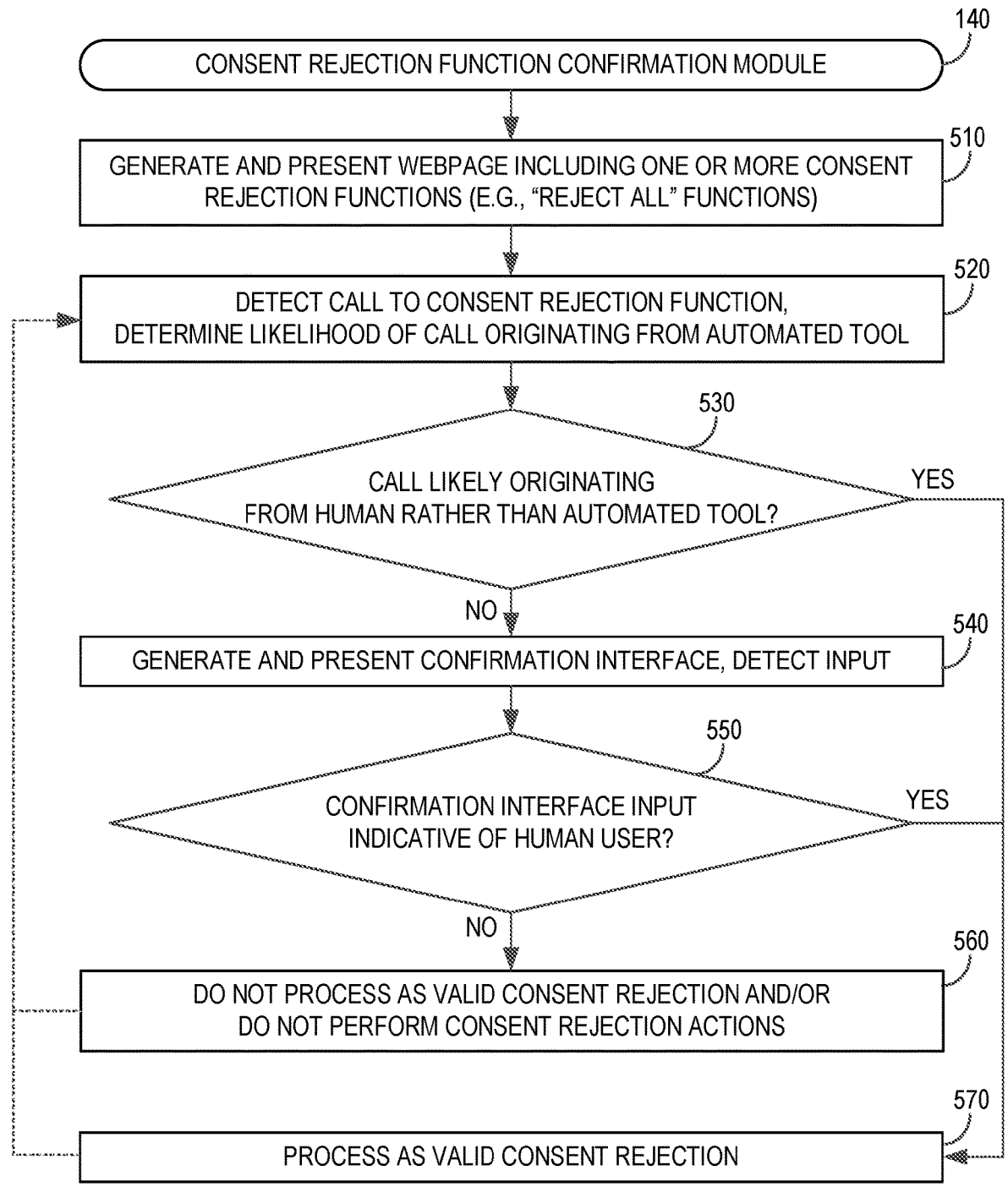
FIG. 5 is a flow chart showing an example of a process performed by a Consent Rejection Function Confirmation Module according to various aspects.

FIG. 5 illustrates an example of a consent rejection function confirmation process that may be performed by a Consent Rejection Function Confirmation Module 140 according to various aspects. In executing the Consent Rejection Function Confirmation Module 140, the system begins at Step 510 by generating and transmitting an instruction to present a webpage (e.g., on a web browser application executing on a user device) that is configured and/or associated with one or more consent rejection functions (e.g., a public "reject all" function). The webpage may be configured to generate and present (e.g., on a web browser application executing on a user device) a consent request interface that includes a consent rejection control element that is configured to generate a call to one or more consent rejection functions. This interface may be configured to generate a call to one or more consent rejection functions in response to a user activation of the consent rejection control element on the consent request interface.

At Step 520, the system may be configured to detect a call to a consent rejection function and determine the likelihood that the call has been made by an automated tool (e.g., an automated consent rejection tool). In making this determination, the system may use any effective means, including the methods described herein (e.g., number, rate, and or frequency of function calls, presence of valid token in the function call, etc.). Based upon this determination of the likelihood of the function call originating from an automated tool, the system may determine whether or not to present a consent rejection confirmation interface requesting further user input to confirm that the consent rejection function call originated with a human user.

For example, if the system determines (e.g., using one or more methods described herein) that it is highly (e.g., overwhelmingly) likely that the function call originated with a human user, the system may determine that no additional confirmation of a human user is necessary. Alternatively, the system may be configured to request additional confirmation in the event that it is highly likely that the function call originated with a human user to be certain that consent preferences were properly received. Similarly, if the system determines (e.g., using one or more methods described herein) that it is highly likely that the function call originated with an automated tool, the system may determine that no additional confirmation of a human user is necessary since there is little chance that there was a human user involved. Alternatively, the system may be configured to request additional confirmation in the event that it is highly likely that the function call originated with an automated tool just to be certain that consent preferences from a human user are not ignored.

In various aspects, if the system is unable to make a determination of the likelihood of an automated tool making a function call, or if the determined likelihood is not definite, the system may determine to present a consent rejection confirmation interface to obtain additional information for determining the origin of the function call. Alternatively, or in addition, the system may be configured to present a consent rejection confirmation interface for each consent rejection function call to ensure that valid human user input is received for all activities initiated by such a function call.

At Step 530, the system may determine whether to generate and transmit an instruction to present a consent rejection confirmation interface (e.g., on a web browser application executing on a user device) based on the likelihood of the function call originating from an automated tool. If the system determines to present the consent rejection confirmation interface, at Step 540 the system generates and transmits an instruction to a user device to present the consent rejection confirmation interface (e.g., on a web browser application executing on a user device). Accordingly, in some aspects, the consent rejection confirmation may be generated to include a display element to present a consent rejection confirmation query and a user input element associated with the consent rejection confirmation query. For example, the user input element may be one or more control elements such as buttons, dropdown menus, checkboxes that allow for a user to confirm or decline the consent rejection. In another example, the user input element may be one or more CAPTCHA challenges. Further at Step 440, the system detects user input (or a lack thereof) in the consent rejection confirmation interface (e.g., from a browser state or browser data associated with a web browser application executing on a user device).

If, at Step 530, the system determines not to generate and present a consent rejection confirmation interface, the system, at Step 560, may not process the function call as a valid consent rejection and/or may not perform the consent rejection actions or activities associated with the function call.

The system may also continue to take actions to ensure that a consent request interface is presented to a user to obtain consent preferences (e.g., by returning to Step 520 to detect any subsequent consent rejection function calls). For example, the system may determine that it is highly likely that the function originated with an automated tool, and therefore there is no reason to pursue further confirmation.

Alternatively, if, at Step 530, the system determines the call likely did originate from a human rather than an automated tool, the system, at Step 570, may process the consent rejection normally and/or perform the actions and/or activities associated with the detected function call. The system may also continue to detect and evaluate subsequent consent rejection function calls (e.g., by returning to Step 520). For example, the system may determine that it is highly likely that the function originated with a human user and therefore there is no reason to pursue further confirmation.

If the system has determined to present a consent confirmation interface at Step 530 and has detected input at that interface (or a lack thereof) at Step 540, the system may, at Step 550, determine whether the consent rejection confirmation interface input is indicative of a human user. For example, system may determine whether the user input element, such as a button or a checkbox, associated with the consent rejection confirmation query has been activated (clicked and/or selected) confirming the consent rejection and thus, a human response. In another example, the consent rejection confirmation interface may request input regarding one or more CAPTCHA challenges. If the system determines that the detected input indicates a human response to the one or more CAPTCHA challenges, the system may determine that such input is indicative of interaction with a human user. Alternatively, if the system determines that the input does not correspond to input that would typically be associated with a human user, or if the system detects no input received via the consent rejection confirmation interface, the system may determine that there is no human user interacting with the consent rejection confirmation interface (and therefore the function call likely originated from an automated tool).

If the system determines that the consent rejection confirmation interface input is indicative of a human user, the system may, at Step 570, process the consent rejection normally and/or perform the actions and/or activities associated with the detected function call. The system may also continue to detect and evaluate subsequent consent rejection function calls (e.g., by returning to Step 520).

If the system determines that the consent rejection confirmation interface input is indicative of an automated tool, the system, at Step 560, may not process the function call as a valid consent rejection and/or may not perform the consent rejection actions or activities associated with the function call. The system may also continue to take actions to ensure that a consent request interface is presented to a user to obtain consent preferences (e.g., by returning to Step 520).

Technical Contributions of Various Aspects

An entity that handles (e.g., collects, receives, transmits, stores, processes, shares, and/or the like) sensitive and/or personal information associated with particular individuals (e.g., personally identifiable information (PII) data, sensitive data, personal data, etc.) may request consent from such individuals before handling their information. For various reasons, such individuals may deny consent for the entity to process their information. As an increasing number of entities attempt to comply with consent requirements associated with various laws and regulations around the world, more and more websites and webpages require an indication of consent preferences (e.g., allow or deny collection of personal data, etc.) from a user before allowing the user to access the page or site. Many users find these requests for consent to be annoying and therefore have installed tools that automatically deny consent to a webpage or website without requiring that an actual human user actively review and respond to the request for consent presented by the webpage or website. This may be a problem for entities because such automated consent rejection tools may perform function calls and other activities related to denying consent at a rate and frequency much greater than that possible of a human user, thereby wasting consent processing resources and other system resources. This may also be an issue for entities that are required to obtain consent from users because consent feedback from automated tools may not satisfy the legal requirements for obtaining consent preferences. In conventional systems, such automated consent rejection tools are difficult or impossible to distinguish from human users and are therefore allowed to operate unchecked, resulting in a waste of resources and decreased consent processing efficiency.

Accordingly, various aspects of the present disclosure overcome many of the technical challenges associated with efficiently interacting with automated consent rejection tools in a networked computer environment. More particularly, various aspects of the present disclosure include implementing a specific technical solution of determining whether calls to consent rejection functions originate with a human user or an automated tool based on various attributes of the function calls. The various aspects of the disclosure are directed to a computational framework configured for determining whether a function call originated with an automated tool based on whether the function call was made to a public consent rejection function, or a private (obfuscated) consent rejection function configured on a webpage. If the call was not made to the private consent rejection function, the system may determine that it originated with an automated tool and may not process the consent rejection associated with the function, essentially ignoring it, and saving system resources while continuing to attempt to obtain consent preferences from a human user. Alternatively, or in addition, the computational framework may be configured for determining whether a function call originated with an automated tool based on a number of times the function call was made or the timing of the function call. If the function call was received before the interface requesting consent was rendered to the user or before a particular time thereafter, the system may determine that the call must have been made by an automated tool. If the function call is one of a large number of function calls (e.g., total, within a particular time period, during a single loading of the webpage etc.), the system may determine that the call was likely made by an automated tool. The framework may also, or instead, require a token known to the system to be passed with a function call and reject as related to an automated tool any function calls lacking the token. The framework may also, or instead, require an additional confirmation of the consent rejection by presenting a consent rejection confirmation interface that requires appropriate human user input (e.g., "CAPTCHA") before processing a consent rejection. By automatically ensuring that a consent rejection actually is received from a human user and preventing the processing of consent rejections received from automated tools, the various aspects represent a significant improvement to existing and conventional processes for obtaining and processing consent preferences.

Accordingly, various aspects of the disclosure provided herein are more effective, efficient, accurate, and faster in determining whether and how to process consent rejection function calls received from remote devices in a networked computer environment. The various aspects of the disclosure provided herein provide improved means of increasing efficiency of computing environments that use consent data to control delivery of content or functionality via the Internet. For instance, features described herein can block consent rejections from automated tools from being processed, ensure that consent rejections are received from actual human users rather than from automated tools, or some combination thereof. The features described herein thereby improve the operation of software tools for consent management that may be used to, for example, process many consent rejection function calls received from many "users" that often may be automated tools. In facilitating the efficient processing of consent rejection function calls, the various aspects of the present disclosure make major technical contributions to improving the computational efficiency and reliability of various privacy management systems and procedures for obtaining and processing consent. In turn, this translates to more computationally efficient software systems.

Example Technical Platforms

As will be appreciated by one skilled in the relevant field, data processing systems and methods for detecting tools for the automated blocking of consent requests and taking responsive action, according to various aspects described herein, may be, for example, embodied as a computer system, a method, or a computer program product. Accordingly, various aspects may take the form of an entirely hardware aspect, an entirely software aspect, or an aspect combining software and hardware aspects. Furthermore, particular aspects may take the form of a computer program product stored on a computer-readable storage medium having computer-readable instructions (e.g., software) embodied in the storage medium. Various aspects may take the form of web, mobile, and/or wearable computer-implemented computer software. Any suitable computer-readable storage medium may be utilized including, for example, hard disks, compact disks, DVDs, optical storage devices, and/or magnetic storage devices.

It should be understood that each step described herein as being executed by a system or systems (and/or other steps described herein), and any combinations of such steps, may be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the various steps described herein.

These computer program instructions may also be stored in a computer-readable memory that may direct a computer or other programmable data processing apparatus to function in a particular manner such that the instructions stored in the computer-readable memory produce an article of manufacture that is configured for implementing the function specified in the flowchart step or steps. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart step or steps.

Accordingly, steps of the block diagrams and flowchart illustrations support combinations of mechanisms for performing the specified functions, combinations of steps for performing the specified functions, and program instructions for performing the specified functions. It should also be understood that each step, and combinations of such steps, may be implemented by special-purpose hardware-based computer systems that perform the specified functions or steps, or combinations of special purpose hardware and other hardware executing appropriate computer instructions.

Example System Architecture

Figure 6:
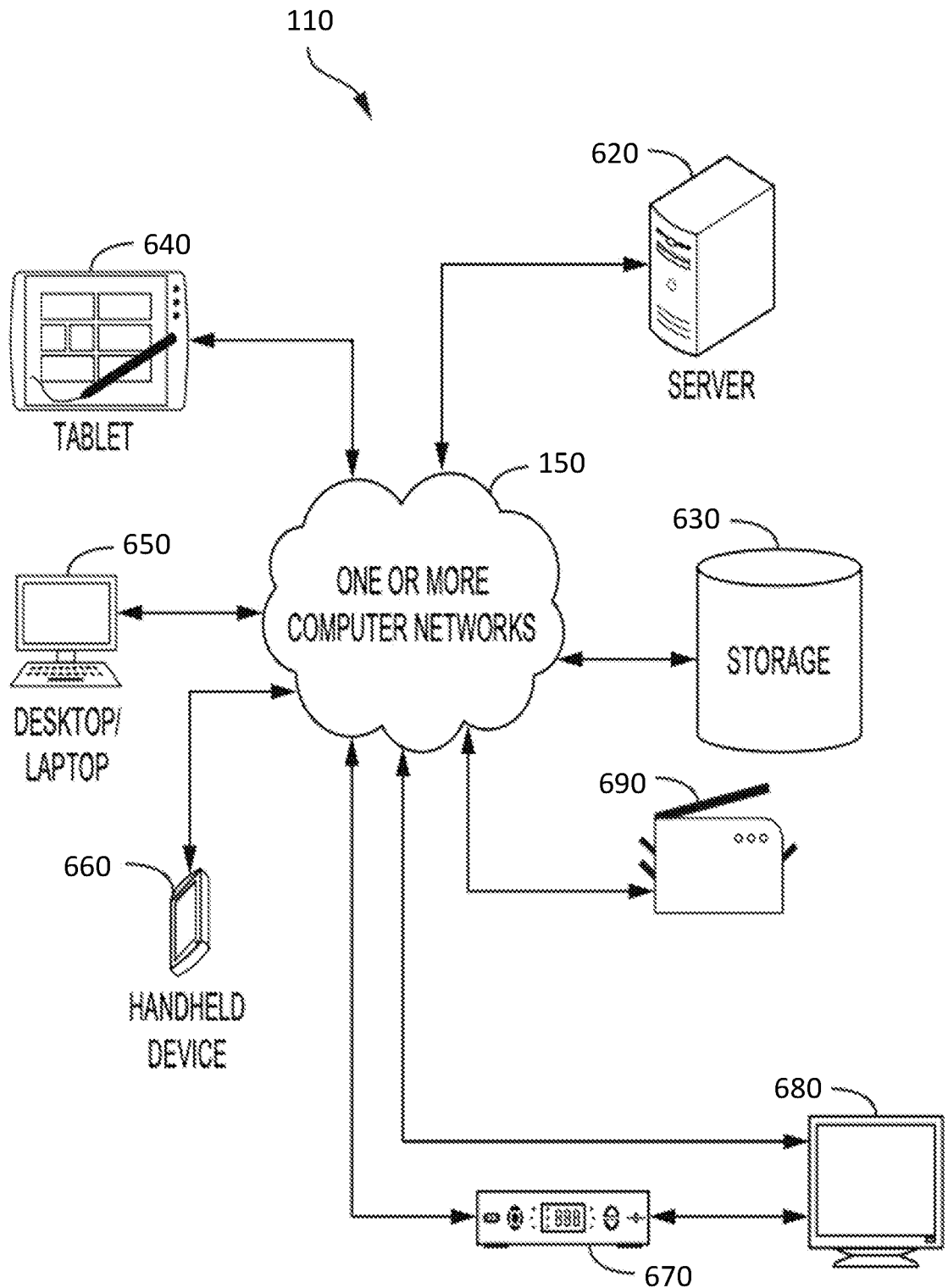
FIG. 6 is a diagram illustrating a block diagram of a consent management provider system that may be used in accordance with various aspects.

FIG. 6 is a block diagram of a consent management provider system 100 according to a particular aspect. As may be understood from this figure, the system 100 may include one or more computer networks 150, a server 620, a storage device 630 (that may, in various aspects, contain one or more databases of information.) Accordingly, the system 100 may be in communication over the one or more computer networks 150 with one or more user computing devices 160 such as a tablet computer 640, a desktop or laptop computer 650, a handheld computing device 660 (e.g., a cellular phone, a smart phone, etc.), a browser and Internet capable set-top box 670 connected with a television (e.g., a television 680), and/or a smart television 680 having browser and Internet capability. The user computing devices 160 attached to the network 150 may also, or instead, include scanners/copiers/printers/fax machines 690 having one or more hard drives (a security risk since copies/prints may be stored on these hard drives). The server 620 and storage device 630 may be physically located in a central location, such as the headquarters of an organization, for example, or in separate facilities. The server 620 and/or storage device 630 may be owned or maintained by employees, contractors, or other third parties (e.g., a cloud service provider, a copier vendor). In particular aspects, the one or more computer networks 150 facilitate communication between the server 620, one or more user computing devices 640, 650, 660, 670, 680, 690, and/or storage device 630.

The one or more computer networks 150 may include any of a variety of types of wired and/or wireless computer networks and any combination therefore, such as the Internet, a private intranet, a public switched telephone network (PSTN), or any other type of network. The communication link between the server 620, one or more user computing devices 640, 650, 660, 670, 680, 690, and/or storage device 630 may be, for example, implemented via a Local Area Network (LAN), a Wide Area Network (WAN), and/or via the Internet.

Example Computing Hardware Architecture

Figure 7:
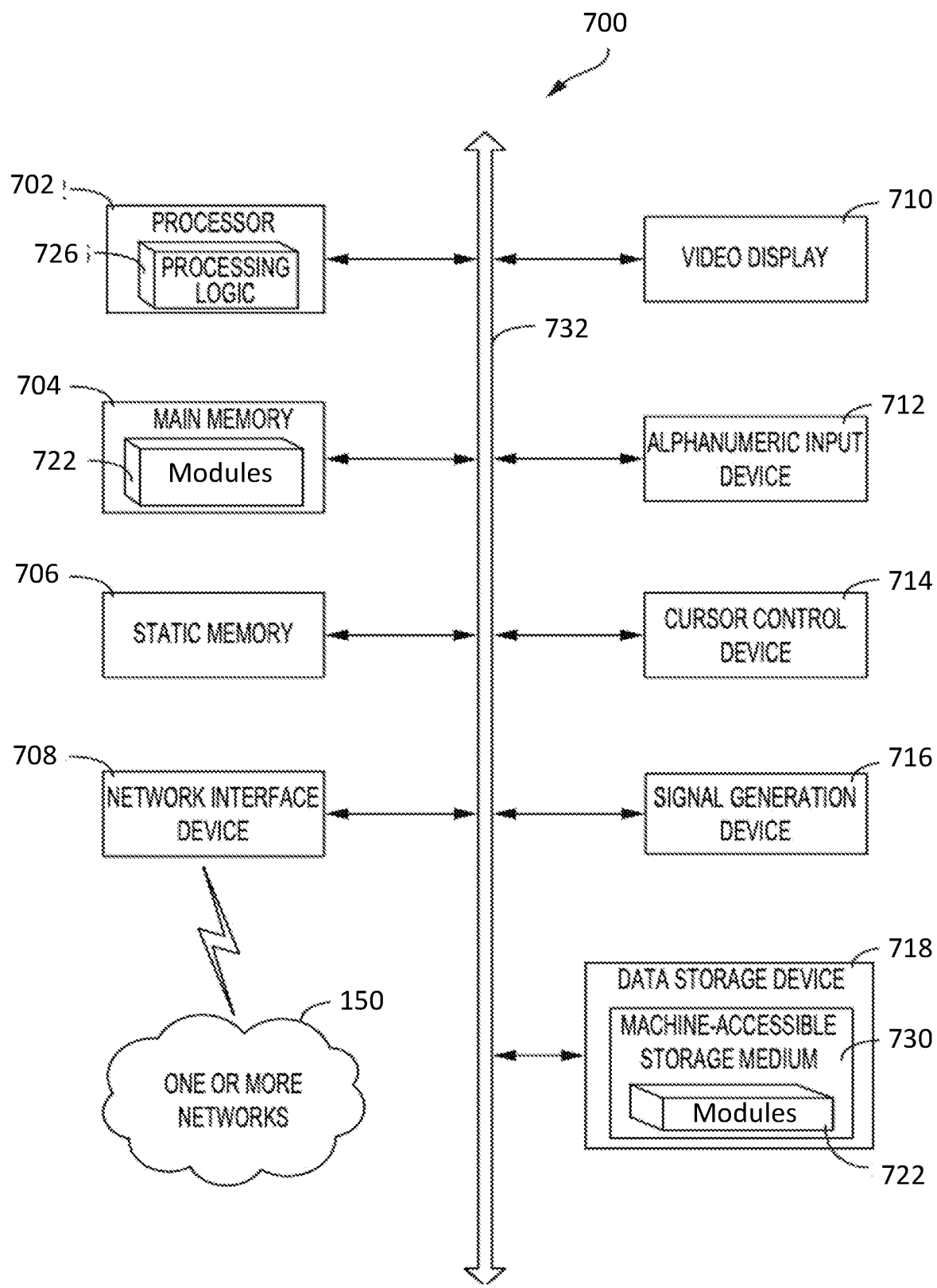
FIG. 7 is a schematic diagram of a computer that is suitable for use in various aspects.

FIG. 7 illustrates a diagrammatic representation of the architecture of computing hardware 700 that may be used within the system 700, for example, as a user computing device 160 (e.g., one of computing devices 640, 650, 660, 670, 680, 690, shown in FIG. 6) and/or as a server (e.g., server 620 shown in FIG. 5). In some aspects, the computing hardware 700 may be suitable for use as a computer within the context of the system 100 that is configured to operationalize the various aspects of the systems and methods describe herein. In particular aspects, the computing hardware 700 may be connected (e.g., networked) to other computing hardware in a LAN, an intranet, an extranet, and/or the Internet. As noted above, the computing hardware 700 may operate in the capacity of a server 620 or a user computing device 160 in a client-server network environment or as a peer computer in a peer-to-peer (or distributed) network environment. The computing hardware 700 may be a personal computer (PC), a tablet PC, a set-top box (STB), a Personal Digital Assistant (PDA), a cellular telephone, smart phone, a web appliance, a server, a network router, a switch or bridge, or any other computing hardware capable of executing a set of instructions (sequential or otherwise) that specify actions to be taken by that computer. Further, while only a single computing device is illustrated, the term "computing hardware" as used herein shall also be taken to include any collection of computing devices that individually or jointly execute a set (or multiple sets) of instructions to perform any one or more of the methodologies discussed herein.

The computing hardware 700 may include a processor 702, a main memory 704 (e.g., read-only memory (ROM), flash memory, dynamic random-access memory (DRAM) such as synchronous DRAM (SDRAM) or Rambus DRAM (RDRAM), etc.), a static memory 706 (e.g., flash memory, static random access memory (SRAM), etc.), and/or a data storage device 718, which communicate with each other via a bus 732.

The processor 702 represents one or more general-purpose processing devices such as a microprocessor, a central processing unit, or the like. More particularly, the processor 702 may be a complex instruction set computing (CISC) microprocessor, a reduced instruction set computing (RISC) microprocessor, a very long instruction word (VLIW) microprocessor, or a processor or processors implementing other instruction sets and/or any combination of instruction sets. The processor 702 may also be one or more special-purpose processing devices such as an application specific integrated circuit (ASIC), a field programmable gate array (FPGA), a digital signal processor (DSP), network processor, or the like. The processor 702 may be configured to execute processing logic 726 for performing various operations and steps discussed herein.

The computing hardware 700 may further include a network interface device 708. The computing hardware 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and/or a signal generation device 716 (e.g., a speaker). The data storage device 718 may include a non-transitory computer-readable storage medium 730 (also known as a non-transitory computer-readable storage medium or a non-transitory computer-readable medium) on which may be stored one or more modules 722 (e.g., software, sets of instructions) embodying any one or more of the methodologies and/or functions described herein. For example, the one or more modules 722 may include the Private "Reject All" Consent Function Module 110, Consent Rejection Function Call Prevention Module 120, Tokenized Consent Rejection Function Module 130, and/or Consent Rejection Function Confirmation Module 140 as described herein. The modules 722 may also reside, completely or at least partially, within the main memory 704 and/or within the processor 702 during execution thereof by the computing hardware 700, the main memory 704 and the processor 702 also constituting computer-accessible storage media. The modules 722 may further be transmitted or received over a network 150 via the network interface device 708.

While the computer-readable storage medium 730 is shown in an example to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium or media that is capable of storing, encoding, and/or carrying a set of instructions for execution by a computer and that cause a computer to perform any one or more of the methodologies of described herein. The term "computer-readable storage medium" should accordingly be understood to include, but not be limited to, solid-state memories, optical and magnetic media, etc.

Example of a System Platform

According to various aspects, the processes and logic flows described in this specification may be performed by a system (e.g., system 100) that includes, but is not limited to, one or more programmable processors (e.g., processor 702) executing one or more computer program modules to perform functions by operating on input data and generating output, thereby tying the process to a particular machine (e.g., a machine programmed to perform the processes described herein). This includes processors located in one or more of user computing devices (e.g., user computing devices 640, 650, 660, 670, 680, 690 of FIG. 6). These devices connected to the one or more computer networks 150 may access and execute one or more Internet browser-based program modules that are "served up" through the one or more computer networks 150 by one or more servers (e.g., server 620 of FIG. 6), and the data associated with the program may be stored on a one or more storage devices, which may reside within a server or computing device (e.g., main memory 704, static memory 706), be attached as a peripheral storage device to the one or more servers or computing devices, and/or attached to the network (e.g., storage device 630).

Alternative System Environment

In various aspects, an alternative system environment may be used for detecting an automated consent rejection tool being used to automatically attempt to block the presentation of a consent request and/or the receipt of consent from a user according to various aspects. Instead of the functionality described herein with respect to the various modules 110, 120, 130, 140 being carried out in a consent management provider system 100 remote from the user computing device 160 rendering the webpage via a browser application, the functionality may be implemented as a script (e.g., JavaScript) to run on the webpage as the webpage is rendered. Accordingly, the script (or scripts) may be configured to include the functionality of the various modules 110, 120, 130, 140 described herein and operate in a similar manner in handling calls made to methods and/or functions used in rejecting consent. Therefore, instead of the call to a method and/or function being sent to the consent management provider system 100, the call is instead handled locally on the user computing device 160 through the script.

Advanced Processing in Various Aspects

In various aspects, the system uses advanced processing techniques to analyze function calls, determine the origins of a function call (e.g., human user or automated tool), determine whether to obtain confirmation interface consent, analyze input data that may indicate whether a human user is interacting with an interface, and/or implement any of the various aspects of the disclosed systems and methods. In particular aspects, the system may determine a type of input and/or a type of originator of a function call using advanced processing techniques that may include artificial intelligence, machine learning, neural networking, big data methods, natural language processing, contextual awareness, and/or continual learning (in any combination). In particular aspects, the system may evaluate interface input using any one or more of these advanced processing techniques and/or any combination thereof. In various aspects, the system may use any such advanced processing techniques to perform any of the processing (e.g., execute any of the modules) described herein to locate, identify, retrieve, modify, and/or perform any other functions related to consent, consent-related function calls, and obtaining consent from users, including generating interfaces and analyzing function calls.

In particular aspects, one or more neural networks may be used to implement any of the advanced processing techniques described herein. A neural network, according to various aspects, may include a plurality of nodes that mimic the operation of the human brain, a training mechanism that analyzes supplied information, and/or a personal data location engine for performing any one or more of the functions involving consent and function calls as described herein, including, but not limited to, generating consent request and consent rejection confirmation interfaces, and analyzing function calls and interface input. The neural network may also perform any of the processing (e.g., execute any of the modules) described herein to locate, identify, retrieve, modify, and/or perform any other functions related to consent and calls to functions or methods. In various aspects, each of the nodes may include one or more weighted input connections, one or more transfer functions that combine the inputs, and one or more output connections. In particular aspects, the neural network is a variational autoencoder (AE) neural network, a denoising AE neural network, any other suitable neural network, or any combination thereof.

CONCLUSION

Although aspects above are described in reference to various systems and methods for automated blocking of consent requests and taking responsive actions, it should be understood that various aspects of the system described above may be applicable to other types of systems, in general.

While this specification contains many specific aspect details, these should not be construed as limitations on the scope of any aspect or of what may be claimed, but rather as descriptions of features that may be specific to particular aspects of particular inventions. Certain features that are described in this specification in the context of separate aspects may also be implemented in combination in a single aspect. Conversely, various features that are described in the context of a single aspect may also be implemented in multiple aspects separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems may generally be integrated together in a single software product or packaged into multiple software products.

Many modifications and other aspects will come to mind to one skilled in the art to which this disclosure pertains having the benefit of the teachings presented in the foregoing descriptions and the associated drawings. Therefore, it is to be understood that the invention is not to be limited to the specific aspects disclosed and that modifications and other aspects are intended to be included within the scope of the appended claims. Although specific terms are employed herein, they are used in a generic and descriptive sense only and not for the purposes of limitation.

What is claimed:

1. A system comprising:
a consent management computing system; and
a user computing device communicatively coupled to the consent management computing system, wherein the user computing device is configured for:
  detecting browser states of a browser application executed on the user computing device, wherein the browser states comprise requests for online content, and
  detecting invocations of a consent rejection function accessible to the user computing device, wherein the consent rejection function is invoked responsive to the browser states indicating an online content request,
wherein the consent management computing system is configured for:
  executing, for at least one of the invocations, an action documenting a consent rejection via the at least one of the invocations,
  determining that an additional one of the invocations was initiated by an automated consent rejection tool, and
  preventing, based on determining that the additional one of the invocations was initiated by the automated consent rejection tool, an execution of the action documenting the consent rejection via the additional one of the invocations.

2. The system of claim 1, wherein:
detecting the additional one of the invocations comprises incrementing a function call counter associated with the consent rejection function; and
determining that the additional one of the invocations was initiated by the automated consent rejection tool comprises determining that the function call counter exceeds a threshold.

3. The system of claim 2, wherein the threshold is a number of function calls or a rate of function calls.

4. The system of claim 1, wherein determining that the additional one of the invocations was initiated by the automated consent rejection tool comprises determining that the additional one of the invocations before the browser application presents a consent request interface on the user computing device.

5. The system of claim 1, wherein determining that the additional one of the invocations was initiated by the automated consent rejection tool comprises determining that data associated with the additional one of the invocations does not comprise a valid token.

6. The system of claim 1, wherein the consent management computing system is further configured for:
determining that the at least one of the invocations was not initiated by the automated consent rejection tool; and in response to determining that the at least one of the invocations was not initiated by the automated consent rejection tool, executing the action associated with the consent rejection function.

7. The system of claim 6, wherein determining that the at least one of the invocations was not initiated by the automated consent rejection tool comprises detecting the at least one of the invocations after the browser application presents a consent request interface on the user computing device.

8. A method comprising:
detecting, by computing hardware, a browser state of a browser application executed on a user device, wherein the browser state comprises a request for a webpage;
generating, by the computing hardware and based on the browser state, a consent request interface associated with the webpage by configuring, on the consent request interface, a first control element configured to invoke a consent rejection function and a second control element configured to invoke a consent acceptance function;
transmitting, by the computing hardware, an instruction to the browser application instructing the browser application to present the consent request interface on the user device;
detecting, by the computing hardware, an invocation of the consent rejection function;
detecting, by the computing hardware, an additional invocation of the consent rejection function;
determining, by the computing hardware, that the additional invocation was initiated by an automated consent rejection tool;
executing, by the computing hardware, an action at a consent management system documenting a consent rejection via the invocation of the consent rejection function; and
preventing, by the computing hardware, an execution of the action at the consent management system documenting the consent rejection via the additional invocation by the automated consent rejection tool.

9. The method of claim 8, wherein:
detecting the additional invocation comprises incrementing a function call counter associated with the consent rejection function; and
determining that the additional invocation was initiated by the automated consent rejection tool comprises determining that the function call counter exceeds a threshold, wherein the threshold is a number of function calls or a rate of function calls.

10. The method of claim 8, wherein determining that the additional invocation was initiated by the automated consent rejection tool comprises detecting a characteristic of a rendering process used by the user device to render the consent request interface, wherein a presence of the characteristic indicates a use of the automated consent rejection tool.

11. The method of claim 10, wherein detecting the characteristic comprises detecting the additional invocation before the browser application presents the consent request interface on the user device.

12. The method of claim 8, wherein determining that the additional invocation was initiated by the automated consent rejection tool comprises determining that data associated with the additional invocation does not comprise a valid token.

13. The method of claim 8, further comprising:
detecting at least one invocation of the consent rejection function;
determining that the invocation was not initiated by the automated consent rejection tool; and
in response to determining that the invocation was not initiated by the automated consent rejection tool, executing the action associated with the consent rejection function.

14. The method of claim 13, wherein determining that the invocation was not initiated by the automated consent rejection tool comprises detecting the at least one invocation after the browser application presents the consent request interface on the user device.

15. A non-transitory computer-readable medium storing program code that, when executed by processing hardware, configures the processing hardware to perform operations comprising:
generating, based on a browser application accessing online content, a consent request interface associated with a webpage by configuring, on the consent request interface, a first control element configured to invoke a consent rejection function and a second control element configured to invoke a consent acceptance function;
transmitting an instruction to the browser application instructing the browser application to present the consent request interface on the user device;
detecting invocations of the consent rejection function;
executing an action at a consent management system documenting a consent rejection via at least one of the invocations of the consent rejection function; and
preventing an execution of the action at the consent management system documenting the consent rejection via an additional one of the invocations, wherein the additional one of the invocations occurs via an automated consent rejection tool.

16. The non-transitory computer-readable medium of claim 15, wherein the operations further comprise:
incrementing a function call counter associated with the consent rejection function; and
determining, based on the function call counter exceeding a threshold number, the additional one of the invocations occurred via the automated consent rejection tool.

17. The non-transitory computer-readable medium of claim 15, wherein the operations further comprise:
determining a frequency with which a function call counter associated with the consent rejection function is updated; and
determining, based on the frequency, that the additional one of the invocations occurred via the automated consent rejection tool.

18. The non-transitory computer-readable medium of claim 15, wherein the operations further comprise:
detecting a characteristic of a rendering process used by the user device to render the consent request interface; and
determining, based on a presence of the characteristic, that the additional one of the invocations was initiated by the automated consent rejection tool.

19. The non-transitory computer-readable medium of claim 18, wherein detecting the characteristic comprises determining that the consent request interface was not visible to a user of the user device when the additional one of the invocations occurred.

\* \* \* \* \*

UNITED STATES PATENT AND TRADEMARK OFFICE
CERTIFICATE OF CORRECTION

PATENT NO. : 11,704,440 B2  
APPLICATION NO. : 17/872084  
DATED : July 18, 2023  
INVENTOR(S) : Brannon et al.

Page 1 of 1

It is certified that error appears in the above-identified patent and that said Letters Patent is hereby corrected as shown below:

On the Title Page

Item (72), Inventor Line 5, after the last named inventor please add the following inventor:
Efrain Castaneda Mogollon, London (GB).

Signed and Sealed this  
Thirteenth Day of May, 2025

Coke Morgan Stewart  
*Acting Director of the United States Patent and Trademark Office*